May 19, 1964
W. L. SHEPPARD
3,133,610
SPEED GOVERNING SYSTEM
Filed Dec. 9, 1960
11 Sheets-Sheet 1
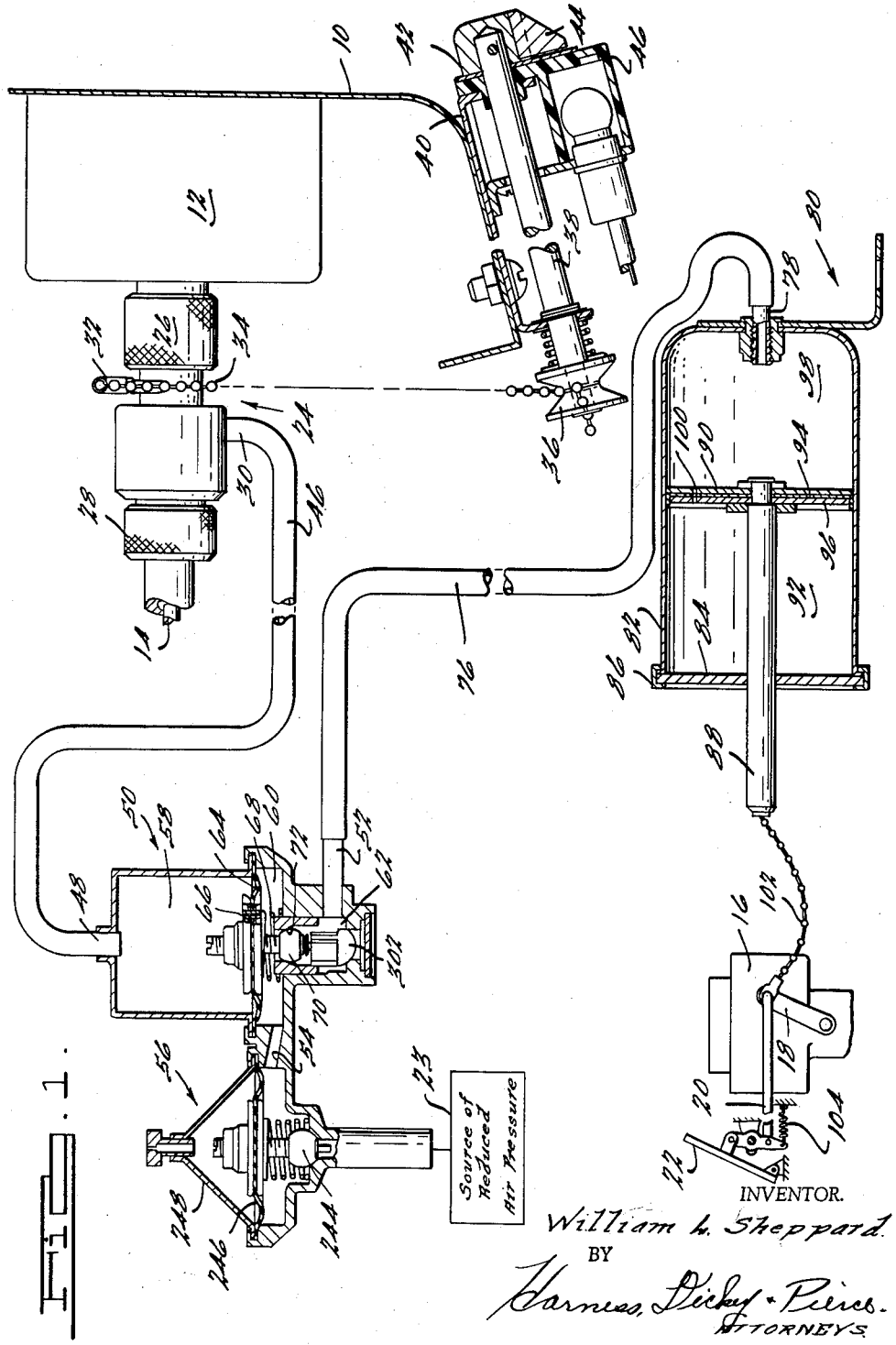
INVENTOR.
William L. Sheppard.
BY
Harness, Dickey & Pierce.
ATTORNEYS

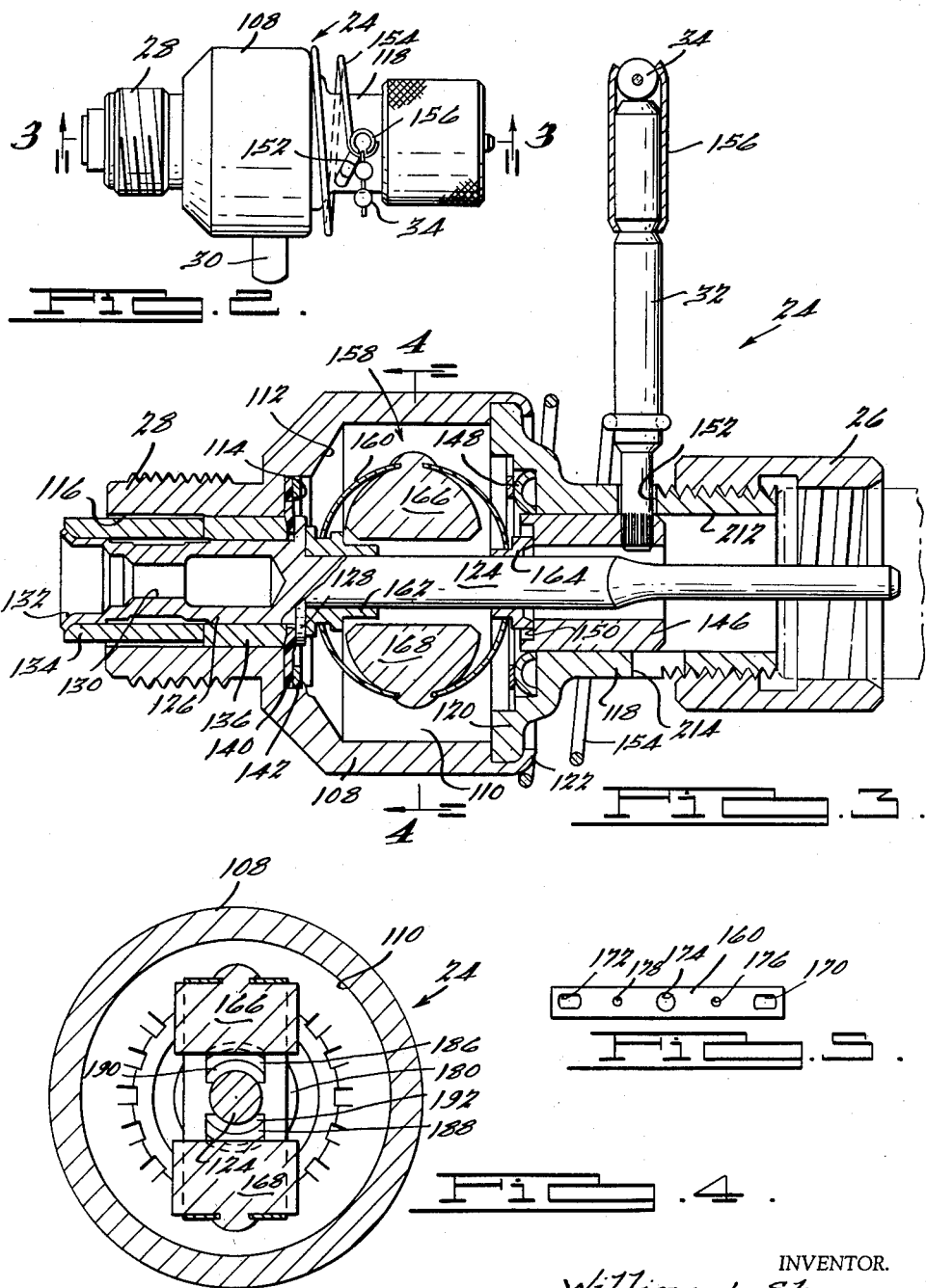

May 19, 1964
W. L. SHEPPARD
3,133,610
SPEED GOVERNING SYSTEM
Filed Dec. 9, 1960
11 Sheets-Sheet 3
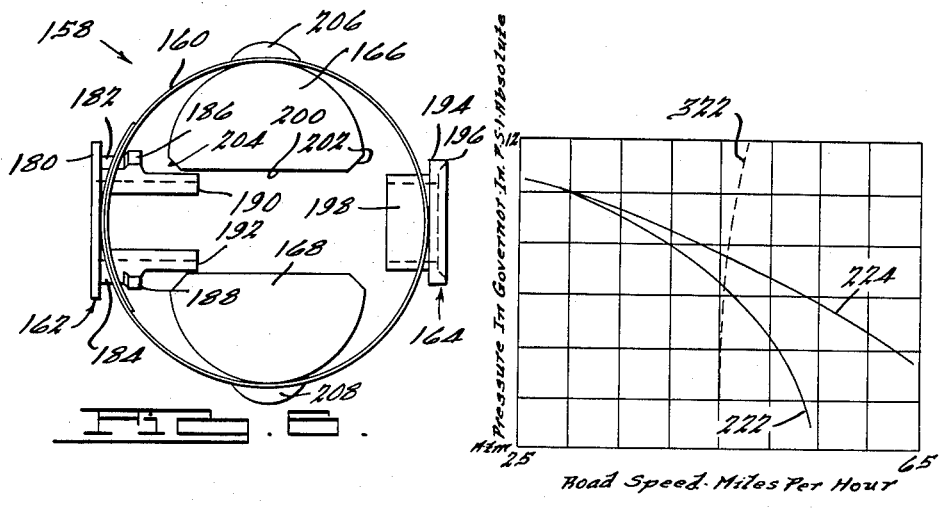
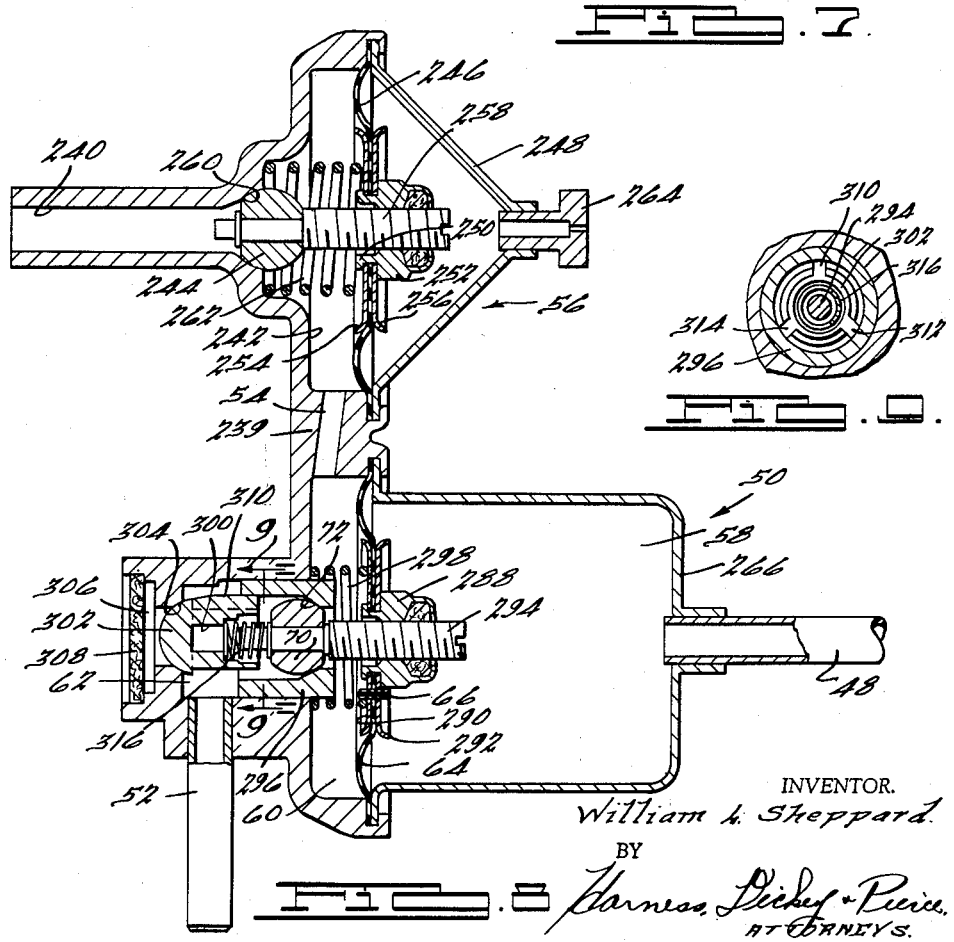
INVENTOR.
William L. Sheppard
BY
Harness, Dickey & Pierce
ATTORNEYS

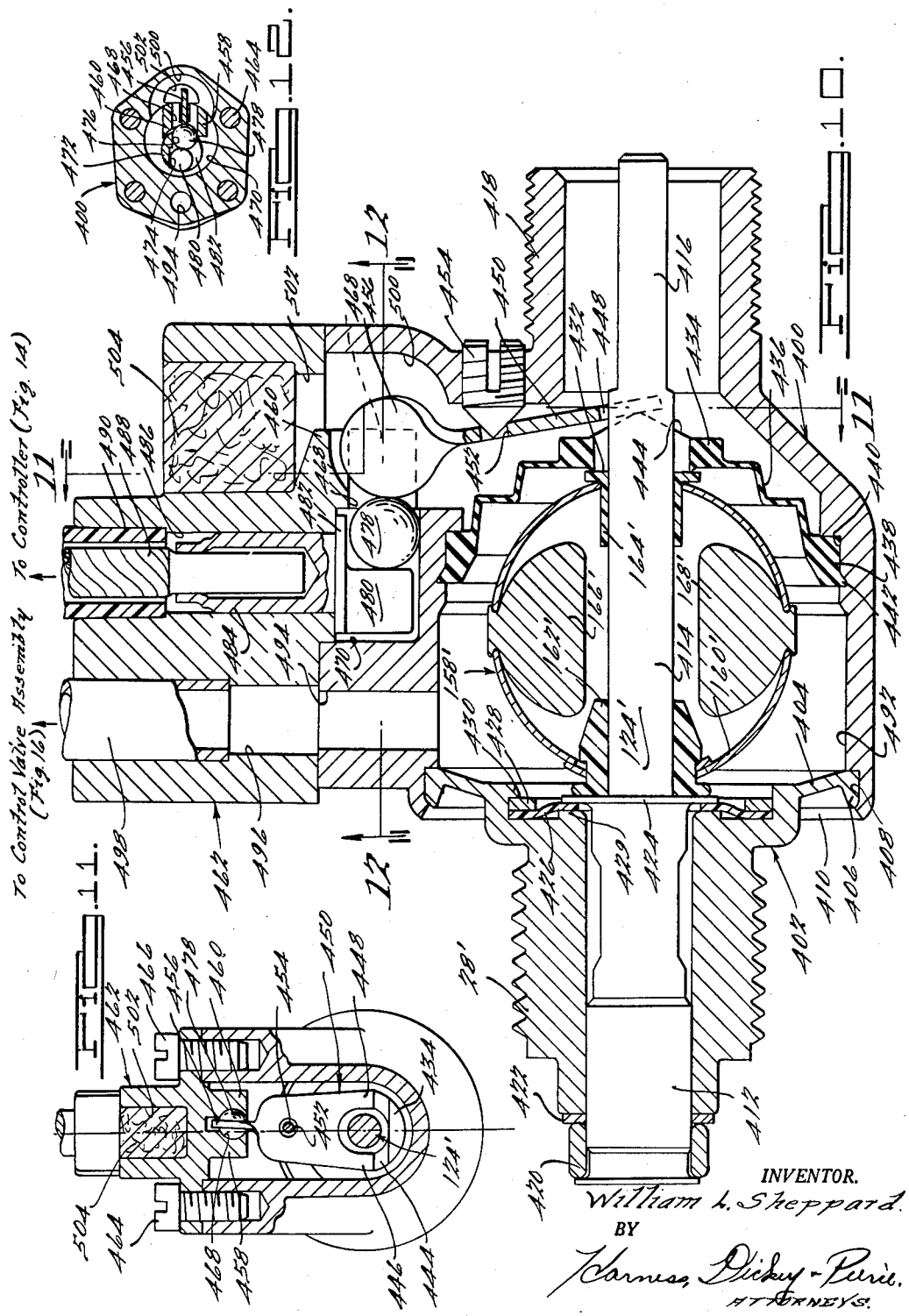

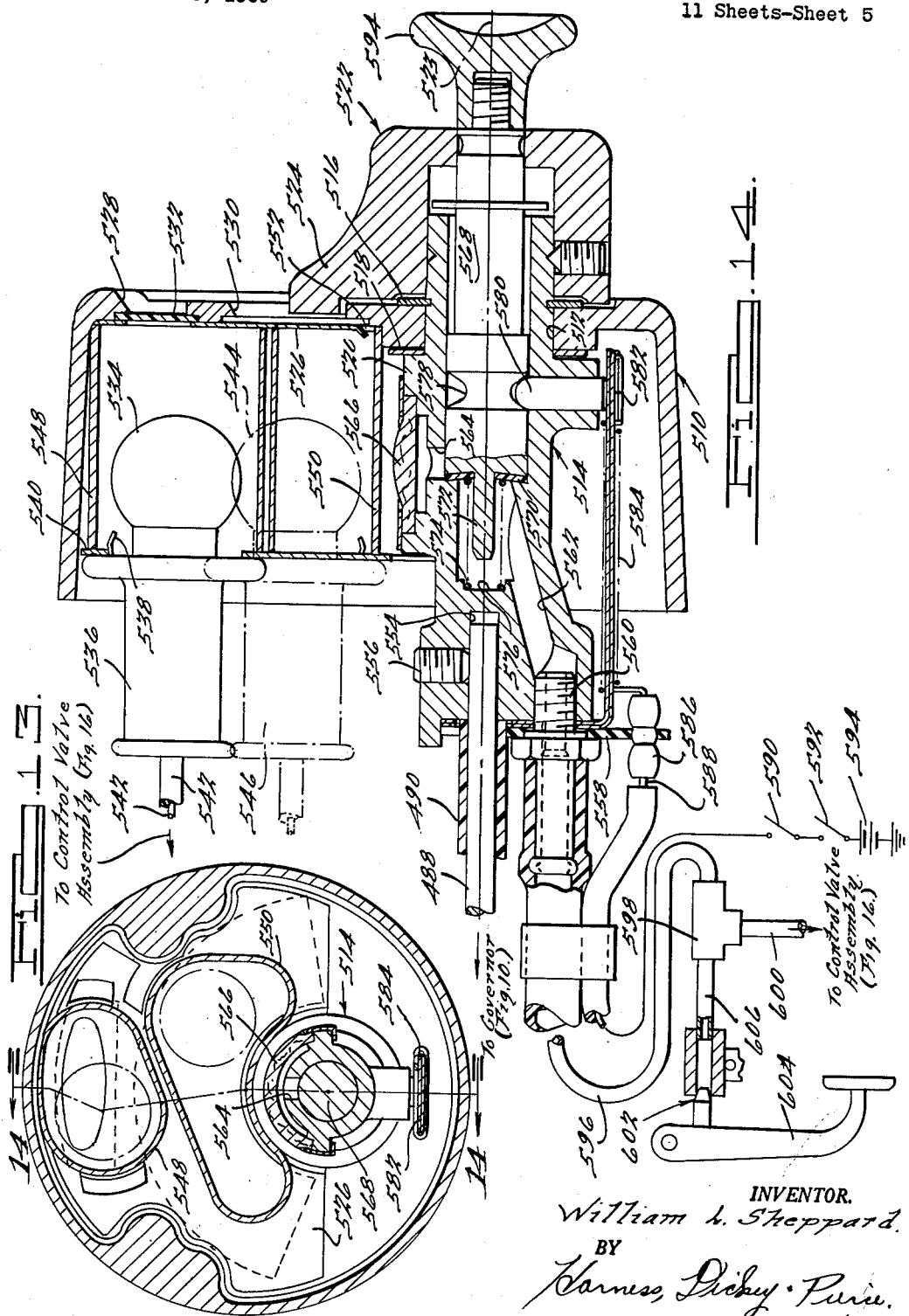

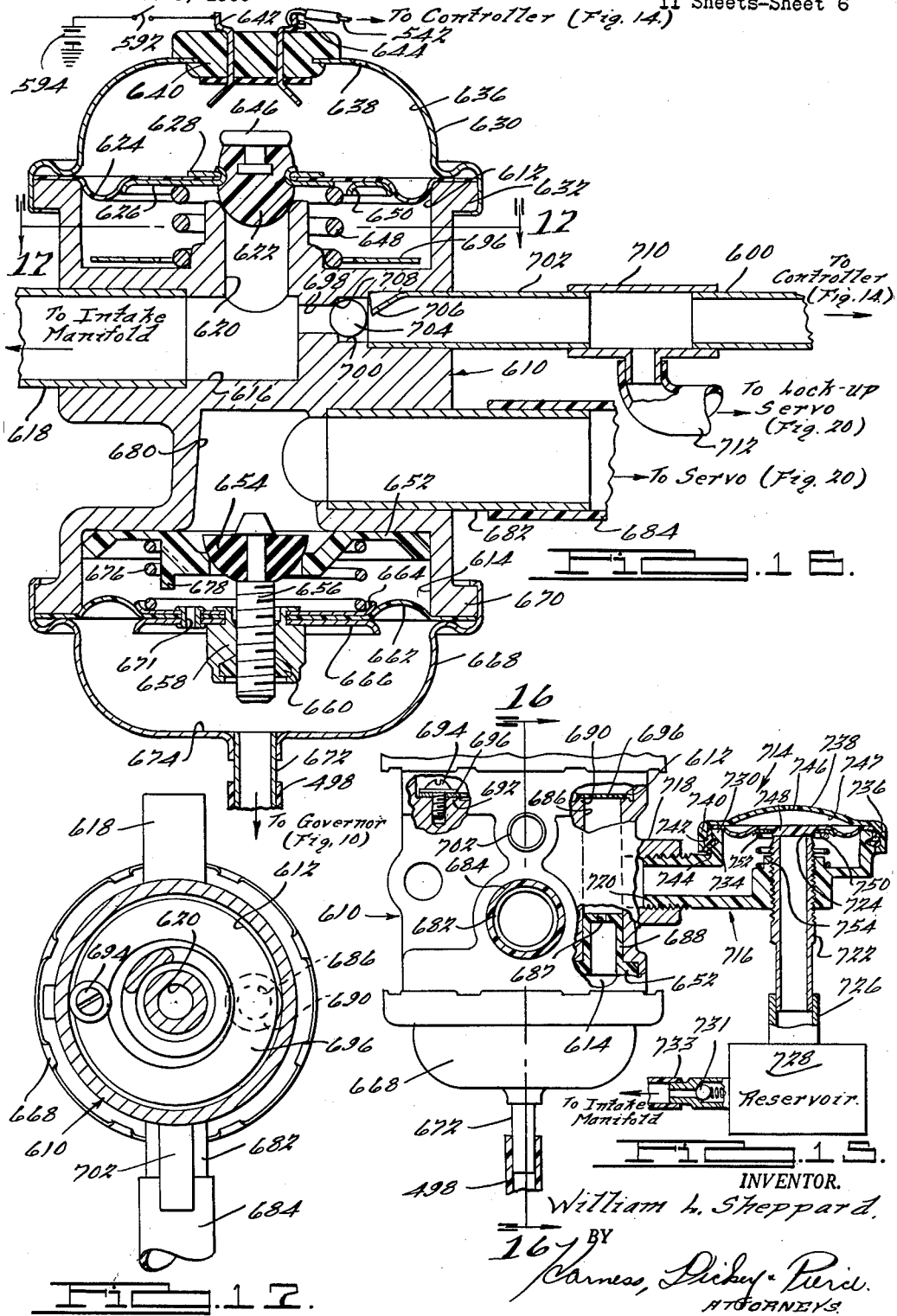

May 19, 1964 W. L. SHEPPARD 3,133,610
SPEED GOVERNING SYSTEM
Filed Dec. 9, 1960 11 Sheets-Sheet 7

INVENTOR.
William L. Sheppard
BY
Harness, Dickey & Pierce
ATTORNEYS

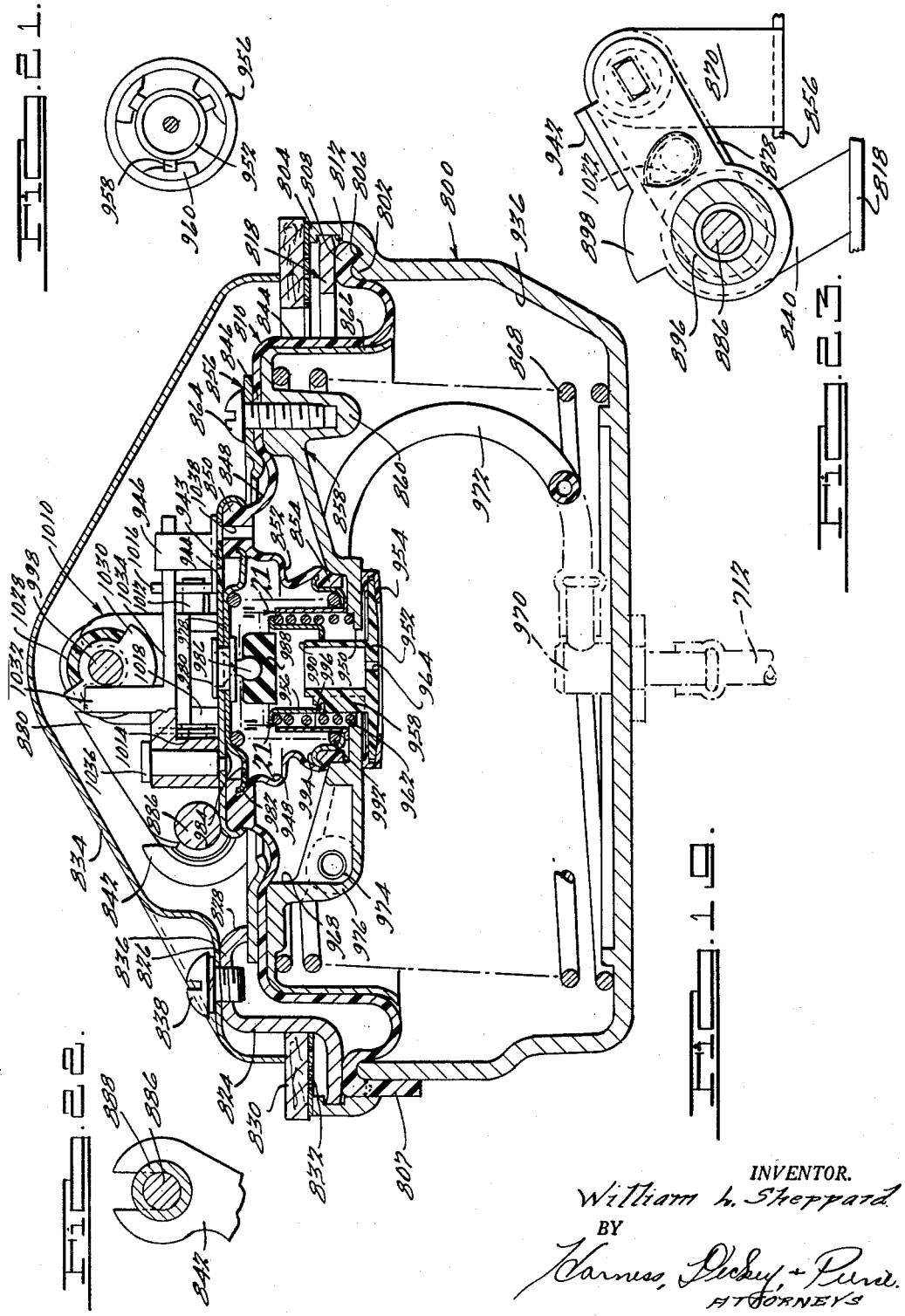

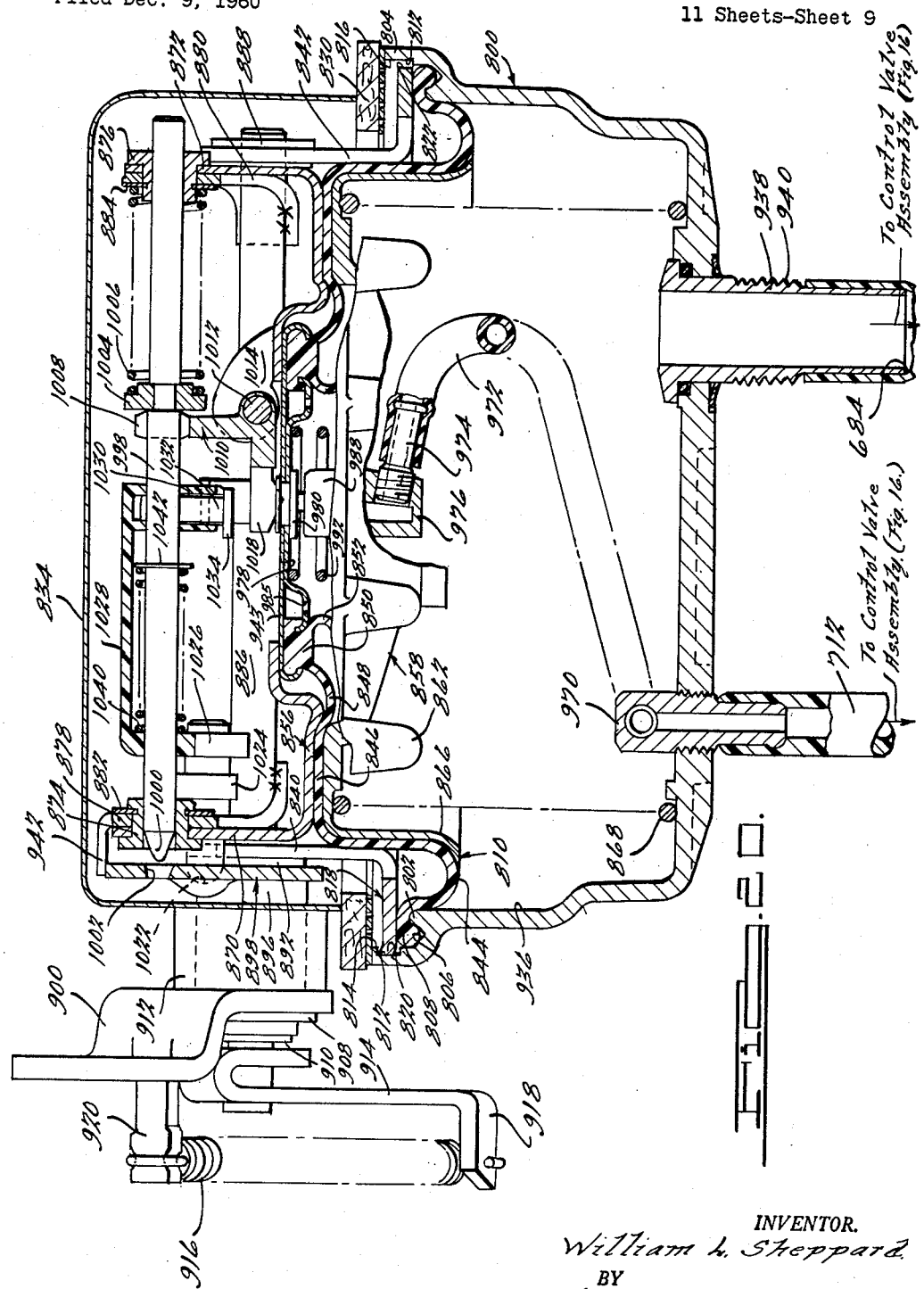

May 19, 1964   W. L. SHEPPARD   3,133,610
SPEED GOVERNING SYSTEM
Filed Dec. 9, 1960   11 Sheets-Sheet 10

INVENTOR.
William L. Sheppard
BY
Harness, Dickey & Pierce
ATTORNEYS

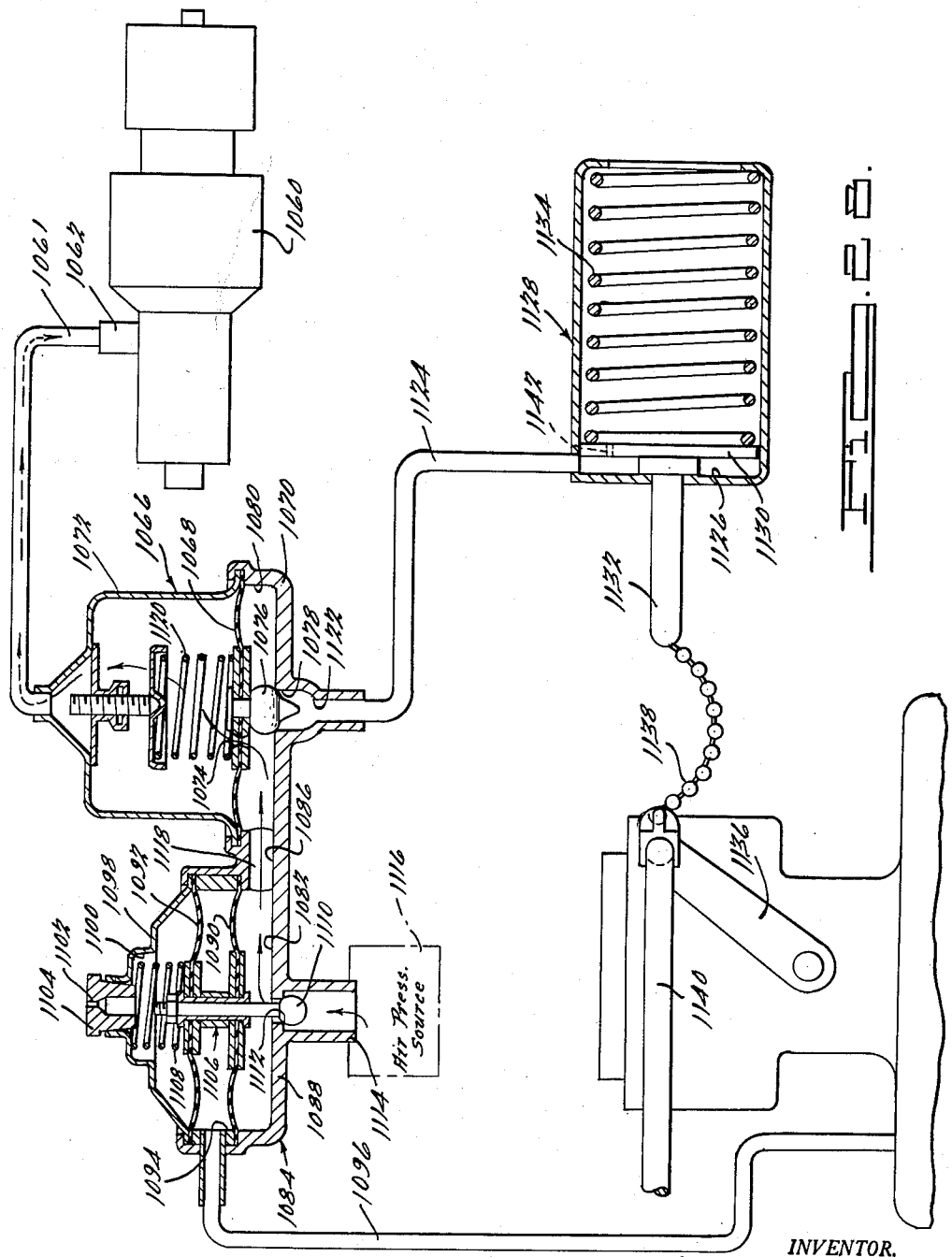

United States Patent Office 3,133,610
Patented May 19, 1964

3,133,610
SPEED GOVERNING SYSTEM
William L. Sheppard, 36655 Romulus St., Romulus, Mich.
Filed Dec. 9, 1960, Ser. No. 74,833
85 Claims. (Cl. 180—82.1)

This invention relates to governing systems. This application is a continuation-in-part of my application Serial No. 632,541, filed January 4, 1957, now abandoned. Certain of the subject disclosed herein is claimed in application Serial No. 74,834, filed December 9, 1960, and in divisions hereof and/or thereof.

An object of this invention is to improve the performances of governor systems.

Another object of this invention is to improve the safety of governing systems by providing for the controlling action to be selectively overridden.

Another object of this invention is to facilitate the adjustment of governing systems, both in the extent of their control and the velocity at which the control will be initiated, and both in initial installation and in use.

Another object of this invention is to reduce hunting in governing systems.

A further object of this invention is to provide a governing system for association with existing vehicles without necessitating any but minor changes in the vehicle and, apart from governing control, without adversely affecting the operation of any part of the vehicle.

Another object of the present invention is to manifest the action of a governing system in the exertion of a force, and to provide means for limiting the maximum magnitude of that force to different values under different conditions.

Another object of this invention is to modulate the forces applied to a speed-controlling linkage in accordance with the speed.

Another object of this invention is to adjust a speed controller to compensate for changes of the controlled speed before they occur.

Another object of this invention is to improve the control of the road speed of the vehicle by developing major compensatory forces in response to changes of road speed and fine compensatory forces in response to changes of a condition indicative of prospective changes of road speed.

A further object of this invention is to anticipate road speed changes of a vehicle before they occur by sensing the changes in the air pressure in the internal combustion engine which must precede the change of engine output torque which precedes the change of road speed.

Another object of this invention is to modulate the force applied to the throttle linkage of an internal combustion engine in accordance with changes of the intake manifold pressure of that engine.

Another object of this invention is to adapt a pneumatic speed controller to perform both semi-automatically and automatically.

A further object of this invention is to automatically control the acceleration of a vehicle.

Another object of this invention is to control the acceleration of a vehicle in accordance with the intake manifold pressure of the internal combustion engine which serves as motive power for the vehicle.

Another object of this invention is to modulatingly change the acceleration of a vehicle in accordance with the deviation between actual road speed and selected road speed over a range of such deviations.

Another object of this invention is to modify the action of a fluid-dynamic force-producing means from one to another flow condition to optimize the means under each of a plurality of conditions.

Another object of this invention is to compensate for regenerative tendencies in a fluid pressure controlling system by developing an opposing degenerative feedback condition.

Certain of the principles of the present invention have been representatively embodied in a governing system for association with an automobile since a number of the features of the invention are particularly advantageous in such use. In general, in one form or mode of operation, control means in the form of a pneumatically operated cylinder is coupled to the accelerator pedal or throttle of the vehicle so as selectively to resist velocity-increasing movement of that pedal, and, under appropriate conditions, to positively exert a force tending to move that pedal in the velocity-decreasing direction. The action of the control means is determined by a valve which responds to a pneumatic pressure differential the magnitude of which is established conjointly by a governor driven, representatively, through the vehicle's speedometer cable, and by a pressure controlling mechanism connected to the vehicle's intake manifold. The road-speed responsive governor may be readily adjusted by the operator of the vehicle through the medium of a knob driving a pointer cooperating with a dial calibrated in terms of road speed. In a modified arrangement disclosed, the system may be operated on a full automatic basis.

The manner of accomplishing the foregoing objects, and other objects of the invention, will be perceived from the following detailed description of embodiments of the invention when read with reference to the accompanying drawings in which:

FIG. 1 is a diagrammatic representation of a velocity governing system shown in association with certain portions of an internal combustion engine vehicle having a speedometer to indicate its velocity of motion;

FIG. 2 is a plan view of the governor illustrated in the system of FIG. 1;

FIG. 3 is an enlarged sectional view taken substantially along the line 3—3 of FIG. 2;

FIG. 4 is a sectional view taken substantially along the line 4—4 of FIG. 3;

FIG. 5 is a plan view, in reduced size, of a spring element employed in the governor illustrated in FIGS. 2–4 of the drawings at one stage in its construction;

FIG. 6 is a side elevational view of a sub-assembly of the governor illustrated in FIGS. 2–4 of the drawings, including the spring illustrated in FIG. 5, in the shape which it assumes prior to assembly to the rest of the elements of the governor;

FIG. 7 is a graphical representation of certain pressure versus velocity relationships occurring in one form of conventional governor, as well as certain pressure-velocity relationships occurring in the system of FIG. 1;

FIG. 8 is an enlarged sectional view of the pressure controlling mechanism and control valve illustrated in the system of FIG. 1;

FIG. 9 is a sectional view taken substantially along the line 9—9 of FIG. 8;

FIG. 10 is a sectional view of a modification of the governor of FIG. 1;

FIG. 11 is a sectional view taken substantially along the line 11—11 of FIG. 10;

FIG. 12 is a sectional view taken substantially along the line 12—12 of FIGURE 10;

FIG. 13 is a transverse cross-sectional view of an improved manual controller adapted for association with the governor of FIGS. 10–12;

FIG. 14 is a longitudinal cross-sectional view taken substantially along the line 14—14 of FIG. 13 and further including a representation of an associated foot brake controlled mechanism and of certain associated electrical circuit elements;

FIG. 15 is a partially cut-away elevational view of a pressure controlling mechanism and control valve assembly suitable for connection to the manual controller of FIGS. 13 and 14 and to the governor of FIGS. 10-13.

FIG. 16 is a sectional view of the assembly of FIG. 15 taken substantially along the line 16—16 of FIG. 15;

FIG. 17 is a sectional view taken substantially along the line 17—17 of FIG. 16.

FIG. 19 is a cross-sectional view taken substantially along the line 19—19 of FIG. 18;

FIG. 20 is a cross-sectional view taken substantially along the line 20—20 of FIG. 18;

FIG. 21 is a fragmentary cross-sectional view taken substantially along the line 21—21 of FIG. 19;

FIG. 22 is a sectional view taken substantially along the line 22—22 of FIG. 18;

FIG. 23 is a fragmentary cross-sectional view taken substantially along the line 23—23 of FIG. 18;

Figure 24:
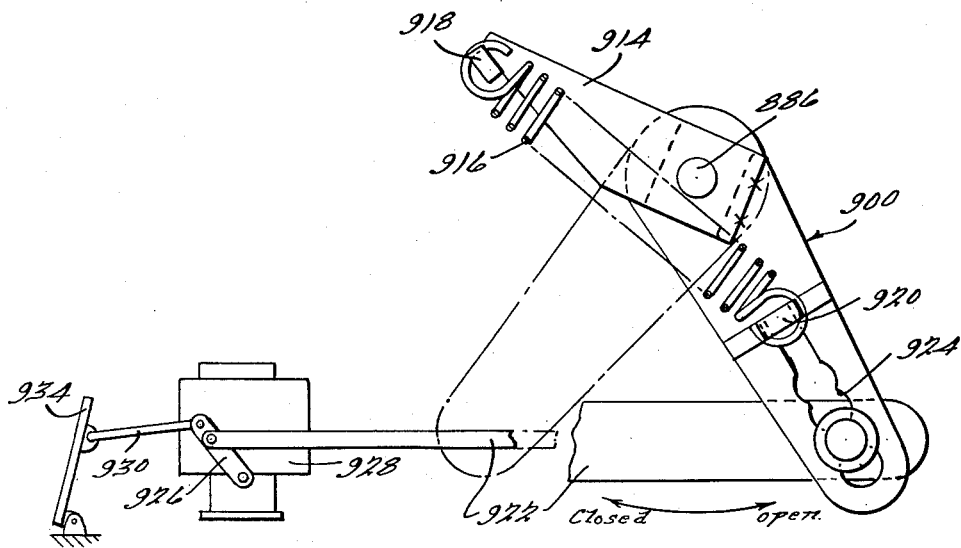
FIG. 24 is a view of the linkage at the left of the servo of FIG. 18 as viewed from the left of FIG. 18 and further illustrating the connection of the servo to the throttle linkage and to the carburetor.
Figure 25:
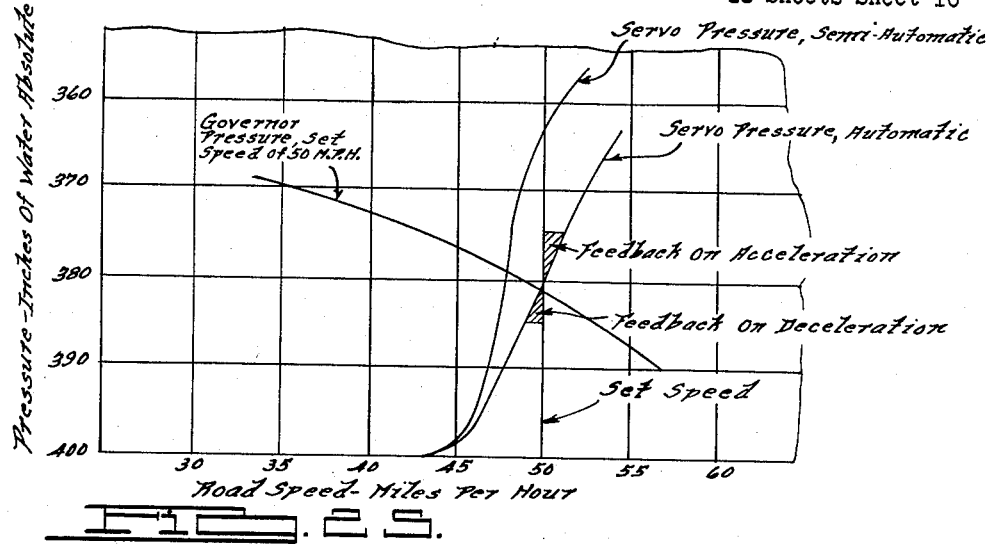
Figure 26:
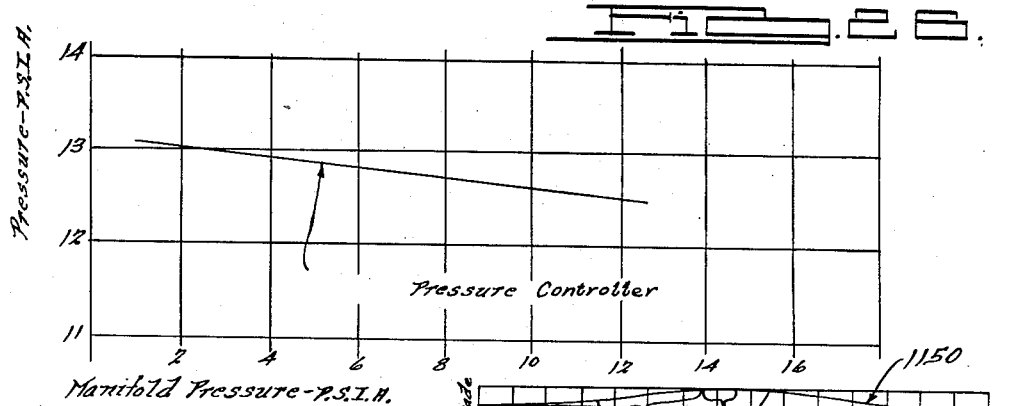
Figure 28:
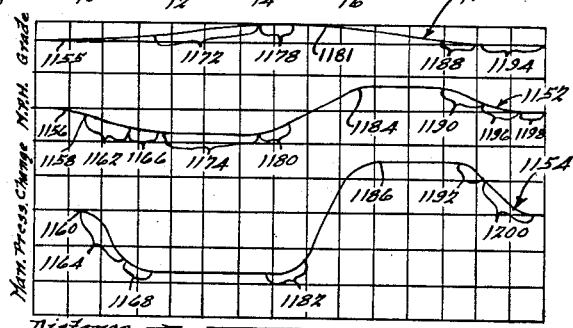
Figure 27:
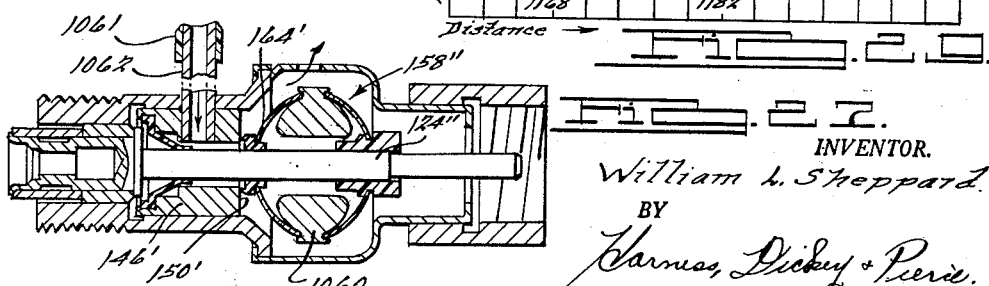

FIG. 25 is a graphical representation of the relationship between the air pressure in the governor of FIGS. 10-12 with variations of the road speed of the vehicle with which the governor is associated at one setting of the governor, as well as a graphical representation of the relationship between the pressure in the servo of FIGS. 18-24 with variations of the road speed of the vehicle with which the servo was associated under two different conditions of operation;

FIG. 26 is a graphical representation of the relationship between the pressure in the servo of FIGS. 18-24 and changes in the pressure in the manifold of the internal combustion engine with which the system is associated;

FIG. 27 is a longitudinal sectional view of a modified form of governor suitable for producing a controlled pressure which is greater than atmospheric and which varies in accordance with the rotational speed of a shaft;

FIG. 28 is a schematic representation of a road speed controlling system in which a source of air at a pressure greater than atmospheric is available; and FIG. 29 is a graphical representation of certain operational relationships in systems constructed in accordance with certain of the principles of the present invention.

The system illustrated in FIG. 1 of the drawings is representatively so associated with a vehicle as to control the velocity of road speed of that vehicle. The vehicle is assumed to include a dash panel 10 supporting a conventional speedometer 12 adapted to be driven by a flexible, sheathed speedometer cable 14, the speedometer cable being driven by a rotatable element in the transmission train of the automobile so that the speed of rotation of the cable 14 bears a constant relationship to the speed of rotation of the propeller shaft of the automobile and hence reflects road speed.

The vehicle is assumed to be powered by an internal combustion engine including a carburetor 16 having a valve controlled by an arm 18 connected through spring-biased linkage 20 to the accelerator pedal or throttle 22 which is depressed by the driver's foot to control the velocity of the vehicle. The carburetor arm 18, the linkage 20 and the pedal 22 are shown in their normal, released positions so that the carburetor valve is closed and the engine is operating at idle speed. Depression of the throttle 22 will pivot arm 18 in a counter-clockwise direction to open the carburetor valve a selected amount and to accordingly increase the operational speed of the engine. This linkage including accelerator or throttle 22 serves as an operator or driver-operated speed controller for the vehicle or variable speed unit, movable, with respect to the remainder of the vehicle or unit, in engine speed increasing and in engine speed decreasing directions.

It is further assumed that the vehicle is provided with means acting as an air pump to create an air pressure less than one atmosphere and the system of FIG. 1 is illustrated as being connected to a source of reduced air pressure 23 which may be and preferably is the intake manifold of the engine.

The governor or speed responsive means 24, which serves as a fluid-pressure or, specifically, an air-pressure controlling governor, is driven by the speedometer cable 14 in the representatively disclosed arrangement. Since it is customary to provide a detachable connection between the speedometer cable 14 and the speedometer 12, the governor 24 is provided with a fitting 26 adapted to secure the governor 24 to the speedometer 12 and a fitting at the other end adapted to couple to the fitting 28 provided on the speedometer cable 14. Consequently, rotation of the inner flexible member of the speedometer cable 14 produces rotation not only of the movable elements of the speedometer 12 but also of certain movable elements of the governor 24.

Governor 24, to be described in detail hereafter, is employed as a pneumatic pressure controller in the system depicted in FIG. 1. It is provided with two ports one of which is connected to the atmosphere and the other of which, port 30, is connected to a source of reduced air pressure through a mechanism to be described. A valve in the governor interconnects port 30 and the atmosphere to a variable degree determined by the velocity at which the movable elements of the governor are rotated, the degree of that interconnection being also manually settable to permit preselection of the vehicle velocity at which the system will be effective to inhibit further speed increases. This control is exercised through a lever 32 mounted on and rotated about the longitudinal axis of the governor 24 through a limited arc of movement. One end of a ball-type chain 34 is secured to the lever 32 and the other end of that chain extends over and is secured on a pulley 36 mounted upon a shaft 38. Shaft 38 is supported by means of a bracket 40 upon the dash panel 10 of the vehicle and carries a knob 42 adapted to be manually rotated by the driver of the vehicle. Knob 42 carries a pointer 44 adapted to cooperate with an illuminated scale 46 calibrated in terms of miles per hour. For example, the shaft 38 may be rotatable through a 160° arc, and the scale 46 may be calibrated, over that arc, from 30 miles an hour to 80 miles per hour. In FIG. 1, the equipment is shown in its lowest speed-setting position, rotation of the shaft causing chain 34 to wind upon pulley 36 to move the lever 32 in a direction to increase the speed setting, that is, to increase the road speed of the vehicle at which the governing system will become effective.

It will be apparent that the governor adjusting shaft could, with appropriate construction of the speedometer, be extended through the speedometer face to drive a pointer cooperating with the speedometer indicia if desired.

Port 30 of governor 24 is connected by means of tube 46 to port 48 of a control valve 50. Valve 50, which serves as a fluid-pressure, or specifically, an air-pressure differential responsive control valve or valve means is provided with a second port 52 connected to an output unit 80 and a third port 54 is connected to a pressure controller 56 which is in turn connected to the source 23.

Control valve 50 includes upper, intermediate and lower chambers 58, 60 and 62, respectively. A flexible diaphragm 64 or air-pressure displaceable element demarks the upper and intermediate chambers 58 and 60, but those two chambers are interconnected by a minute orifice 66 formed in the diaphragm 64. The intermediate chamber 60 communicates with the pressure controller 56 through the port 54 so that the air pressure in chamber 60 is controlled by pressure controller 56. This pressure is normally appreciably below atmospheric pressure.

Chamber 58 is connected to the governor 24 which controls the pneumatic pressure in chamber 58. During the normal operation of the equipment, air flows from the atmosphere, through the governor, to the chamber 58, through the orifice 66, chamber 60, port 54 and through the pressure controller 56. The governor 24 modulates this pressure flow in accordance with the rotational speed of cable or shaft 14 to modulate the pressure in chamber 58, and in the preferred practise significant changes in the pressure in chamber 58 are accompanied by but very small changes in the rate of flow. Chamber 58 is illustrated as being enlarged to act as a surge chamber to integrate transient pressure variations such as those which might occur, for example, as a result of the unwinding of the speedometer cable 14 during deceleration of the vehicle.

Diaphragm 64 is biased upwardly by a spring 68 and carries a ball 70 cooperating with a valve seat 72 to define a ball valve. In general, at any vehicle velocity below a preselected value or preselected narrow range of values, as selected by the position of knob 42, the pressure differential between chambers 58 and 60, as controlled by governor 24, is such that the valve including ball 70 and seat 72 is closed. At vehicle velocities above the preselected value or preselected narrow range of values, the pressure differential between chambers 58 and 60 is such that ball 70 tends to be off of valve seat 72, interconnecting chambers 62 and 60. In operation, ball 70 is controlled so as to modulate the pressure in chamber 62.

Output port 52 of control valve 50 is connected by means of tubing 76 to the input port 78 of a control cylinder or servo 80. Cylinder 80 comprises a generally tubular casing 82 the closed end of which is apertured to accept the bushing-sealed input-port tube 78. The other end of the casing 82 is closed by means of a filter 84 retained in place upon the casing 82 by means of a crimp ring 86. Filter 84 is centrally apertured to accept a piston rod 88 connected to a piston head 90 and is assumed to be sufficiently rigid to serve as a bearing for that piston rod during its motion. Filter 84 is sufficiently perforated to permit the maintenance of atmospheric pressure in the cylinder chamber 92 to the left of the piston head 90, but filters the air to prevent the ingress of foreign material into chamber 92. Piston 90 is shown to be backed by a plastic seal 94 and a rigid washer 96 so as to form an airtight junction between the edges of the piston head assembly and the casing 82 so as to prevent air from leaking from the chamber 92, to the left of the piston head, into the cylinder portion 98 to the right of the piston head 90. However, for reasons to be described, a small orifice 100 is formed through the piston head 90 so as to interconnect chambers 92 and 98.

Piston rod 88 is coupled by means of a ball-type chain 102 to the arm 18 and linkage 20 at the carburetor 16. As will be described in more detail hereinafter, with the control valve 70 closed, there is no effective pressure differential between chambers 92 and 98 in the cylinder 80 and cylinder 80 imposes no effective load resisting the rotation of throttle pedal 22 additional to that of the throttle return spring 104. Under these conditions, the control system will effect no significant change in the operation of the vehicle or in the force which the driver must exert upon the throttle 22 to attain a selected speed. However, at and above the governed speed, as established by the setting of knob 42, the control valve including ball 70 will be open or incipiently open to fully or partially interconnect control-valve chambers 60 and 62, producing a modulated reduction in the air pressure in chamber 98 of the cylinder 80. The piston head 90 consequently tends to move to the right in the view of FIGURE 1, tending to so move the arm 18 and linkage 20 that the car's velocity will be reduced unless the driver applies substantial additional force upon the throttle 22 to override this control action. It will therefore be seen that in the disclosed arrangement, servo or pressure actuated motor 80 serves as a fluid-pressure-differential responsive actuator means or pressure actuated force producing means.

If desired, a compression spring may be disposed between the piston head 90 and the closed end of casing 82, exerting a small-magnitude force tending to move the piston to the left in the view of FIG. 1.

A form of governor 24 for use in the system of FIG. 1 is shown in FIGS. 2 to 4 of the drawings and is the subject of my copending application, Serial No. 632,470, filed January 4, 1957, now Patent No. 3,064,669, granted November 20, 1962, and an improved form thereof is disclosed in my copending application entitled "Governor," filed November 14, 1960, Serial No. 68,877, the disclosure of which is incorporated by reference herein as fully as though completely reproduced herein. Governor 24 comprises a hollow body portion or housing 108 defining an enlarged cavity 110. A section having reduced inner and outer diameters is formed integrally with housing 108 and is externally threaded to define the fitting 28 which is adapted to accept the nut at the end of the conventional speedometer cable assembly. Adjacent the junction between the main body of the housing 108 and the fitting 28, the inner wall of the housing 110 tapers as at 112 and is then recessed to define an annular shoulder 114. The central bore 116 in the fitting portion 28 terminates at the shoulder 114.

A generally tubular extension 118 having a flange 120 is secured to the open end of housing 108 in any suitable fashion such as crimping the edge of the housing 108 over the flange 120 as at 122. The nut 26, adapted to engage the hollow, threaded projecting stud on a conventional speedometer, is secured upon the extension 118 so that relative rotational motion therebetween is prevented. In the adjustment of the unit, the rotational position of the governor 24 is shifted relative to the speedometer, with the governor being then locked in the adjusted position. This is accomplished, in the representative arrangement disclosed, by providing mating threads on the nut 26 and on the extension 118 having a pitch different than the pitch of the threads on the speedometer and the threads mating therewith on the right-hand portion of nut 26. At the present time, male studs on speedometers are customarily formed with sixteen threads per inch and, in one satisfactorily operating arrangement, thirty-two threads per inch were formed on the end of extension 118 and on the left-hand portion of nut 26.

A shaft 124, is disposed axially of the housing 108 and of the extension 118. The central portion of the shaft 124 is circularly cylindrical. The right-hand end of shaft 124, in the view of FIG. 3, is formed with a square cross section similar to the end of the speedometer cable and this end portion enters and engages movable portions of the speedometer in the same fashion as the end of the speedometer cable normally engages the speedometer. It will be appreciated, of course, that if clips or other end fittings are provided upon the speedometer cable, similar fittings should be provided upon the end of shaft 124.

The left-hand portion 126 of shaft 124 is of greater diameter than the central portion of that shaft, the junction between those portions defining a shoulder 128. End portion 126 is provided with a longitudinal recess a portion 130 of which has a square cross section to define a socket for accepting the end of the speedometer cable. Socket 130 may be formed, for example, by boring and counterboring end portion 126 of shaft 124 and then upsetting the central part of the end portion 126, as shown, to force the central portion of the bar into a square configuration.

The counterbored end of portion 126 is flared outwardly as at 132 over the end of a thrust collar 134 of steel or other similar material. In the disclosed arrangement, thrust collar 134 rotates with shaft 124 relative to fitting 28 and housing 108. The right-hand face of thrust collar 134 abuts a bearing 136 press fitted within the bore 116 in the fitting 28, the right-hand face of bearing 136 extending slightly to the right of shoulder 114, as shown. Bearing 136 constitutes the primary supporting means for the shaft 124 although the right-hand end of that shaft is or may be supported by the bearings in the speedometer.

It is important to the operation of the disclosed governor that there be no air leakage past the bearing 136 into the chamber 110, either between the bearing 136 and the wall of the fitting 28 or between the bearing and the surface of the end portion 126 of the shaft 124 which is rotating relative to that bearing. Yet, the provided seal must not offer any substantial resistance to the rotation of shaft 124 since it is important that the governor as a unit require very little torque to produce rotation thereof at the speedometer cable rotational speed, for otherwise the load imposed upon the cable is greater than that for which it is designed and cable breakage or malfunctioning may occur. It has been found that a seal having these characteristics may be achieved by employing a normally planar annular plastic seal deformed from its planar configuration when in position in the unit. Thus, a plastic annulus 140, successfully manufactured of a polytetrafluoroethylene resin commercially sold under the name Teflon, is disposed in the recess at the end of the cavity 110 and against the shoulder 114. The central aperture in the annulus 140 is smaller than the diameter of the bore 116 and only slightly larger than the outer diameter of the shaft portion 126. A washer 142 made, for example, of steel is positioned against the plastic disc seal 140 and serves to clamp that seal in place, the washer 142 being staked in position, portions of the wall 112 being extruded over the edge of the washer 142 at a plurality of points around the edge of the washer 142 as may best be seen in the sectional view of FIGURE 4. It will be observed that the aperture in the washer 142 is appreciably greater in diameter than the aperture in the seal 140 and greater in diameter than the bore 116 so that it is only the outer edge of the disc 140 which is clamped. Since the bearing 136 projects to the right of the shoulder 114 as previously noted, the central portion of the plastic disc 140 is deflected rightwardly from the plane of the outer edge of that disc. The portion of the disc 140 adjacent the central aperture therein is trapped between the bearing 136 and the shoulder 128 on the shaft 124 so that that inner portion is in a plane different from but parallel with the plane of the outer edge of the disc 140. During the flaring operation at which the lip 132 is established, the shoulder 128 is positioned so that it will be lightly seated against the seal 140. The light seating is necessary to prevent the frictional engagement between the shoulder 142 and the seal 140 from impeding the free rotational motion of the shaft 124.

A sleeve 146 is slideably disposed within the central bore in the extension 118. Under all operative conditions, a portion of this sleeve protrudes to the left of that bore so that a seal 148, seated in a counterbore in the flange 120, continuously engages the surface of the sleeve 146, forming an airtight seal between the outer diameter of the sleeve 146 and the bore in extension 118. The left-hand end of sleeve 146 is counterbored to define an annular shoulder 150 which, as will be seen, serves as a valve seat. The central bore in the sleeve 146 is sufficiently large to insure that the shaft 124 will not contact that sleeve during its rotation.

As may best be seen in FIGURE 2 of the drawings, the extension 118 is provided with a helical slot 152 extending in the order of 35° to 45° around its circumference. The adjusting lever 32 passes through the helical slot 152 and is secured in a radial aperture in the sleeve 146. One end of a helical return spring 154 engages the lever 32 and the other end is anchored to the housing 108 or the extension 118 in any appropriate manner. For example, the other end of spring 154 may encircle output tube 30 or, alternatively, a radial recess may be formed in element 108 or 118 and the end of the spring 154 inserted therein.

The spring 154 exerts a force tending to move lever 32 to the position illustrated in FIGURE 2, that is, against the upper end of the slot 152 and in the rearmost of its positions along the longitudinal axis of the governor.

The end one of the balls of the ball-type chain 34 is secured to the lever 32 by means of a clip 156. During the pre-selection of the governing speed, in the manner above described, a lever 32 is rotated about the longitudinal axis of the governor and moved along the helical slot 152 so that the longitudinal position of that lever 32 is changed. If the selected speed is being increased, sleeve 146 is advanced to the left in the view of FIGURE 3. Conversely, upon the setting of a lower preselected governed speed, the sleeve 146 is moved to the right in that view. It will be appreciated that other means of adjusting the axial position of sleeve 146 or of adjusting the axial position of any counterpart of sleeve 146 may be employed.

The rotatable governor subassembly 158 comprises a spring 160, a clutch bushing 162, a valve bushing 164 and a pair of weights 166 and 168. Rectangular apertures 170 and 172, the ends of which are generally arcuate, are formed near each end of the spring 160 and a circular aperture 174 is formed medially of the spring. A pair of apertures 176 and 178 are formed along the longitudinal axis of the spring and intermediate the central aperture 174 and the two end apertures 170 and 172, respectively. Element 160 is preferably of resilient material, and cadmium or zinc plated tempered spring steel has proved satisfactory in practice. In a constructed arrangement, the spring 160 was initially formed in the shape illustrated in FIG. 5 of the drawings and of stock about 0.002 inch in thickness of about $5/16$ of an inch in width.

To produce governor characteristics satisfactory for use in the system of FIG. 1, the spring 160 is preformed into a circle with the ends overlapping sufficiently to bring apertures 170 and 172 into alignment with one another. Spring 160 is illustrated in its preformed free position in FIG. 6 of the drawings.

The clutch bushing 162 is preferably formed of a wear-resistant deflectable plastic, a polyamide resin commercially sold under the generic name nylon having proved to be satisfactory in use. Bushing 162 includes a centrally opertured head portion 180 (FIG. 6), a pair of diametrically opposed arcuate shoulders 182 and 184, a pair of diametrically opposed arcuate flanges 186 and 188 integral with shoulders 182 and 184 respectively, and a pair of diametrically opposed axially extending arcuate fingers 190 and 192. The inner surfaces of projecting fingers 190 and 192 define, in conjunction with the central aperture in head portion 180, a circular cylindrical surface the diameter of which is but slightly greater than the diameter of that portion of shaft 124 with which clutch bushing 162 is associated. Shoulders 182 and 184 have generally arcuate exterior surfaces so that they in combination define a generally rectangular element with arcuate ends similar in shape to the apertures 170 and 172 in the spring 160 (FIG. 5). Obviously, the length of the apertures 170 and 172 should be slightly greater than the diameter upon which shoulder surfaces 182 and 184 are formed in view of the curvature of spring 160. The flanges 186 and 188 cooperate with head portion 180 to retain the spring 160 in position upon the bushing 162 when the assembly is in place upon the shaft 124. However, the fact that flanges 186 and 188 are not continuous, coupled with the flexibility of the bushing 162 permits the bushing 162 to be inserted in the apertures 170 and 172 of the spring 160 during the assembly of the governor.

The valve bushing 164 is advantageously formed of the same material as the clutch bushing 162 and desirably has the same internal diameter. The head portion 194 of bushing 164 is provided with a generally conical recess so that the right-hand face of that bushing, in the view of FIG. 6, is in the form of a very thin annulus serving as a valve surface 196 adapted to engage the face 150 of the sleeve 146 (FIG. 3) which serves as a valve seat. The projecting portion 198 (FIG. 6) of the bushing 164 extends through the aperture 174 in the spring 160.

Each of the weights 166 and 168 is in the general form of a segment of a right circular cylinder, the radius of the cylinder being less than the radius upon which the spring 160 is preformed. In a constructed arrangement which produced a generator characteristic curve of satisfactory form, the radius of curvature of the major surfaces of weights 166 and 168 was about 0.196 inch whereas the radius of curvature to which the spring 160 was formed was in the order of 5/16 of an inch, that is, in the constructed arrangement, the radius of curvature of the weights was about 37% less than the radius to which the spring 160 was preformed. The chord 200 of the weight 166, for example, is below the diameter of the circle upon which the circular surface of the weight 166 is formed. Thus, in a constructed arrangement, the height of the weights was some 15% greater than the radius of curvature. The length of the weights 166 and 168, as illustrated in FIG. 4 of the drawings, is slightly greater than the width of the spring 160. While the radius of curvature of the weights 166 and 168 relative to the radius of curvature of spring 160 in its free position is significant, as will be described, to the output characteristics of the governor, the height and length of the weights control primarily only the mass of the weights and may be adjusted relative to one another as desired. In the illustrated form, the edges of each of the weights, as weight 166, are chamfered as at 202 and 204 to insure clearance between the weights and the bushings 164 and 162 respectively. To obtain a relatively large mass for the size of the weights, the weights 166 and 168 can be formed of lead. Each of those weights is provided with an upstanding stud which extends through the apertures 176 and 178 respectively, and is headed over as at 206 and 208, respectively, to secure the weights to the spring 160.

While the weights 166 and 168 are shown to be in engagement with the ends of fingers 190 and 192 in the view of FIGURE 6, when the sub-assembly 158 is placed in position upon the shaft 124 (FIG. 3), the spring 160 is deformed into a generally elliptical shape since, in the preferred arrangement, the distance between the right-hand face of shoulder 128 on shaft 124 and the valve seat 150 is less than the distance between the faces of clutch bushing head 162 and of valve bushing head 164 when the sub-assembly 158 is in its free position as shown in FIG. 6. As a result of this deformation, the weights 166 and 168 are moved to the position shown in FIG. 3 of the drawings, in which they adequately clear the clutch bushing 162.

The compressing or deforming of the spring 160 into an elliptical shape effectively pre-stresses the spring 160 so that forces are exerting tending to move clutch bushing 162 to the left in the view of FIG. 3 and valve bushing 164 to the right. The former force tends to establish a driving relationship between the face of bushing 162 and the shoulder 128 so that the governor sub-assembly 158 will be forced to rotate with shaft 124. The latter of these forces tends to bring the face of valve bushing 164 into intimate engagement with the valve seat 150.

Since the chamber 212 defined by the bore of the extension 118 is connected to the outer air, or atmosphere, by a port 214 formed through the wall of the extension 118, that chamber will, under all operational conditions, be at the ambient air pressure. As was above noted in the discussion of the system of FIG. 1, the port 30, communicating with the chamber 110 (FIG. 3), is connected to a source of reduced air pressure and under normal operational conditions of the governor, chamber 110 will be at an air pressure less than the ambient air pressure. Consequently, with the unit at rest and with spring 160 exerting a substantial force tending to maintain valve bushing 164 against valve seat 150, a substantial pressure differential will exist between chambers 110 and 212. The magnitude of this pressure differential will, of course, be determined by the extent of the pre-loading of spring 160 as manifested in the force by which valve bushing 164 is pressed into engagement with valve seat 150. In general, within limits, the pressure in cavity 110 will be equal to the ambient pressure in chamber 212 less the quotient of the spring force exerted upon the valve bushing 104, pressing it into engagement with valve seat 150, divided by the effective area of the valve. The effective valve area is equal to the area of the circle defined by the inner surface of the valve lip 196 less the area the shaft 124 at the valve. The extent of this pre-loading, and hence the pressure within the cavity 110, may, of course, be adjusted, under both static and dynamic conditions, by rotating the lever 32 to shift the position of sleeve 146 and hence of valve seat 150. If the driver sets a higher controlled speed by shifting the position of knob 42 (FIG. 1) and advancing the sleeve 146 to the left (FIG. 3) obviously the spring 160 will be distorted into an ellipse having an even greater major axis and a lesser minor axis and the force pressing valve bushing 104 against valve seat 150 will be increased.

When the vehicle is in motion, shaft 124 is rotated at a speed varying in accordance with the road speed of the vehicle. Centrifugal force acting upon the mass of the weights 166 and 168 will tend to displace those weights radially outwardly to an extent determined by the angular velocity of shaft 124. The effect of this movement of weights 166 and 168 is to tend to further deform spring 160 so that the effect of the pre-loading of spring 160 is absorbed to a varying degree. Consequently, with any given static pre-loading of the valve 164, the force tending to maintain the valve in engagement with seat 150 decreases as a function of the angular velocity of shaft 124. Under normal operating conditions, 164 is not withdrawn from the valve seat 150 adequately to permit cavity 110 to reach atmospheric pressure.

In the disclosed arrangement, the frictional force between the valve bushing 164 and the combination of the spring 160 and shaft 124 is greater than the frictional force between the bushing and the valve seat 150 so that the valve tends to rotate relative to the valve seat 150 upon rotation of the shaft 124, although the relationships may be such, if desired, that the valve 164 will not rotate relative to the seat 150. By using the noted plastic for the valve 164, no substantial wear has been detected even after extended testing of the unit, this being true even though the width of the lips on the valve 164, that is, the width of the annulus of contact between the valve 164 and the valve seat 150 was only four- or five-thousandths of an inch. While there is no great tendency for the valve seat to wear since the forces in the system are relatively small, it has been found to be advantageous to chrome plate the valve seat 150.

Just as the force tending to maintain valve bushing 104 in engagement with the valve seat 150 decreases with increasing rotational velocities of shaft 124, so does the force tending to maintain clutch bushing 162 in engagement with the face of shoulder 128 decrease with increasing road speed. This, of course, tends to reduce the frictional force between those elements and tends to permit clutch bushing 162 to slip with respect to shaft 124. Normally, however, no substantial slippage occurs, for as the force tending to maintain the face of head 140 of clutch bushing 162 (FIG. 6) against the shoulder 128 decreases, the force tending to deflect fingers 190 and 192 towards one another and into tighter engagement with the shaft 124 increases. Consequently, the frictional driving relationship between the clutch bushing 162 and shaft 124 is maintained, the fingers 190 and 192 grasping the shaft more and more firmly as the frictional engagement between the head 180 and the shoulder 128 diminishes.

It will be observed, however, that it is desirable that bushing 162 serve as a clutch to accommodate transient rapid changes of angular velocity of the shaft 124 resulting, for example, from twisting and untwisting of the speedometer cable, and to this end the frictional force between clutch bushing 162 and shaft 124 is so selected that under these transient conditions the clutch will slip relative to the shaft.

If a conventional governor is utilized in the system of FIG. 1, the output pressure will tend to vary non-rectilinearly with velocity changes, the relationship approaching a second-degree curve such as that shown at curve 222 in FIG. 7 of the drawings. With the construction illustrated in FIGS. 2–4 of the drawings, the change in output pressure in response to changes in the velocity of rotation of shaft 124 approaches a rectilinear relationship as is illustrated in the representative curve 224 in FIG. 7 of the drawings, permitting a wider range of control than is feasible with conventional governors. Curve 224, of course, represents the relationships at but one setting of the adjusting knob 42, that is, at one preselected governed road speed of the vehicle. The pressure-velocity curves at other settings of the unit will tend to be generally parallel to but spaced from curve 224.

While an explanation of the physical phenomena causing the illustrated governor to produce the indicated output characteristic has not been definitively established, it is the present best theory that these desirable characteristics arise from both the preforming and the nature of the preforming of the spring 160 and from the disparity between the radii of curvature of the spring 160 and of the weights 166 and 168. Each quarter of the spring 160 may be viewed, for analysis, as in the nature of a cantilever-mounted single-leaved spring. Viewing the upper right-hand quarter of spring 160 in the view of FIG. 3, the effective length of that spring is from the point of support of the spring upon the shaft 124 to the point of engagement of the spring with the weight 166. If that spring section acts as a cantilever mounted rectangular-leaved spring, then the extent of its deflection varies in proportion to the force applied thereon and as a function of the third power of the length. It seems clear that whether the spring does conform to this relationship or not, the amount of deflection certainly varies with varying force and, in some relationships, with varying effective lengths. As weight 166 moves outwardly, the portion of the total length of this section of spring 160 (and the other sections act correspondingly) which is in engagement with the curved surface of weight 166 incrementally increases so that the effective length of this section of spring 160, that is, the portion of this spring section which is capable thereafter of deflecting, is progressively decreased. In other words, due to the progressive effective shortening of each of the four constituent sections of spring 112, the effective stiffness of the spring increases with increasing rotational velocities so that the force required to produce the next increment of movement is greater that it was for the preceding increment of motion.

Reference may be made to the above-noted copending applications, the disclosures of which are incorporated herein by reference, for a further discussion of the nature and characteristics of the governor and for a discussion of modifications of the above-described governor structure, one of which will be discussed hereinafter.

In the initial assembly of the governor 24 to the vehicle, the governor body is assembled to the speedometer at an appropriate rotational angle, such as, for example, with the lever 32 approximately perpendicular to the line of the chain 34. Thereafter, final adjustment is made either by changing the effective length of the chain 34 or by changing the rotational position of the knob 42 relative to its shaft, or both.

The pressure controller 56 and the control valve 50, diagrammatically represented in the system of FIG. 1, are presented in more detail in FIG. 8 of the drawings. In the representatively disclosed arrangement, the control valve and the pressure controller are shown formed with a unitary housing casting 239. The pressure controller portion of the housing includes a port 240 which is connectable to the source 23 of reduced air pressure. It is assumed that the source of reduced pressure with which the pressure controller is associated is capable of maintaining a pressure of eleven pounds per square inch absolute or lower under normal conditions, that is, during idling of the engine or during traveling at normal cruising speeds. It will be appreciated that in customary internal combustion engines the absolute pressure in the intake manifold tends to rise above this value and approach atmospheric pressure when the throttle of the vehicle is rapidly depressed to its full open position, particularly when the road speed of the vehicle is low. Under those circumstances the pressure at port 240 rises above the assumed valve so that the pressure controller is unable to maintain the assumed controlled pressure, but advantage is taken of this fact to produce a desirable operational characteristic as will be noted.

The cavity 242 is defined by a portion of the housing 239, by a valve 244 and by a diaphragm 246. The periphery of the diaphragm 246 is sandwiched between an annular surface of the housing and a flange on the cover 248, the cover 248 being secured in place by crimping edges of the body into overlying relationship with the flange thereon. The diaphragm 246 is centrally apertured to accept a projecting tubular portion 250 of a nut 252. The projection 250 is crimped tightly to retain a pair of washers 254 and 256 in place on opposite sides of the diaphragm 246. The internally threaded nut 252 accepts the threaded valve stem 258 which carries the ball valve 244 and supports it in position to engage the valve seat 260. A compression spring 262 operates between a spring seat formed on the housing 239 and the adjacent face of the washer 254 so as to exert a continuing force tending to move the diaphragm in a direction to move the ball valve 244 from its seat 260.

The cover 248 is provided with a central aperture into which a plug 264 is fitted. The plug 264 is provided with a small aperture so that the cavity, defined by the diaphragm 246 and the cover 248, communicates with the atmosphere and hence remains at atmospheric pressure. The end of the valve stem 258 nearest the plug 264 is slotted so that, upon removal of the plug 264, a screwdriver may be inserted through the aperture in the cover 248 and into engagement with the valve stem to rotate that stem relative to the nut 252 to adjust the distance between the ball valve 244 and the diaphragm 246 so as to change the preload height of spring 262 and to adjust the controlled pressure in cavity 242.

As will be seen, the cavity 242 is connected, through restricted and metering orifices to the atmosphere so that the pressure within the cavity 242 tends to rise towards the atmospheric value. The ball valve 244 will consequently open from and close to its seat 260 alternately to connect and disconnect the port 240, with its source of low pressure, to the cavity 242, tending to maintain the cavity 242 at a controlled value under steady operational conditions of the vehicle. As will be discussed in detail hereinafter, with the illustrated unbalanced pressure controller, the controlled pressure, as applied to the control valve chamber or cavity 60, is varied as a preselected function of the variations of the pressure of the intake manifold, to provide, in cooperation with other elements of the system, a degenerative feedback action, as will be described hereinafter.

It has been found that the operational characteristics of the system can be improved by reducing the area of contact between the ball and seat in the pressure controller and the control valve, as by seating the ball against a radiused corner (as in another embodiment to be described) or an angle seat rather than by employing the illustrated spherical seats.

Control valve 50 includes chambers 58 and 60 demarked by diaphragm 64, chamber 58 being connected to the governor 24 by tube 48 and chamber 60 being connected to pressure controller 56 through orifice 54. The diaphragm 64 is trapped between the housing or body 239 and the cover 266 and carries a valve assembly formed similarly to that of the pressure controller 56. Thus, nut 288 includes a projection which extends through an aperture in diaphragm 64 and is crimped over to secure washers 290 and 292 in place on opposite sides of the diaphragm 64. The threaded valve stem 294, carries the ball valve 70 and threadedly engages the nut 288. It is preferred that the axial position of the valve stem 94 with respect to the nut 288 be established during the course of manufacture, but if desired provision may be made for subsequent adjustment similar to that described in connection with the regulator 56, as is illustrated in part by the slotting of the head of screw 294. The valve seat 72 is a part of a bushing 296 which is press fitted or otherwise secured in an extension of the housing 239. It will be noted that the valve seat is fixed with respect to the vehicle and is not connected to and does not move with the throttle 18. It has been found that improved operational characteristics accrue if the area of contact between the ball and seat is reduced over that shown, as by seating the ball against a radiused corner or an angle seat, as above noted in connection with the pressure controller. A compression spring 298 operates between a face of the housing 239 and the washer 290 and tends to maintain ball valve 70 seated against its seat 72.

The diaphragm and valve assembly differs from that utilized in the pressure controller 56 in that an orifice 66 is established interconnecting the control valve cavity 60 and the surge cavity 58. In a constructed embodiment, this orifice had a diameter of about 0.030 inch and was established by drilling a hole somewhat larger than that through the washers 290 and 292 and through the diaphragm 64 and inserting a roll pin or the like therethrough having the desired internal diameter. The roll pin not only establishes an orifice of appropriate size but also insures alignment of the holes in washers 290 and 292 and diaphragm 64 and prevents reduction in the size of orifice 66 as a result, for example, of swelling of diaphragm 64.

The end of the valve stem 294 extends within a cavity 300 in a vent valve 302 which cooperates with a valve seat 304 formed integrally with the body 239. Vent valve 302 controls the communication between the control valve cavity 62 and a cavity 306 which is in communication with the atmosphere through a filter 308.

The vent valve 302 is slidably supported by the bushing 296 by virtue of the provision of three spaced-apart longitudinal fins 310, 312 and 314 (FIG. 9) the outer surfaces of which lie in a cylinder having a diameter approximately equal to the internal diameter of the bushing 296.

The valve stem 294 does not engage the vent valve 302 but is adapted to move within the bore 300 in that valve. However, a spring 316 acts in compression between a spring seat formed by a shoulder of the bore 300 and the adjacent surface of the ball valve 70, acting to force the vent valve 302 away from the ball valve 70 and hence into engagement with valve seat 304. Consequently, chamber 62 is selectively connectable with chamber 60 under the control of ball valve 70 and is selectively connectable to the atmospheric pressure, as it appears in cavity 306, under the control of vent valve 302.

It is to be understood that valve 302 is not an imperative element of the combination but does serve a useful function as a relief valve under certain circumstances to be described. The output port 52, connected to the cavity 62, is connected to the servo cylinder 80 as noted in connection with the description of FIG. 1.

The air pressure acting upon the lower surface of diaphragm or pressure sensing device or actuating means 64 produces a force tending to seat the ball 70. The opposing force acting on the other side of the diaphragm 64 and tending to unseat the ball valve 70 is, of course, determined by the governor output pressure. In a first constructed arrangement, the spring 298 was selected to exert a force in a direction to seat the valve 70 of about one and one-half pounds, which is small relative to the force exerted on diaphragm 64 by the pressure in chamber 60. With both valve 70 and valve 302 on their seats, the vent spring 316 exerts a small force (e.g., 0.05 pound) tending to maintain both valves on their seats.

As was previously described with reference to FIG. 1 of the drawings, when the velocity of the vehicle is below the governed speed, chamber 62 is at about atmospheric pressure. As a result there is a force acting in a direction tending to close the valve 70 equal to the product of this pressure times the area of the aperture which is closed by the valve. Similarly, there is a force exerted upon the valve 70 in a direction tending to open that valve equal to the pressure in the chamber 60 times the effective area of the valve 70 upon which that pressure can act.

The pressure established by pressure controller 56 and the characteristics of the governor are selected so that the governor will produce a selected range of pressure variations in the control valve chamber 58 over the desired range of vehicle road speeds. The other system parameters are then selected so that the resultant force on the valve 70 will reverse direction, at each setting of the governor, at some point in the range of pressure variations in the chamber 58. Thus, the curve 224 illustrated in FIG. 7 shows the pressure variation at the governor and hence at the control valve chamber 58 with variations in road speed from 25 to 65 miles an hour for a governor setting of 50 miles per hour, curve 224 representing, as above noted, but one of a large family of approximately parallel curves. In practice, it has been found to be desirable to have this change of direction of resultant force occur a few miles an hour below the controlled speed, e.g., for a controlled speed of 50 miles an hour, the cross-over may occur at about 46 to 47 miles per hour. Below that speed, the pressure in chamber 58 is lower than the critical value so that the valve 70 is maintained upon its seat 72. It will be observed that the spring 316 opposes the movement of the ball 70 in its unseating direction with an increasing force the further the ball 70 moves from its seat, and in the above noted first constructed arrangement, the spring force increased from about 0.05 pound with the ball 70 fully seated to about 0.3 pound when the ball was fully unseated.

Below the set speed, with the valve 70 closed, there is pressure equality between the two chambers 92 and 98 of the cylinder 80 (FIG. 1). As the velocity of the vehicle is increased by depressing the throttle 22 to open the carburetor 16, the slack in the chain 102 is taken up, and the piston 90 is or may be (depending upon the initial position of piston 90) moved to the left. If this movement is not abrupt, effective pressure equilibrium will be maintained by virtue of the flow of air through orifice 100. If the throttle 22 is changed in position abruptly, so that piston 90 is drawn to the left abruptly, the size of the orifice 100 may not be adequate to establish equilibrium rapidly enough so that the action of the piston will not be detected. If in any given design the cylinder 80 does tend to affect the motion of the throttle 22 in the range of road speeds below the selected road speed, the condition can be avoided, if desired, by the provision of the vent valve 302 which is set to open (assuming the control valve 70 to be closed) whenever the pressure in chamber 62 and hence in chamber 98 is, for example, one pound per square inch below atmospheric pressure. The opening of vent valve 302 establishes pressure equilibrium on the two sides of the piston head 90 thereby preventing that piston from having any detectably significant effect upon the movement of throttle 22 below the controlled speed.

When the automobile's velocity has been increased to the controlled value, control valve 70 is opened to establish communication between the chamber 60 in the control valve 50 and the cylinder chamber 98 via the tubing 76 and the chamber 62. As a result, in the noted first constructed arrangement, a pressure differential in the order of three and a half pounds per square inch will tend to exist across the piston head 90. However, if the position of the throttle 22 is correct for that speed so that there is no further tendency for the car to increase in road velocity, the air flow from the atmosphere through cylinder chamber 92, orifice 100, chamber 98 past the control valve 70 and through the pressure controller will tend to reduce this pressure differential by raising the pressure in chamber 98 and hence in chambers 62 and 60. Any increase of pressure in chamber 60 above the selected value will, of course, tend to result in the closure of valve 70 so that with the throttle 22 in the correct position for that road speed the valve 70 will be in an incipiently opening and closing condition and the pressure differential across the piston head 90 will not be such as to force the throttle 22 away from its selected position. However, in order for the throttle 22 to be moved in a direction to increase the velocity of movement of the automobile above the governed velocity, the piston head 90 must be moved to the left. This leftward movement of piston head 90 will result in a transient reduction in the pressure in the cylinder chamber 98 so that the piston 90 will transiently oppose that advance of the throttle 22. It will be observed, however, that this system will not prevent such movement of the throttle 22 but will only add a force to that of spring 104 making it more difficult for the operator to advance the throttle 22 beyond the appropriate position for the set governed speed.

If the operator advances the throttle despite the transient opposing force in an effort to increase the road speed of the vehicle above the set value, the pressure in control valve chamber 58 will rise and the ball valve 70 will be further opened, reducing the pressure differential between chambers 60 and 62 and producing a pressure in cylinder chamber 98 which is less than that in chamber 92 and which remains less since the velocity of air flow through the orifice 100 is not adequate to establish pressure equality under these conditions. As a result, a force is exerted aiding that of spring 104 tending to move the throttle 22 to its released position. The magnitude of this force may be selected in design at any appropriate value, with an increased force in the order of four to six pounds being found to be satisfactory in practice. The operator may cause the vehicle to move at a velocity greater than the controlled rate, but he will have to exert a preselected amount of additional force upon the throttle 22 to maintain the vehicle at that increased rate. If the operator does not maintain the requisite additional force, the throttle 22 will move towards its released position until the velocity of the vehicle has again reached the set value.

With the vehicle traveling above the set speed so that valve 70 tends to be open, the force exerted by spring 316 in the vent valve 302 is increased so as to prevent the vent valve from opening the vent even though the pressure in chamber 62 falls substantially more than one pound per square inch below atmospheric pressure. In practice, the increase in spring force is such that vent valve 302 will not open, with ball valve 70 open, unless the pressure differential is in the order of six pounds per square inch. Therefore, if the operator depresses the throttle 22 abruptly, so as rapidly to move piston head 90 to the left and create an additional pressure reduction in chamber 98 and hence in chamber 62, vent valve 302 may open, establishing an upper limit to the total additional force which the driver must apply to override the governing system.

Since the intake manifold absolute pressure in an internal combustion engine rises toward atmospheric if the throttle is advanced to its full open position at relatively low road speeds, it will be observed that the governing system cannot only be overridden if the need arises, but in an emergency situation in which the driver advances the throttle 22 to its full open position, that increase in absolute manifold pressure will close valve 70 to effectively transiently disable the governing system so that effectively no force additional to that provided by spring 104 is required to maintain the throttle 22 at its full open position to permit rapid acceleration of the vehicle.

Curve 322 in FIG. 7 of the drawings, which is based upon the above noted first constructed arrangement, illustrates the changes that occur in the pressure in chamber 98 of cylinder 80 with changes in road speed, assuming that the throttle 22 is not moved abruptly. In the representatively disclosed arrangement, a pressure differential begins to exist between the two sides of the piston at a speed several miles an hour below the selected speed. For example, with a set speed of 50 miles an hour, a detectable pressure differential may begin to exist at a speed as low as 45 miles per hour, although this is a design consideration which may be readily modified.

The governing system has been found to be highly useful in the driving of vehicles on modern limited-access freeway and turnpike driving. The driver may manually set the governor to the established speed limit or to any other selected value and rest the weight of his foot upon the accelerator pedal so that the force applied to the throttle exceeds that necessary to overcome the throttle return spring 104 but is less than the sum of the force of that spring and the additional force imposed by the cylinder 80. The vehicle, assuming proper calibration of the system, will assume the selected speed and there remain, with the operator of the vehicle being able to vary the pressure of his foot upon the throttle within substantial limits without changing the velocity of the vehicle. It has been found that as the vehicle goes down grade and tends to pick up seed, the throttle will detectably move upwardly, moving the driver's foot therewith, to maintain the vehicle speed at the selected value, and, conversely, when the vehicle's road speed tends to fall during ascent of a hill, the throttle may be felt to move downwardly under the relatively constant force exerted by the operator to again maintain the vehicle at the selected speed.

It will be observed from the foregoing that the governing or speed sensing means or speed transducer assembly 24 is connected to the speedometer cable or rotatable element 14 to sense the velocity of rotation thereof, constituting an actual vehicle or unit speed input to the governor or transducer assembly 24. The output signal produced by the sensing means is controlled by the manually settable means including the knob 42 by means of which the nominal controlled velocity of rotation of the speedometer cable 14 is selected which, of course, is reflected as a nominal controlled velocity of the vehicle or engine. The adjustment of the governor or transducer 24 by the knob 42 constitutes a selective desired speed input thereto. When the sensed velocity of rotation of element 14 is the same as the nominal controlled velocity of rotation of element 14 as selected by the means including knob 42, i.e. when the vehicle is traveling at the selected road speed in the illustrated arrangement, the governor produces a preselected output signal, represented, in the illustrated embodiment, by a preselected fluid pressure in chamber 58. When the sensed velocity of rotation of element 14 differs from the selected nominal controlled velocity of rotation of that element, over a preselected range of such variations, the output or error signal varies in accordance with the direction and magnitude of that difference, as is illustrated, for example, in curve 224 in FIG. 7 (and in the governor curve of FIG. 25, to be discussed).

Thus, the speed sensing governor 24 varies the average differential fluid pressure which is applied to the control valve 50 effectively as a continuous function of the magnitude of the deviation of the rotational velocity of the rotatable element 14 from the selected velocity over a range of such variations. As above noted, and as is illustrated in curve 224 in FIG. 7 (and similarly in the governor-pressure curve of FIG. 25, to be discussed hereinafter), the relationship is effectively rectilinear over a range of variation for any given selected speed, that is, the output of the governor or speed sensing means is effectively proportional to the speed change in that range and the governor or transducer produces a continuously variable proportional control speed error signal throughout the range or zone of proportional speed control. Similarly, the control valve is effective, over a range, to vary the pressure applied to the servo or actuator chamber 98 in accordance with the air-pressure-differential applied to the valve by the governor, as is illustrated, for example, in FIGS. 7 and 25.

However, if the sensed speed is sufficiently below the set speed, the output signal of the governor 24 reaches a value at which the valve 70 is and remains closed, an underspeed error signal output, and conversely when the vehicle is traveling sufficiently above the set speed, the output signal from governor 24 changes to a value at which the control valve 70 tends to remain fully open, an overspeed error signal output, as above discussed and as illustrated in FIG. 7 of the drawings. The control valve, of course, changes the effective fluid pressure in the servo chamber 98 in direction and magnitude from a selected fluid pressure (such as the above indicated three and one half lbs. per square inch) in accordance with the changes of that output signal from the preselected value thereof. When the valve is fully closed, chamber 98 is disconnected from the source of vacuum and hence rises to atmospheric value, as a limit, and conversely, when the valve 70 is wide open, there is a maximum reduction of pressure below atmospheric value in chamber 98, to a limit value, commensurate with the intake manifold pressure conditions. Thus the governor or speed transducer assembly 24 establishes a controlled speed magnitude zone of proportional speed which is of less speed magnitude than the magnitude of the speed unit or vehicle variation and, in fact, as indicated elsewhere herein, the preferred zone of proportional speed is in the order of a few miles an hour to each side of the selected or unit speed input and is substantially centered thereon, that is, the range of effective control extends to each side of the selected speed. Of course, the control speed magnitude shifts as the selected speed is changed.

The apparatus including the control valve or pressure control valve assembly 50, the servo or pressure unit motor zone 80 and the interconnecting tube 76 may be considered to constitute a unit or vehicle speed control mechanism which is connected to the governor or speed transducer assembly 24 to receive and respond to the signal output of that governor as it appears in chamber 58. That unit speed control mechanism has two different pressure inputs, one being the vacuum input to chamber 60 at the outlet of passage 54, for example, and the other being an atmospheric pressure input via orifice 100, for example. The output pressure of the unit speed control mechanism appears at chamber 98 and, as above discussed, varies as a function of the proportional speed error signal appearing in chamber 58. In the controlled speed magnitude zone of proportional speed, the output pressure in chamber 98 is intermediate and continuously variable between those two (vacuum and atmospheric) pressure inputs when the proportional control speed error signal appears at chamber 58. See FIGS. 7 and 25. As noted, when the overspeed error signal is received, valve 70, which serves as a proportional control mechanism, is fully unseated from valve seat 72, that is, it is at a fully open limit condition, so that the pressure in chamber 98 is substantially equal to the source of pressure at the outlet of passage 54 and when the overspeed error signal is received at chamber 58, valve 70 is effectively fully closed, that is, at its fully closed limit condition, so that the pressure in chamber 98 is equal or substantially equal to atmospheric. It will be observed that the proportional control speed error signal appearing at chamber 58 differs from the underspeed error signal in one sense or direction, and that the overspeed error signal differs in magnitude from the proportional error signal in that same sense, that is, in the same direction. The servo or motor 80 includes a piston 90 which is responsive to the pressure in chamber 98 and is, as illustrated, adapted to be connected with the unit speed controller 18 by linkage 102.

An improved system is illustrated in FIGS. 10–24 of the drawings. In addition to other features, this improved system has the capability not only of controlling the vehicle semi-automatically, in a manner similar to that above discussed with the system of FIG. 1, but also of controlling the vehicle on a fully automatic basis in which the driver does not need to exert any force on the accelerator pedal to control the speed of the vehicle.

In general, the system of FIGS. 10–24 comprises a rotational-speed-responsive pressure modulating valve (FIGS. 10–12) driven by the vehicle's speedometer cable, a manual controller (FIGS. 13, 14) for setting the control speed of the governing arrangement of FIGS. 10–12 as well as for controlling whether the system will or will not be placed in operation and whether the operation will be on a semi-automatic or a fully-automatic basis, a pressure controller and control valve assembly (FIGS. 15–17) which is coupled to the intake manifold of the internal combustion engine of the vehicle and which is controlled by the governing arrangement of FIGS. 10–12 and by the manual controller of FIGS. 13 and 14, and which, in turn, controls a servo (FIGS. 18–24) which is coupled to the throttle and accelerator pedal of the automobile and which is capable of exerting a unidirectional force thereon during semi-automatic or speed warning operation (as in the previously described arrangement) and capable of bidirectionally applying forces thereto during full automatic operation. The system operates as a speed control system in both cases, being specifically characterizable as a speed warning control system in the semi-automatic mode of operation and as a speed maintaining control system in the fully-automatic mode of operation.

In semi-automatic operation, the governing arrangement of FIGS. 10–12 modulates air pressure in accordance with the deviations of the road speed of the vehicle (as reflected in the rotational speed of the speedometer cable) from the preselected value as set by the manual controller of FIGS. 13 and 14. This modulated air pressure is applied to the assembly of FIGS. 15–17 on a fluid-dynamic basis to control the magnitude of the pressure differential applied to the servo of FIGS. 18–24 and thereby to control the reactive force applied against the driver's foot. This reactive force will first be applied as the vehicle approaches the selected road speed and will thereafter oppose any effort of the driver to depress the accelerator pedal beyond the position necessary to maintain the selected road speed. As in the system of FIG. 1, the reactive force applied to the driver's foot will be modulated over a range as necessary to compensate for varying foot pressures applied by various drivers. In the event that the driver wishes or needs to accelerate rapidly beyond the set speed, he may do so without effectively fighting the reactive force normally exerted by the system by opening the throttle wide as by flooring the accelerator pedal. When the throttle opening is thereafter reduced to three-quarter opening or less the system will resume its semi-automatic control of the vehicle speed.

In order to place the equipment in fully automatic operation, the manual controller of FIGS. 13 and 14 is appropriately actuated to cause the servo of FIGS. 18–24 to be effectively locked to the throttle linkage for bi-directional control thereof, and to cause the fluid-dynamic system including the assembly of FIGS. 15–17 and the servo of FIGS. 18–24 to be appropriately modified for optimum fully-automatic operation. In fully-automatic operation, the system will maintain full control of the road speed of the vehicle until disabled in any of a number of ways to be described.

In the modified form of air-pressure controlling rotational-velocity responsive mechanism illustrated in FIGS. 10 through 12 of the drawings, the body means comprises a hollow main body portion 400, which may, for example, be a die casting, and an end body portion 402 having a centrally apertured fitting portion 28' and a radially extending flange portion 404 terminating in a peripheral bead 406 which is secured in an inner annular groove 408 formed in the main body portion 400 as by crimping an end flange 410 of the body 400 thereover. A shaft 124' has a support portion 412 journaled within the bore in the end body portion 402, a circular cylindrical central portion 414, and a squared end portion 416 disposed coaxially within the central aperture in a fitting portion 418 of the main body portion 400. Portion 412 of shaft 124' is provided with an internal squared recess (such as that shown in FIG. 3) to accept the squared end of the core of a speedometer cable, and fitting 28' is externally threaded to accept the nut at the end of the casing of a conventional speedometer cable assembly. Squared end portion 416 of shaft 124' is engageable with a squared recess in a speedometer head and fitting portion 418 is externally threaded to accept the rotatable securing nut on conventional speedometer heads.

The left-hand end of the portion 412 of shaft 124' is flared over a bearing element 420 which engages a bearing washer 422 abutting the end of the end body portion 402, thereby restricting movement of shaft 124 to the right relative to the end body portion 402. To limit movement of the shaft 124' to the left relative to the end body portion 402, a radial flange 424 on shaft 124' bears against an annular resilient sealing and bearing washer 426 which abuts the inner end face of the end body portion 402. Annular seal 426, which is desirably formed of a good bearing and sealing material such as Teflon, is clamped in position by means of a clamping ring 428 which is retained in position by crimping or staking a portion of the main body portion 402 over it at a plurality of points such as at 430.

In the preferred practice, the end body portion 402 is provided with a central, axially projecting annular seat 429 to establish an offset between the mounting plane of the clamped portion of seal 426 and the plane of the inner portion of that seal. As a result, seal 426 tends to cup, and exert forces tending to force the central portion thereof into intimate sealing engagement with flange 424 and to exert a force on flange 424 biasing shaft 124' to the right.

Disposed upon the central circular cylindrical portion 414 of the shaft 124' is a rotatable sub-assembly 158' comprising a generally annular spring 160', a clutch bushing 162', a valve bushing 164' and a pair of weights 166' and 168'. This sub-assembly is similar to sub-assembly 158 previously described in connection with FIG. 3 of the drawings and will not be redescribed except to note that in this case the valve portion or bushing 164' is provided with a generally annular flat face 432.

Face 432 of valve bushing 164' cooperates with and engages a narrow peripheral lip adjacent a central aperture in a valve seat portion 434 which is supported by and preferably formed integrally with a circular support diaphragm 436 provided with a plurality of circular rigidifying steps and terminating in an annular bead 436 which snaps, with an interference fit, in an annular groove 440 formed on the interior surface of the main body portion 400. In the preferred practice, the bead 436 is further provided with a small peripheral projection 442 engaging a correspondingly shaped recess in the groove 440 to improve the sealing and locking engagement between the bead 438 and the main body portion 400.

It will be observed that while element 164' has been characterized as a valve portion and element 434 has been characterized as a valve seat portion, the provision of the valve lip upon the valve seat portion 434 in the arrangement of FIG. 10, while the peripheral lip in the arrangement of FIG. 2 is disposed upon the portion 164, emphasizes and illustrates that either of the two cooperating elements may properly be considered the valve and the other valve seat. Reversal of these parts is within the contemplation of the invention and it is intended that the terms valve and valve seat may each be used interchangeably with the other.

The centrally apertured valve seat portion 434 is provided on its right-hand surface with a chisel-shaped bearing surface 444 as illustrated in FIGS. 10 and 11, to define a knife-edge bearing. Bearing 444 engages the tips of the two spaced-apart leg portions 446 and 448 (FIG. 11) of a lever 450. It will be observed that the leg portions 446 and 448 are spaced-apart to form a yoke which straddles but is spaced from the shaft 124'.

Lever 450 is a rotatable member having an aperture therein seating upon the conical tip of an adjustable pivot screw 454 which is threaded in a side wall of the main body portion 400. Lever 450 terminates at its upper end in a narrow circular cam follower portion 456. In the illustrated arrangement, lever 450 is a steel stamping with the upper portion thereof being twisted 90° to form the cam follower portion 456, but may be otherwise formed or constructed.

The cam follower portion 456 of the lever 450 lies between and is spaced from a pair of depending arms 458 and 460 (FIGS. 11 and 12) formed upon an upper body portion 462 which is or may be a die casting and which is secured to the main body portion 400 by means of a plurality of screws including screws 464 and 466 which pass through apertures in flange portions formed upon the upper body portions 462 and engage threaded sockets in the main body portion 400.

Depending arms 458 and 460 are formed to define a circular cylindrical ball guide channel 468 which closes at the bottom to a gap which is less than the diameter of the channel but wider than the thickness of the cam follower portion 456. Ball guide channel 468 communicates with a cavity 470 (FIGS. 10 and 12) formed in the upper surface of the main body portion 400. An upstanding boss 472 (FIG. 12) formed integrally with the upper surface of the main body portion 400, is provided with a planar crank-stop face 474 and a planar ball-locating face 476, the latter of which is aligned with the edge of the ball guide channel 468 to form an effective continuation of that edge surface and also serves as a crank-stop face.

A camming element 478, in the form of a ball, is disposed in the ball guide channel 468 and is located in its leftwardmost position (as illustrated in FIGURES 10 and 12) between the ball locating surface 476 and the edge of the depending leg portion 458 which extends to the left (FIG. 12) of the right-hand edge of the boss 472. The camming element 478 abuts a crank arm 480 lying within the cavity 470 and secured to and preferably formed integrally with an annular flange 482 the upper surface of which bearingly engages the under surface of the upper body portion 462. A portion of the under surface of flange 482 overlies and guides the camming element 478.

A cylindrical crankshaft 484 extends upwardly from and is formed integrally with the flange 482 and is mounted in a bore 486 formed in the upper body portion 462 for rotation about an axis eccentric to the center line of the crank arm 480. Crankshaft 484 is provided with a longitudinal socket for accepting the squared end of a flexible shaft core 488 and is preferably staked or otherwise rigidly secured thereto. The casing 490 of the flexible shaft is inserted within the upper end of the recess 486.

The support diaphragm 436 is preferably resilient or springy and capable of developing an appreciable force, and in the preferred practice is made of a suitable plastic such as nylon. The stepped wall portion may be quite thin, as five- or six-thousandths of an inch in thickness. Even with the elements in their illustrated extreme positions, the valve seat portion 434 is displaced to the left of its free position so that the support diaphragm 436 is pretensioned and is exerting a substantial force to the right (in the view of FIG. 10) against the lever 450, tending to rotate the lever 450 in a counterclockwise sense (in the view of FIG. 10) about the pivot 454 thereby exerting a force tending to maintain the cam follower 456 in engagement with the camming element 478 and tending to maintain the camming element 478 in continuous engagement with the crank arm 480. Thus, the crank, the camming element 478, and the lever 450 serve as a limit stop to establish the position of the valve seat portion 434.

The right-hand face of the end body portion 402, a portion of the inner surface of the main body portion 400 and the support diaphragm 436 serve to define a chamber 492 within which the governor sub-assembly 158' is disposed. Chamber 492 communicates through a passageway 494 formed in the main body portion 400, through a passageway 496 formed in the upper body portion 462 and through an air connection pipe 498 wtih a source of reduced air pressure through a controlled valve ro device which, for pressure modulation action of the disclosed mechanism, is assumed to have a flow-restricting orifice therein so that the pressure in chamber 492 will, under dynamic conditions, differ from the source pressure.

The right-hand face of the support diaphragm 436 is exposed to atmospheric pressure through a passageway 500 formed in the main body portion 400 and through a passageway 502 formed in the upper body portion 462 and preferably filled with a filtering material 504. With the sealing arrangement illustrated, air flows from the atmosphere into the chamber 492 and out of the air connection 498 effectively exclusively through the pneumatic valve means including the valve portions 164' and 434.

In the illustrated limit position of the equipment, the support diaphragm 436 is not only pretensioned but also, in the preferred practice, the valve face 432 is so located at this position of the equipment that spring 160' is pretensioned and exerting a force tending to move the valve portion 164' to the right and into engagement with the valve seat portion 434.

In a manner similar to that above described in connection with FIG. 3, during operation of the device, the effect of the centrifugal force upon the weights 166' and 168' resulting from rotation of shaft 124' is to reduce the magnitude of pretensioning force exerted by spring 160' upon the valve portion 432, admitting atmospheric air into the chamber 492 and via the air connection 498 to modulate the pressure within the chamber 492 in accordance with the rotational velocity of shaft 124'. As was previously noted, the governor serves to modulate pressure in accordance with vehicle speed, and in accordance with the governor setting. The relationship between governor pressure (in inches of water absolute) and the vehicular speed for the governor of FIGS. 10 through 12 is illustrated in FIG. 25 of the drawings, a curve which is similar to the pressure versus velocity curve 224 illustrated in FIG. 7 of the drawings for the governor of FIG. 3 of the drawings. It will be observed that the curve is majorly rectilinear and has an appreciable slope so that change in the road speed of the vehicle will produce a corresponding significant change in the governor pressure.

In the illustrated position of the crankshaft 484 and of the elements controlled thereby, a preselected relationship will exist between the pressure in chamber 492 and the various rotational velocities of shaft 124', as is illustrated in FIG. 25. This relationship may be shifted, in order to select the speed at which control will be exerted, by manually rotating core 488 by any suitable means such as by the manual controller to be described. When the core 488 is rotated so as to rotate the crankshaft 484, crank arm 480 is rotated about the rotational axis of crankshaft 484 to move the camming element 478 to the right in the view of FIGS. 10 and 12, to thereby rotate lever 450 in a clockwise direction about the pivot 454 and hence to move the valve seat portion 434 to the left (FIG. 10). As a result the pretensioning force exerted upon spring 160' is increased.

As is best illustrated in FIGS. 11 and 12, it has been found that an improved relationship between changes of the angular position of crankshaft 484 and the pressure in chamber 492 can be achieved by mounting the caming element 478 and cam follower 456 to one side of the longitudinal axis of the crankshaft 484.

In order to calibrate the unit, the pivot 454 is illustrated to be adjustable and calibration can be accomplished by driving shaft 124' at a preselected speed and adjusting pivot 454 until the air pressure at air connection 498 reaches a preselected value. Alternatively it is contemplated that pivot 454 be fixed and that calibration be accomplished by rigidly supporting main body portion 400, by rotating shaft 124' at a preselected speed, and by exerting an axial force upon the end body portion 402 so as to bend and deflect the reduced cross sectional area sections of the flange portion 404 and thereby to change the distance between the valve seat portion 434 and the right hand face of the flange 424 so as to change the pretensioning of spring 160' to produce a preselected pressure at air connection 498.

As was above noted, the support diaphragm 436 is pretensioned and resiliently exerts a substantial force to the right sufficient to hold lever 450 upon its pivot 454 and to maintain cam follower portion 460 in engagement with camming element 478 and camming element 478 in engagement with crank arm 480. This resilient force is also such that the support diaphragm will not deflect significantly to the left in response to the establishment of an air pressure differential thereacross. It will be recalled that support diaphragm 436 further serves as a seal and constitutes a portion of the wall of chamber 492. By virtue of its construction, it further serves to maintain the valve seat portion 434 centered.

The improved manual controller illustrated in FIGS. 14 and 15 of the drawings is adapted to control the assembly illustrated in FIGS. 15 through 17, to be responsive to indications received from that assembly, and to control the governor of FIGS. 10 through 12.

The manual controller comprises a generally cup shaped housing 510 secured to the vehicle's instrument panel in any suitable manner. Housing 510 is open at the rear and has an aperture 512 in its forward face journaling a rotatable body member 514. Body member 514 is secured against longitudinal movement relative to the housing 510 by means of a snap-ring 516 engaging an annular groove in a forward projection of the body member and abutting the outer face of the housing 510, and a spring washer 518 is disposed between the inner face of the housing 510 and an annular shoulder 520 on the body member 514. A knob 522, secured upon the projecting portion of the body member 514, is manually rotatable to rotate the body member 514 about axis 523 relative to the housing 510, and carries an integral pointer portion 524 cooperating with a calibrated dial 526 to indicate the selected speed to the driver.

Dial 526 bearing the calibration marks on the outer or right hand face thereof, is an opaque member secured within the housing 510 adjacent a pair of apertures 528 and 530 in the forward or right hand face of that housing. A thin, plastic, colored lens 532, mounted behind aperture 528 in alignment with an aperture in the dial plate 526, is adapted to transmit light from a bulb 534 disposed in a socket 536 which is supported by means of a plurality of radially disposed forwardly projecting spring fingers 538 which snap through a circular aperture in a rear plate 540 secured to the housing 510. As will be seen, input conductor 542, connected to the socket 536 and hence to one end of the filament of the bulb 534, is connectable to a source of potential (such as the vehicle's battery) under the control of the regulator and control valve assembly of FIGS. 15–17 to complete an energizing circuit for the bulb 534 to ground through plate 540 and the housing 510 to signal the driver of the existence of a condition to be described. A bulb 544, mounted in a socket 546, serves as a dial light and is preferably energized whenever the instrument panel lights on the vehicle are energized and, to that end, may be connected in parallel therewith.

Light from the lamp 534 is channelled to the colored filter 532 and prevented from unduly spreading by means of a shielding tube 548 (FIGS. 13 and 14) extending between the plate 540 and the dial plate 526 and the bulb 544 is similarly shielded by a tube 550. The light from the bulb 544 passes through a slot 552 at the lower edge of the dial plate 526 formed by lancing and deflecting a portion of the dial plate out of the plane of the remaining portion of that dial plate. These rays then pass upwardly (FIG. 14) over the outer surface of the dial plate 526 within the aperture 530 to illuminate the numbers or other indicia marked upon that dial plate.

The core 488 of the control cable illustrated in FIG. 14 of the drawings extends into a blind bore 554 formed in the body 514 coaxially with the rotational axis 523 of that body. Set screw 556 secures core 488 against rotation relative to body 514. The casing 490 of the control cable is inserted through an aperture in an insulating plate 558 which is secured to the body 514 by means of a fitting 560 which is threaded in a passageway 562 formed in the body 514.

Communication between passageway 562 and passageway 564, which communicates to the atmosphere through an air filter 566, is controlled by a plunger 568 disposed in a longitudinal bore in the body 514 which is coaxial with the rotational axis 523 of that body. Plunger 568 is provided with a rubber end seal 570 sealingly engageable with a seat formed in the bore in the body 514 and surrounding an axially projecting spring guide 572 projecting axially of the plunger 568. A biasing spring 574 seats against an end wall 576 of the bore in the body 514, acts against the seal 570, and surrounds the guide 572. Spring 574 acts in compression and continuously exerts a force tending to move plunger 568 to the right in the view of FIG. 14.

Plunger 514 is provided with a circumferential groove 578 to accept a detent 580 slidably disposed in a transverse bore in the body 514. The outer end of detent 580 engages the free end of a cantilevered bimetallic spring element 582 the other end of which is bent 90° and trapped between the insulator 583 and the body 514 and held in place by the fitting 560. An electrically insulated heater wire 584 is disposed in heat transfer relationship with a bimetallic spring element 582 and one end thereof is electrically connected to the bimetal and hence to body 14 and to the metallic portions of the vehicle. The other end of wire 584 is connected via connector 586 to an insulated conductor 588. As is schematically illustrated in FIG. 14 of the drawings, conductor 588 is intended to be connected through a switch 590 and then, in series, through the ignition switch 592 to a source of potential 594 which may be and preferably is the vehicle's battery. Switch 590 is physically connected to the shifting lever system of the vehicle in a manner such that it is open at least when the shift lever is in neutral and is closed at least when the shift lever is in the high or drive position. When both the switch 590 and the ignition switch 592 are closed, the heater 584 is energized and the resultant heating the the bimetallic spring 582 causes that element to deflect its free tip upwardly to exert a force tending to move detent 580 upwardly, for a purpose to be noted. Additional or alternative switches could also be utilized. For example, an additional series-connected switch could be opened in response to the disengagement of the clutch in a vehicle with a standard transmission.

In utilizing the manual controller, the driver rotates the knob 522 until the pointer 524 is directed to the indicia upon the dial 526 representing the speed at which he wishes to drive. During this rotation, body 514 is rotated relative to the housing 510 about axis 523 to correspondingly rotate the core 488 to adjust the governor (FIG. 10). If knob 594, secured to the projecting end of plunger 568, is pulled out by the driver, camming detent 580 downwardly in the process, an air-flow path is established from the atmosphere through filter 566, through passageway 564, through passageway 562 and fitting 560 to a tube 596, T 598 and to a tube 600 which extends to the regulator and control valve assembly illustrated in FIGS. 15–17 of the drawings. As will be explained hereinafter, under this condition, the system will operate on a semi-automatic basis, exerting a force upon the driver's foot tending to cause him to restrict the vehicle's speed to the selected speed in a manner similar to the operation of the system of FIG. 1 as previously described.

However, if the driver depresses the knob 594 to move the plunger 568 to its illustrated position, the previously described air-flow path is blocked so that no air will flow through tube 600 and the system will be converted to fully automatic operation in which the vehicle's speed will be maintained even though the driver removes his foot from the throttle, in a manner to be described.

In the arrangement illustrated in FIG. 14, the system will be transferred from automatic to semi-automatic operation if the ignition switch is turned off, if the shift lever is moved to its neutral position, or if the brake pedal is partially depressed. Thus, the plunger 568, once depressed, is held in its depressed position, despite the force exerted by spring 574, as a result of the engagement of the detent 580 with the annular groove 578. However, if either switch 590 or ignition switch 492 is opened to de-energize the circuit for heater 584, the bimetallic element 582 cools so that its free end tends to deflect downwardly to reduce the force between detent 580 and groove 578 to permit spring 574 to force plunger 568 to the right, thereby separating seal 570 from its seat and establishing an air-flow path through passageway 562 and hence through tube 600 to switch the system back to semi-automatic operation. Valve means 602 is preferably mounted in a position to be controlled by the brake pedal 604 to admit air via tube 606 to T 598 and hence to tube 600 whenever the brake pedal 604 is even partially depressed. The system may also be switched from full automatic operation to semi-automatic operation simply by pulling knob 594 out and the system may be effectively disabled by rotating knob 524 to an "Off" position which is beyond the maximum velocity of the vehicle.

The assembly illustrated in FIGS. 15 through 17 comprises a main body 610 having a pressure controller chamber 612 (FIG. 16) formed in one end, and a control valve chamber 614 formed in the other end. A passageway 616 formed within the body 610 is connectable via a fitting 618 to the intake manifold of the internal combustion engine of the vehicle, and communicates with a short longitudinal passageway 620 also formed in the body 610. Passageway 620 terminates in a narrow chamfered or reversed-radiused valve seat which is engageable by a ball-type valve 622 (preferably made of rubber or plastic) which is retained within a central aperture in a flexible diaphragm 624 by means of a diaphragm support washer 626 the inner lip of which is crimped over a diaphragm clamp washer 628. The peripheral edge of the diaphragm 624 is clamped to the upper rim of the body 610 by means of a cap 630 the edges of which are crimped under a peripheral flange 632 formed upon the body 610. The chamber 636, defined by the cap 630 and the upper surface of the diaphragm 624, is maintained effectively in atmospheric pressure by the provision of a passageway 638 formed in the cap 630. Passageway 638 is preferably small to dampen any oscillatory or pumping tendencies.

The cap 630 is centrally apertured to accept an insulating bushing 640 which carries a pair of contacts 642 and 644 which can be bridged by a metallic contact element 646 attached to the top surface of the valve 622.

Diaphragm 624 is biased upwardly by a spring 648 which acts against the support washer 626 and may be guided by a spring-guide tab 650 lanced downwardly from the support washer 626.

The pressure controller acts in a manner similar to that previously discussed. With the engine running so that the air pressure in the passageway 620 is reduced below atmospheric, and with spring 648 having forced valve 622 from its seat to reduce the air pressure in the cavity in the chamber 612, the forces acting upon the diaphragm and valve tend to equilibrize at a condition which will cause the pressure in chamber 612 to remain at a controlled value, subject to the compensatory action hereinafter to be described. If the absolute pressure in passageway 620 rises beyond a certain value, due to reduction of the manifold vacuum resulting, for example, from rapid acceleration of the vehicle, the valve 622 will rise sufficiently to cause contact 646 to bridge contacts 642—644 so as to complete an electrical circuit from the source of potential 589 through the ignition switch 592, contacts 642—644, and to conductor 542 to energize the bulb 534 in the manual controller (FIG. 14). This signal indicates to the driver that the vehicle is being accelerated so rapidly that the speed controlling system will not come into effective operation.

The control valve chamber 614 is bounded at one side by a valve seat and seal member 652 which is preferably of plastic and which makes good sealing engagement with the body 610, desirably being of nylon or the like and having an interference fit with the body 610 around its outer periphery. The seat 652 is centrally apertured and cooperates with a valve 654 which is secured on a valve stem 656. Valve 654 is desirably molded or otherwise formed of a plastic such as rubber or nylon and may, for example, be snapped onto a grooved portion formed in the stem 656. A clinch nut 658, having a plastic locking insert 660, is secured upon the valve stem 656 and is clamped in the central aperture of an assembly comprising a flexible diaphragm 662, a diaphragm support washer 664 and a diaphragm clamp washer 666. The peripheral edge of the diaphragm 662 is clamped in sealing engagement with the lower rim of the body 610 by means of a control valve cap 668 the peripheral edge of which is crimped over an annular flange 670 formed upon the body 610. The cap 668 is secured, adjacent the central aperture therein, to a fitting 672 to which the tube 498 is connected which extends to the governor (FIGS. 10–12). The chamber 674 defined by the diaphragm 662 and the cap 668 is maintained effectively at the pressure inside of the cavity or chamber 492 in the governor (FIG. 10) and control valve chambers 614 and 574 are interconnected by means of an orifice formed by a hollow eyelet 671 extending through an aperture in diaphragm 662 and crimped to members 664 and 666. This orifice may have a diameter, for example, of 0.045 inch.

The diaphragm 662 is biased downwardly in the view of FIG. 16 by means of a compression spring 676 acting against the support washer 684 and against valve seat 652. If desired, a plurality of spring-guide projections such as projection 678 may be formed integrally with the valve seat 652.

The valve 654, cooperating with valve seat 652, controls the movement of air between chamber 614 and a chamber 680, formed within the body 610, which in turn communicates through a fitting 682 and a tube 684 which extends to the servo illustrated in FIGS. 18–24.

The pressure controller chamber 612 is connected to the control valve chamber 614 by means of a passageway 686 (FIG. 15) extending longitudinally of the body 610 but radially spaced from the longitudinal axis of that housing. At its lower end, passageway 686 accepts an upstanding tubular portion 688 integral with the valve seat 652 which terminates in an orifice 687 disposed in the airflow path between passageway 686 and controlvalve chamber 614. Desirably, the lower end of passageway is tapered, being larger at the lowermost end, so that portion 688 will be forced into good sealing engagement with the wall of passageway 686 upon being forced therein. At its upper end, passageway 686 terminates at a raised boss 690 formed on the body 610 and diametrically spaced from a similar boss 692. Boss 692 is provided with a threaded hole to accept a screw 694 which clamps an annular check valve 696 (FIGS. 15–17) in position. Check valve 696, which may be metallic, is adapted to sealingly engage the face of the boss 690 to prevent the flow of air from the chamber 612 into the passageway 686, but will readily lift from boss 690 to permit the flow of air from passageway 686 into cavity 612, and serves a purpose to be noted hereinafter. It has been found to be advantageous to place a restriction or orifice 687 in the passageway between the chamber 612 and the control valve chamber 614. This orifice need not be small since its function is to produce a small, but significant, pressure drop thereacross. In the preferred arrangement, orifice 687 is about 0.160 inch in diameter. As will be seen hereinafter, the size of this orifice is a factor in adjusting the effectiveness of a compensatory feed-back circuit. The provision of the flapper or check-valve 696 enables a higher degree of feedback than would be feasible without it, and if the flapper or check-valve 696 is omitted, then the size of the orifice 687 may have to be adjusted to re-establish optimum feed-back conditions.

A passageway 698 (FIG. 16) in the body 610 extends between passageway 616 and a larger diameter passageway 700 formed in body 610. A fitting 702 is disposed within passageway 700 and a check-valve ball 704 is disposed within passageway 700 beyond the end of the fitting 702 and adjacent the end of the smaller-sized passageway 698. Desirably, a portion of the end of fitting 702 is deflected inwardly as at 706 to define a stop for caging the ball 704. Passageway 698 is notched as at 708 at its point of transition to passageway 700 to define a small orifice, equivalent, for example, to a circular hole 0.020 to 0.025 inch in diameter. A pressure differential tending to cause air to flow through fitting 702 towards passage 616 causes ball check valve 704 to move to its illustrated position in which the flow is restricted and limited by the size of the notch or orifice 708. Conversely, if the absolute pressure of the air in passageway 616 exceeds, under any circumstances, the absolute pressure of the air in fitting 702, ball 704 will be displaced from engagement with the check-valve seat and will not effectively impede the flow of air in that direction. In normal circumstances, the check valve 704 will be in its illustrated position and air will flow from the fitting 702 through the notch or orifice 708 into the passageway 616 and thence to the intake manifold of the engine. However, under some circumstances, as when the vehicle is accelerated very rapidly so that the absolute pressure in passageway 616 rises relatively close to atmospheric value (as, for example, to 2 inches of mercury below atmospheric) at a time when the pressure in fitting 702 is below that value, check-valve 704 will leave its seat to permit a rapid adjustment of the system pressures.

Fitting 702 is sealingly connected to a T 710 which is also connected via the tube 600 to the T 598 (FIG. 14) and thence to the brake valve 602 and to the manual controller valve 570. The T 710 is further connected, by a tube 712 to the servo (FIGS. 18–24).

Under conditions of extreme acceleration, the air pressure in passageway 616, communicating with the engine intake manifold, will rise to a value close to atmospheric and that pressure will be communicated to the control valve chamber 614 via passageway 686 (FIG. 15). When the pressure in chamber 614 approaches atmospheric, the pressure in chamber 674, also rises. As a result, governor valve 164' closes to terminate flow through orifice 671 and the pressure in chambers 614 and 674 becomes equal. Consequently, spring 676 closes valve 654 and the pressure in servo chamber 936 becomes atmospheric. To avoid this possibility, it may be desirable to provide means for preventing the absolute pressure of the air in control valve chamber 614 from rising to a value greater than a preselected amount below atmospheric pressure. Such optional means are illustrated in FIG. 15 of the drawings in the form of an auxiliary regulator 714.

Pressure controller 714 comprises a body 716 threaded into an apertured boss 718 formed upon the body 610 and communicating with the passageway 686. While body 716 may be of metal, it is contemplated that it be made of nylon and that the fitting portion 720 thereof which threadedly engages the internally threaded boss 718, be formed with but partial threads in manufacture so that the attachment of body 716 to body 610 will produce self tapping of the threads upon portion 720 in order to establish a good hermetic seal therebetween.

A valve seat and fitting member 722 threadedly engages an aperture formed in the body 716. It is preferred that member 722 be metal and that the cooperating threads in the body 716 be but partially formed so that the threaded insertion of the member 722 therein will self-tap threads in the body 716 to establish a good hermetic seal therebetween. The upper end of member 722 is chamfered to define a narrow-lip valve seat 724 and the lower end of member 722 is connected by means of a tube 726 to a reservoir 728. Reservoir 728 is connected via a spring-biased ball check valve 731 and a tube 733 to the intake manifold of the engine, or, for example, to a vacuum pump. Ball check-valve 731 may be set, for example, so that the air pressure within the reservoir 728 is normally quite substantially below atmospheric, such as 16–18 inches of mercury below atmospheric pressure.

The body 716 is provided with an annular flange 730 generally coaxial with the member 722. The outer edge of a flexible diaphragm 732 is laid over the end of the flange 730 and the beaded peripheral edge portion 734 of the diaphragm 732 is seated within an annular notch 736 formed around the exterior of the flange 730. To sealingly secure the diaphragm 732 to the body 716, a cap 738 is disposed over the diaphragm and is provided with a depending flange 740 having an interior annular groove 742 therein accepting the bead 734. Cap 738 may be of metal but it is desirably formed of a plastic such as nylon. The internal diameter of the depending flange 740 is selected so that the groove 742 will tightly engage the bead 734 and force that bead into tight sealing engagement with the groove 736. It will be observed that by this construction not only is the diaphragm 732 retained in place and a hermetic seal established between the diaphragm and the body 716, but also the bead 734 serves as a detent or locking means for holding the cap 738 in position. Desirably, the body 716 is provided with a small flange 744 underlying the bead 734 to prevent that bead from being improperly extruded during the installation of the cap 738.

The cap 738 is provided with an orifice 746 so as to establish atmospheric pressure within the cavity 747 but at the same time to dampen rapid movement of the diaphragm.

The diaphragm 732 is provided with a thickened central portion 748 which serves as a valve cooperating with the valve seat 724. The diaphragm support washer 750 underlies the diaphragm 732 and is centrally apertured to accept the valve portion 748. Support washer 750 acts as a seat and is peripherally deflected to act as a guide for a spring 752, which seats against a portion of the body 716 which may also be provided with an upstanding flange 754 serving as a further guide for spring 752.

Auxiliary pressure controller 714 may be set effectively to clamp or limit the maximum absolute pressure in passageway 686 at any suitable value, such as 12 pounds per square inch. If, during rapid acelleration of the vehicle, the manifold pressure rises to a value such that the pressure in passageway 686 tends to rise above that value, valve 748 will controllably open to tend to maintain in passageway 686 a maximum pressure no greater than 12 p.s.i. or such other value as may be selected. It will be observed that under this condition, the pressure in passageway 686 will tend to be lower than the pressure in main pressure controller chamber 612 so that check valve 696 will close. It will be recognized that while a flat valve 748 has been illustrated, a ball type configuration could be provided if desired.

By virtue of the threaded engagement between member 722 and the body 716, the effective height of spring 752 may be adjusted by rotating member 722 relative to body 716, and in this fashion the magnitude of the controlled pressure within the pressure controller 714 may be easily adjusted.

It will be recognized that the construction illustrated in the auxiliary pressure controller 714, in which the bead of the diaphragm further serves a retaining ring function, may be applied to servos, that is, to devices for converting variations in fluid pressure to variations in force. For example, a piston rod could be mounted to or formed with the valve portion 748 projecting upwardly through an enlarged aperture 746 in cap 738.

The servo illustrated in FIGS. 18 through 24 is an air-pressure-responsive force-applying device for controlling the throttle linkage and is capable not only of exerting an additional force upon the throttle when the selected speed is reached (as in the embodiment of FIG. 1) but is further capable of assuming control of the throttle to maintain the vehicle at a preselected velocity, in fully automatic operation.

The servo comprises a generally cup-shaped body portion 800 (see FIGS. 19 and 20) provided at near its upper end with an inner peripheral lip 802 and an outer peripheral flange 804 disposed above and radially outwardly from the lip 802 and defining, with the lip 802, an annular groove 806 disposed therebetween.

The outer peripheral bead 808 of a diaphragm 810 is seated in the groove 806 and the peripheral portion of the diaphragm 810 just radially inwardly of the bead 808 intimately engages the inner peripheral lip 802. As will be seen the air pressure below the diaphragm 810 is, during operation, lower than the air-pressure above diaphragm 810 and consequently forces are exerted tending to maintain a good hermetic seal between the diaphragm 810 and the body 800. Desirably, the peripheral groove 806 is apertured at one point around its periphery to accept a tab 807 (FIG. 19) depending from the bead 808 in order to key or locate the rotational position of the diaphragm 810 relative to the body 800.

The flange 804 is provided with an inwardly facing peripheral groove 812 just above the level of the bead 808. At a plurality of areas around the periphery of the flange 804, the flange 804 overlies the groove 812 such as at 814 (FIG. 20). At a plurality of areas between the aforesaid areas, the metal of the flange 804 does not overlie the groove 812 as is illustrated in 816 in FIG. 20 of the drawings. A rigid annular metallic clamp ring 818 overlies the bead 808 and its outer edge is serrated or provided with alternating projections, such as projection 820 (FIG. 20) and recesses such as recess 822 (FIG. 20), corresponding in number and location to the overlying portions such as 814 and nonoverlying portions such as 816 of the flange 804. Clamp ring 818 is assemblied to body 800 by aligning the projections such as projection 820 thereon with the nonoverlying portions of the flange 804, such as portion 816, by exerting a downward force upon the ring to compress the bead 808, and then rotating the clamping ring 818 to bring the projections thereon, such as projection 820, into underlying relationship with the overlying portions, such as portion 814, of the body 800. To insure a sealing engagement between bead 808 and body 800 the projecting portions of the clamp ring 818 may be deflected upwardly at an angle to the plane of the ring, as illustrated at portion 820 in FIG. 20, in order to exert a camming force upon the ring as it is rotated.

At a plurality of points around its periphery, such as three, ring 818 is provided with an inwardly and upwardly projecting bracket 824 (FIG. 19) having an outward generally upstanding portion, a generally horizontal portion 826 extending inwardly therefrom, and a depending flange 828 disposed radially inwardly from the portion 826. An annular air filter 830, which may be reinforced with a perforate rigid washer 832, is supported upon the upper edge of the flange 804 and extends inwardly into centering abutment with the upstanding portions of the brackets 824. A generally inverted cup-shaped sheet metal cover 834 surmounts the body 800 and its lower peripheral lip engages the filter 830 and serves to assist to retain the filter 830 in position. At three annularly spaced points, portions of the cover 834 are depressed to define a generally horizontal surface such as surface 836 which is apertured to accept a screw 838 which threadedly engages an aperture in the horizontal portion 826 of the corresponding bracket 824 to secure the cover 834 to the clamp ring 818.

Clamp ring 818 is further provided at two opposed points with upstanding brackets 840 and 842 (FIGS. 18 and 20) which serve, as will be seen, as journal arms.

Diaphragm 810 comprises, in addition to the bead 808, an outer or servo diaphragm portion 844 (FIGS. 19 and 20), an outer clamp portion 846 disposed just radially inwardly of portion 844, an inner or lock-up diaphragm portion 848 disposed radially inwardly of the clamp portion 846, an inner clamp portion in the form of an upwardly projecting bead 850 disposed radially inwardly of portion 848, and depending serpentined seal portion 852 disposed radially inwardly of portion 850 and terminating in an inner bead 854.

The outer clamp portion 846 of diaphragm 810 is clamped, between an upper diaphragm clamp ring 856, which may, for example, be of metal, and a servo piston 858 which may be and desirably is molded of a plastic such as nylon. The upper diaphragm clamp ring 856 is provided with a plurality of circumferentially spaced apertures aligned with a corresponding plurality of bored bosses, such as bosses 860 (FIG. 19) and 862 (FIG. 20) formed in the piston 858, and a corresponding plurality of screws, such as screw 864, is inserted through the aperture in the clamp ring 856, through aligned apertures in the diaphragm, and into threaded engagement with the bores in the bosses in the piston 858.

The piston 858 is provided at its outer edge with a depending skirt 866 which serves as a guide for the outer or servo diaphragm portion 844 of the diaphragm 810 and which further serves as a stop to limit the extent of the downward movement of the assembly including the piston 858 by virtue of its engagement with the bottom of the body 800. A biasing spring 868, adapted to exert an upward force which, as will be seen, is a force in a direction tending to open the throttle of the vehicle, is trapped between piston 858 and the bottom of the body 800, with means including the bosses 860 being provided to guide the spring.

The rigid upper diaphragm clamp ring 856 is provided at two diametrically opposed points with a pair of upstanding arms 870 and 872 (FIGS. 18 and 20) which move with piston 858 and serve as piston arms. The upper ends of piston arms 870 and 872 are apertured to accept the shanks of headed steel bearings 874 and 876, respectively, the shanks of which further pass through aligned apertures in a pair of crank arms 878 and 880, respectively, with the bearings being secured in position by a pair of snap-rings 882 and 884, respectively, engaging circumferential grooves therein and abutting the crank arms 878 and 880, respectively.

In this manner, bearing 874 pivotally interconnects crank arm 878 and piston arm 870, and bearing 876 pivotally interconnects crank arm 880 and piston arm 872.

At the remote ends, the crank arms 878 and 880 are apertured to accept a crankshaft 886 and the end of the crank arms 878 and 880 beyond those apertures are bent over and bowed to conform to the shape of the shaft 886 and those bent over portions are welded to the shaft 886 in order to rigidly secure the crank arms 878 and 880 to the crankshaft 886.

The right hand end of the crankshaft 886 (FIGS. 18 and 20) is journaled in a bearing 888 the headed end of which abuts one face of the journal arm 842 and the shank of which passes through an aperture in journal arm 842 and is provided with a peripheral groove to accept a snap-ring 890 (FIG. 18) which abuts the left hand face of the journal arm 842. As is best illustrated in FIGURE 22, the journal arm 842 is preferably cut out at the end to permit the crankshaft 886 to be inserted into the aperture during assembly of the parts. No corresponding cutout is required on journal arm 840.

At the left hand end (FIG. 18), crank shaft 886 is journaled in a bearing 892 the headed end of which abuts the left hand face of the journal arm 840 and the shank of which projects through that journal arm and is provided with a peripheral groove to accept a snap ring 894 which abuts the right hand face of journal arm 840.

To the left (FIG. 18) of the bearing 892, a subassembly comprising a hub 896, an inner throttle lever 898 and an outer throttle lever 900 is rotatably mounted on the crankshaft 886 by means of a pair of spaced apart sleeve bearings including sleeve bearing 902 disposed within the bore of the hub 896 and engaging the shaft 886. The hub 896, which is majorly circular cylindrical, is provided at its right hand end with a reduced diameter portion 904 which extends within an aperture in the inner throttle lever 898 but terminates short of the bearing 892. The inner throttle lever is welded or otherwise rigidly secured to the hub 896.

At its left hand end, hub 896 is provided with a splined, reduced-diameter portion 906 for accepting a splined aperture in the outer throttle lever 900, and the lever 900 is secured to the hub 896 by means of a snap retaining ring 908, while the subassembly including the hub 896 is prevented from moving longitudinally to the left along the crankshaft 886 by means of a snap retaining ring 910 engaging a groove in the shaft 886. The splined engagement between the outer throttle lever 900 and the hub 896 permits adjustment of the relative rotational positions between the outer throttle lever 900 and the inner throttle lever 898. Since the hub 896 passes through the wall of the cover 834, a felt seal 912 is mounted upon the hub 896 between the outer throttle lever 800 and the cover 834.

A spring anchor lever 914 is non-rotatably but adjustably secured to the crankshaft 886 outward of the hub 896. One end of a throttle return spring 916 is anchored to a laterally projecting portion 918 at the outer end of the spring anchor lever 914 and the other end of that spring is anchored to a laterally projecting arm 920 on the outer throttle lever 900. Spring 916 is intended to replace the normal accelerator return spring provided upon the automobile.

As may best be seen in FIG. 24, a link 922 is adjustably and rotatably secured in one of a plurality of interconnected apertures such as aperture 924 formed in the outer throttle lever 900 and the other end of link 922 is rotatably coupled to the actuating arm 926 of the carburetor 928 which is associated with the internal combustion engine driving the vehicle. Arm 926 is further coupled by a link 930 to the pivotally mounted accelerator or throttle pedal 934 of the vehicle.

By anchoring the throttle return spring 916 (FIGS. 18 and 24) to a spring anchor lever 914 which is secured to the crankshaft 886 (rather than anchoring it to a fixed point on the vehicle), it is possible to achieve a toggle action. By appropriate orientation of the spring anchor lever 914 and the outer throttle lever 900, the effectiveness of the spring 916 increases as the outer throttle lever 900 moves in a clockwise direction (FIG. 24) from its illustrated open towards a closed position, since the effective axis of the spring 916 moves away from the axis of the crankshaft 886. Additionally, the anchoring of spring 916 to a spring anchor lever 914 enables spring 916 to be rendered ineffective during fully automatic operation of the equipment by locking the spring anchor lever 914 and the outer throttle lever 900 in fixed rotational relationship to one another, in a manner to be described.

The undersurface of the servo portion 844 of the diaphragm 810 (FIG. 20), the undersurface of the piston 858 and the walls and bottom of the body 800 define a servo chamber 936. This chamber is connectable to the control valve of FIGS. 15–17 by means of a fitting 938 which is sealingly secured within an aperture in the bottom of the body 800 and which is connected to the tube 684 which extends to the control valve (FIG. 16). If desired, fitting 938 may be externally threaded as at 940 to serve as a mounting means for the entire servo unit.

A disc shaped lock-up piston 943 (FIG. 19) surmounts and clasps an annular bead formed on the inner clamp portion 850 of the diaphragm 810. Piston 943 is provided with an orifice 944 therein which is selectively blockable by a sliding valve member 946 but is not blocked during normal operation.

A valve 952, having a hollow upwardly projecting shank and an enlarged head, is disposed adjacent the piston 858 with the shank portion thereof projecting through the aperture 950. Valve 952 is or may be formed of a plastic such as nylon and its enlarged head portion carries an annular channel-shaped rubber seal member 954 banding its periphery and adapted to make good sealing engagement with the undersurface of the piston 858. An upwardly projecting tubular spring retainer 956 is secured to the valve 952. While these elements may be secured together in any suitable fashion, it is preferred that the shank of the valve 952 be provided with a plurality, such as three, longitudinally extending exterior webs 958 (FIGS. 19 and 21), and a corresponding plurality of inturned camming flanges 960 are formed at the bottom of the spring retainer 956. To assemble these two parts, the spring retainer is slipped over the end of the shank of the valve 952 and the parts are then rotated relative to one another to cause the narrow camming flanges 960 to cut their way into the plastic of the webs 958 of the valve 952.

A valve biasing spring 962 is trapped between a spring seat formed on the piston 858 adjacent the aperture 950 therein and an upper horizontal flange on the spring retainer 956. During semi-automatic operation, seal 954 on valve 952 remains in sealing engagement with the undersurface of the piston 858. However, valve 952 has a centrally disposed air-flow orifice 964.

During semi-automatic operation, air flows from the atmosphere, through the filter 830, through the chamber within the cover 834, and through orifice 944 into a chamber 948 partly bounded by the portion of the piston 858 which is adjacent a central aperture 950 therein, by the serpentine portion 852 of the diaphragm 810, and by a portion of piston 943. The air then flows from chamber 948, through orifice 964 into servo chamber 936 and then through fitting 938 (FIG. 20) and tube 684 to the control valve (FIG. 16). It will therefore be seen that under these conditions, the servo acts as a part of a fluid-dynamic, rather than a fluid-static, system. For a purpose hereinafter to be described, orifice 964 is smaller than orifice 944. In a constructed embodiment orifice 964 was 0.0625 inch in diameter and orifice 944 was 0.0670 inch in diameter.

In semi-automatic operation of the system, the driver closes the ignition switch 592 (FIGS. 14 and 16), starts the engine and closes switch 590 (FIG. 14) and rotates the speed adjusting knob 522 to select the desired speed. This sets the governor of FIGS. 10 to 12 so that the governor pressure in chamber 492 (FIG. 10) will reach a preselected value at that preselected speed. Chamber 492 of the governor is connected to chamber 674 (FIG. 16) of the control valve of tube 498. The pressure in the control valve chamber 614 is controlled by the pressure controller and chamber 614 is normally at a lower atmospheric pressure than chamber 674. As a result, air flows through filter 504 (FIG. 10) at the governor, through the pneumatic modulating valve 432–434 in the governor, into the governor chamber 492, via tube 498 to the control valve chamber 674 (FIG. 16), through orifice 671 into control valve chamber 614, through orifice 687 (FIG. 15) and passageway 686 to the chamber 612 and past the valve 622 (FIG. 16) and through passageways 620 and 616 to the intake manifold of the automobile engine. Prior to the time that control valve 654 opens, air in servo chamber 936 (FIG. 19) is at atmospheric pressure due to the movement of air from the atmosphere through the filter 830, through the orifice 944, chamber 948, and through the orifice 964 into servo chamber 936. Consequently, atmospheric pressure is communicated via tube 684 to chamber 680 in the control valve (FIG. 16). When the rotational velocity of the governor approaches a value indicative of the selected road speed, the absolute pressure in control valve chamber 674 rises sufficiently to crack valve 654, creating a fluid-dynamic flow from atmosphere through the filter 830 at the servo (FIG. 19) through orifice 944, chamber 948, orifice 964, servo chamber 936, through the tube 684 to the control valve (FIG. 16), through chamber 680, past control valve 654, chamber 614, orifice 687 (FIG. 15), passageway 686, past check valve 696 and into chamber 612 (FIG. 16), past valve 622, and to the intake manifold. As a result of the pressure drop across orifice 944 and orifice 964 (FIG. 19) in the servo valve 952, the pressure in servo chamber 936 is reduced below atmospheric value and the resultant pressure differential causes the servo piston 858 to move downwardly against the return force exerted by spring 868. As a result, the piston arms 870 and 872 are moved downwardly to rotate the crank arms 878 and 880 and the crankshaft 886 about the rotational axis of that crankshaft, it being recalled that crankshaft 886 is rotatably supported by means including journal arms 840 and 842 which are fixed with respect to the body 800. Crank arm 878 is provided with a laterally extending actuating portion 942 between crankshaft 886 and bearing 874 which overlies the inner throttle lever 898 as may best be seen in FIGS. 18, 20 and 23.

In semi-automatic operation of the unit, the forces are applied to the carburetor arm 926 via actuating portion 942 and its engagement with the inner throttle lever 898, and hence are but unidirectional. When the assembly including piston 858 is moved downwardly sufficiently, actuating portion 942 engages the inner throttle lever 898 and during continuing rotationg of crank arm 878 in the same direction thereafter, inner throttle lever 898 is rotated in a clockwise direction (FIG. 23) about the axis of the crankshaft 886. As a result, the outer throttle lever 900 is correspondingly rotated to rotate the carburetor arm 926 in a direction to close the throttle and to exert a force upon the accelerator pedal 934 tending to move it upwardly against the driver's foot. If the absolute pressure within the servo chamber 936 thereafter increases, the assembly including the piston 858 will be moved upwardly under the action of spring 868 to tend to rotate crank arm 878 and its actuating portion 942 in a counterclockwise (FIG. 23) direction away from the inner throttle lever 898 to reduce the throttle closing force and to thereby enable the driver of the automobile to easily further depress accelerator pedal 934.

Since the assembly including the piston 858 actually moves in rotation about the axis of shaft 886 (FIG. 19), it is advantageous to dispose the spring 868 at an angle as illustrated in FIG. 19 so that it will be substantially vertically disposed at the bottom position.

In order to convert the servo to fully automatic operation, the outer throttle lever 900 (FIGS. 18 and 24) is effectively locked for bidirectional driving to the servo piston 858 and the effective size of the controlling orifice in the fluid-dynamic servo flow system is changed. Both functions are performed by a lock-up servo. This servo comprises a variable sized chamber 968 (FIG. 19) bounded by the wall and bottom of the servo piston 858, bounded on the inner wall by the serpentine seal portion 852, and bounded at the top by the lock-up diaphragm portion 848 of the diaphragm 810. Servo piston 858 serves as the body of the lock-up servo. Chamber 968 is connected to the lock-up servo circuit tube 712 (FIGS. 19, 20 and 16) by means of a fitting 970 (FIGS. 19 and 20) sealed in the bottom wall of the body 800, and a flexible tube 972 secured to fitting 974 which is threaded or otherwise secured in an aperture in a boss 976 formed in the servo piston 858. Hose 972 follows a circular course of approximately 270 degrees to facilitate its flexing during the movement of serve piston 858 relative to the body 800.

The reduction in air pressure within chamber 968 resulting from the withdrawing of air therefrom through the tube 972 causes the lock-up diaphragm portion 848 to move downwardly carrying the lock-up piston 943 therewith.

A circular clamp washer 978 (FIGS. 19 and 20) is secured to the lock-up piston 943 by means of a rivet 980 and has a projecting peripheral flange portion 982 which engages the inner clamp portion 850 of the diaphram 810. Clamp washer 978 is provided with a plurality of circumferentially disposed apertures such as apertures 984 and 985 so that it does not effectively impede air flow.

Rivet 980 is provided with a ball head 986 (FIG. 19) to which a valve 988 is snapped or otherwise secured. Valve 988 may be made, for example, of rubber, and is adapted to cooperate with a valve seat 990 at the upper end of the shank of the valve 952.

To bias the lock-up piston 943 upwardly relative to the servo piston 858, a compression spring 992 is disposed within the chamber 948 and acts, at one end, against the clamp washer 978 and, at the other end, against a spring retainer 994. Spring retainer 994 is provided with a curved clamping flange at its upper end to engage the bead 854 and to serve to maintain the bead 854 in tight sealing engagement with the servo piston 858 as a result of the application of a continuing downward force upon the retainer 994 by spring 992. To limit the maximum downward movement of the lock-up piston 943 relative to the servo piston 858, a tubular stop member 996 is mounted between springs 992 and 962 and may be secured in position by trapping an out-turned flange at its bottom edge under the spring retainer 994, as illustrated.

The means for locking the outer throttle lever 900 to the servo piston 858 for bidirectional operation during the automatic mode of operation of the system includes a lock-up pin 998 (FIGS. 18 and 20) which is journaled for movement along its longitudinal axis in the bearings 874 and 876 (FIG. 20) and which is provided with a tapered or generally conoidal end portion 1000 which is engageable, at proper orientation of the parts, with a tapered aperture 1002 in the inner throttle lever 898. To bias the lock-up pin 998 to the right (FIGS. 18 and 20) a spring anchor 1004 is mounted in a groove formed in the lock-up pin 998 and engages a compression spring 1006 which acts against the snap ring 884 and is guided by the projecting end of the bearing 876. Anchor 1004 acts against the yoke-shaped arm 1008 of an actuating lever 1010 which is pivotally supported by a shaft 1012 journaled between a pair of arms 1014 and 1016 (FIG. 18) formed integrally with the upper diaphragm clamp ring 856. The yoke-shaped arm portion 1018 of the lever 1010 abuts the upper surface of the lock-up piston 943 adjacent the rivet 980.

With the system in semi-automatic operation and at the controlled speed, the lock-up pin 998 (FIG. 20) will be in alignment with aperture 1002 in the inner throttle lever 898 since, as illustrated, under that condition actuator arm 942 (FIGS. 18 and 23) will be in engagement with the inner throttle lever 898. The driver may then transfer the system to the fully-automatic mode of operation by depressing the lock-in button 594 (FIG. 14) to block the flow of air from atmosphere into passageway 562 and hence into tube 596. Assuming brake pedal 604 to be released so that valve 602 is enclosed, there will then be no passageway permitting the flow of air into tube 600 which extends to T 710 in FIG. 16 of the drawings. As a result, the air in chamber 968 (FIG. 19) of the lock-up servo, will be drawn through fitting 974, tube 972, fitting 970, tube 712, T 710 (FIG. 16), fitting 702, orifice 708, passageway 616, and through the fitting 618 to the intake manifold of the engine. The resultant downward movement of the lock-up piston 943 relative to the servo piston 858 permits the bifurcated arm 1018 of the lever 1010 to rotate in a counterclockwise sense (FIG. 20) about the axis of shaft 1012 to permit spring anchor 1004 and hence lock-up pin 998 to move to the left under the urging of spring 1006 so as to drive tip 1000 into aperture 1002 in the inner throttle lever 898. Since lock-up pin 998 is secured against movement perpendicular to its longitudinal axis relative to servo piston 858, any movement of servo piston 858 either upwardly or downwardly will be communicated to the inner throttle lever 898 and hence into corresponding rotation of the outer throttle lever 900 and of the carburetor and throttle linkage secured thereto. The locking engagement between the lock-up pin 998 and the inner throttle lever 898 further effectively locks the inner throttle lever 898 to the shaft 886 and hence locks the spring anchor lever 914 (FIGS. 18 and 24) against rotation relative to the outer throttle lever 900, thereby rendering the throttle return spring 916 ineffectual so that the servo will not have to overcome the force of that spring in order to move the throttle toward the open position.

When the lock-up servo is deactivated, it is restored to its illustrated expanded position by means of spring 992. The force of spring 992 is substantially higher than that of spring 1006 and consequently the upward movement of servo piston 942 will rotate lever 1010 in a clockwise sense (FIG. 20) to force the spring anchor 1004 and hence the lock-up pin 998 to the right, compressing spring 1006, and disengaging tip 1000 from aperture 1002.

It may be noted that while in the illustrated system the throttle is opened by servo spring 868 and closed by the servo air pressure differential, it is contemplated that a reverse arrangement could be used. However, the balance of advantage appears to lie with the disclosed arrangement.

It is desirable to shift the fluid-dynamic system including the servo from a lower rate of fluid flow to a higher rate of fluid flow when switching from semi-automatic to automatic operation. The shift of orifice size is advantageous in that it enables the servo to exert a greater force on the throttle in a closed-throttle direction when the system is in semi-automatic operation than when the system is in full automatic operation, for any given governor pressure. In full automatic operation, it is only necessary that the servo be able to exert a sufficient force in the throttle-closing direction to balance the other forces in the throttle linkage system at the controlling governor pressure, whereas in semi-automatic operation it is necesary to exert a sufficient additional force to serve as a noticeable signal to the operator, that is, to provide a pedal feel. As a result, in semi-automatic operation, a smaller orifice is provided at the servo so that for any given governor pressure a greater pressure differential will exist between the chamber 936 of the servo and the atmosphere to produce a correspondingly increased force. In automatic operation, at set speed, road load and equilibrium, this additional force is unnecessary and undesirable and consequently the size of the orifice may be increased to reduce the magnitude of that differential for the same governor pressure. It may be noted however, that the system is still capable of exerting increasing reactive forces on the driver's foot even in full automatic operation if the driver applies an increasing force on the accelerator pedal as is illustrated in FIG. 25 of the drawings.

As previously noted, the transfer of orifice size occurs concurrently with the shifting of the lock-up pin 998 and results from the removal of air from the lock-up servo chamber 968.

When the lock-up piston 943 moves downwardly relative to the servo piston 858 (FIG. 19), as above described, valve 988 is moved towards and ultimately into engagement with valve 952, engaging valve seat 990 at the upper end of the shank of valve 952 to block air flow through orifice 964. As the lock-up piston 943 continues to move downwardly, valve 988 drives valve 952 downwardly against the additional opposing force of spring 962, thereby separating the seal 954 from the undersurface of the servo piston 858 and effectively substituting a large-area passageway past seal 954 for the relatively small orifice 964. As a result, air now flows from atmosphere, through filter 830, orifice 944, chamber 948, between seal 954 and piston 858, and through chamber 936 to the control valve via tube 684. Under this condition, the effective restriction is that of orifice 944 which, as above noted, is larger in size than orifice 964 and is of a size selected to produce optimum operation during full automatic operation of the system. Normally, the lock-up piston 942 will continue to move downwardly until stopped by the stop 996.

If desired, valve 988 could be replaced simply by a driving actuator which would engage valve 952 to move it downwardly, as above described. However, the advantage of usnig a valve 988 cooperating with the valve seat portion 990 of valve 952 is that it controls the maximum pressure that can occur in the engine manifold during acceleration if, during operation, the driver abruptly adjusts the system to a higher set speed. Under that circumstance, the control valve 654 (FIG. 16) tends abruptly to close since the pressure in chamber 674, as controlled by the governor, is abruptly reduced. As a result, the air flow from the atmosphere through orifice 944 (FIG. 19) and past the lip of valve 952 raises the pressure in chamber 936 to thereby reduce the servo pressure differential, permitting spring 868 to move the servo piston 858 upwardly thereby moving the outer throttle lever 900 (FIGS. 18 and 24) in the throttle opening direction. Were it not for valve 988, the pressure in chamber 936 would continue to rise, servo piston 858 would tend to move fully upward, and the vehicle would tend to accelerate to the new selected speed at wide-open throttle. Additionally, in the absence of valve 988, the manifold pressure and the pressure in lock-up servo chamber 968, which is connected to the manifold, would tend to rise until the pressure differential between chamber 938 and atmosphere would be insufficient to hold spring 992 compressed, spring 992 would force piston 943 upwards (FIG. 20) rotating lever 1010 clockwise and moving pin 998 to the right which retracts tip 1000 from aperture 1002. This would free inner throttle lever 898 to revert the system to semi-automatic operation. If the vehicle was being operated in automatic without the driver's foot on the pedal, the throttle closing spring 916 would close the throttle. Valve 988 is an element of a means for preventing overshoot and for automatically controlling the acceleration of the vehicle in automatic operation.

Thus, when the throttle opens, as above described, in response to an abrupt increase in the road speed setting, the resultant reduction of manifold vacuum, that is, the resultant increase in the absolute pressure in chamber 616 (FIG. 16), is rapidly communicated to the lock-up servo chamber 968 (FIG. 19) since under these conditions the pressure in chamber 616 is greater than it is in chamber 968 so that the ball check-valve 704 (FIG. 16) leaves its seat to permit air to move rapidly from chamber 616, fitting 702, T 710 and through tubes 712 and 972 (FIG. 19) to chamber 968. As a result of this increase in the air pressure in chamber 968, springs 992 and 962 move the lock-up piston 943 upward relative to the servo piston 858, moving valve 988 upward, and thereby permitting spring 962 to move valve 952 upwardly until seal 954 sealingly engages the undersurface of servo piston 858. Valve 988, however, remains in sealing engagement with valve seat 990.

As a result, chamber 936 is sealed so that air can move neither in nor out of that chamber and it will be held at a preselected pressure (such as 68 inches of water) determined by the conjoint forces of springs 962 and 992. This preselected pressure establishes the position of servo piston 858 and the degree of opening of the throttle to give the desired maximum acceleration. The maximum degree of opening of the throttle is preferably selected to be such that the automobile will accelerate to the newly selected speed at a controlled rate of acceleration which is less than the full acceleration capabilities of the automobile. It will be seen that to achieve this acceleration control, the intake manifold pressure is sensed and the system then operates to limit the rise of absolute manifold pressure to a preselected maximum value. Of course, if carburetor venturi pressure were being sensed and controlled, the limitation woud be upon the minimum absolute pressure. The term "limit value" as used herein is generic to maximum and minimum.

As the vehicle approaches the newly selected speed, the governer pressure rises (see FIG. 25) in control valve chamber 674 forces control valve 654 off its seat which reduces the pressure in servo chamber 936 and closes the throttle. At or near control speed the pressure rise in chamber 936 will be modulated in relation to the speed change, and consequently as the newly set speed is approached, the acceleration will be gradually and progressively reduced to reach zero as the newly set speed is reached.

Figure 18:
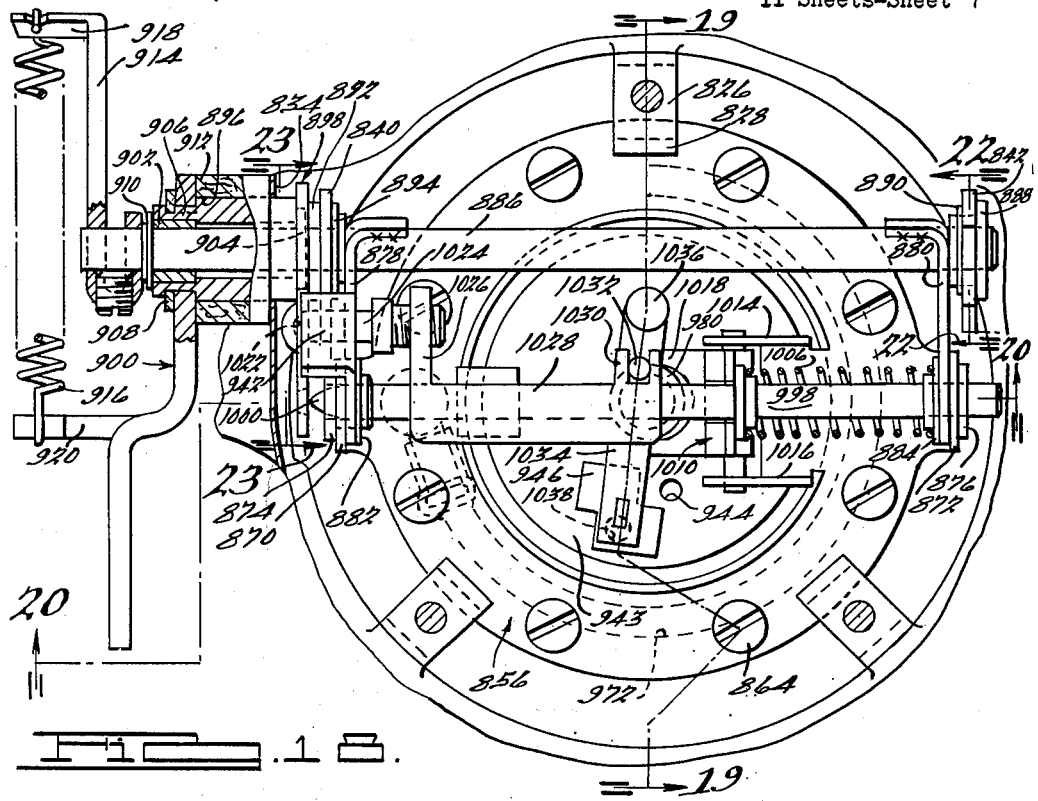
FIG. 18 is a transverse cross-sectional view of an improved servo adapted for association with the assembly of FIGS. 15-17.

It is contemplated that the driver may place the manual control portion of the system in automatic operation position before the control speed is reached by actuating knob 594 and means are provided to insure that lock-up pin 998 (FIG. 20) will not be moved toward lever 898 until alignment exists between the tip 1000 thereof and the aperture 1002. To this end, the inner throttle lever 898 is provided with a concave recess, dimple or camming surface 1022 (FIGS. 18 and 20) in its right-hand face approximately medially of its length, and a cam follower 1024, which may be made, for example, of nylon, is positioned to engage and seat in that concave recess. Cam follower 1024 is threadedly and adjustably mounted in a projecting arm portion 1026 of an actuator 1028. Actuator 1028 extends along and generally parallel with and is guided on lock-up pin 998 and is provided with a depending yoke portion 1030 (FIGS. 18–20) which clasps a drive pin 1032. Drive pin 1032 is formed integrally with a valve lever 1034 which is rotatably secured to the lock-up piston 943 by means of a rivet 1036 (FIGS. 18 and 19). The free end of lever 1034 is apertured to accept and drivingly engage the valve 946.

When cam follower 1024 is not in engagement with the recess 1022 in the inner throttle lever 898 (contrary to the position in which the parts are illustrated) a spoiler aperture 1038 (FIGS. 18 and 19), extending through the lock-up piston 943 and through the inner clamp portion 850 (FIG. 19) of the diaphragm 810 and thence in chamber 968, is open.

If, under these conditions, the driver depresses lock-in button 594 (FIG. 14) in an effort to place the equipment in fully automatic operation, the pressure in lock-up servo chamber 968 (FIG. 19) cannot be reduced below atmosphere because of the inflow of air through aperture 1038, and the lock-up pin 998 will not be released. However, as the servo piston 858 moves downwardly as the selected speed is approached, a position will be reached at which the cam follower 1024 (carried by piston 858), is aligned with the recess 1022 in the inner throttle lever, the inner throttle lever position being determined by the then position of the accelerator pedal 934 (FIG. 24). When this condition of synchronism is attained, the cam follower 1024 will be moved fully into that recess and the actuator 1028 (FIGS. 18 and 20) will be moved to the left as the result of the action of a compression spring 1040 (FIG. 20) mounted upon the lock-up pin 998, acting against a snap-ring 1042 disposed in a circumferential groove in the lock-up pin 998, and acting against the right-hand surface of the portion 1026 of the actuator 1028. As a result of this movement of the actuator 1028, the drive pin 1030 will be moved to rotate the valve lever 1034 about the axis of rivet 1036 (FIG. 19) to move the valve 942 towards and into the position illustrated in FIG. 18 of the drawings in which the spoiler aperture 1038 is closed. At that time, the lock-up servo can operate to perform its previously described functions.

It is possible for the road speed of the vehicle momentarily to overshoot the set speed in the arrangement thus far described. Thus, the servo piston 858 is, unless moved, at a position corresponding to wide open throttle so as not to interfere with the normal operation of the vehicle or normal pedal feel when the system is not in use. With the system set at a selected road speed, the control valve 654 (FIG. 16) will crack at a road speed which is a few miles per hour (e.g., four or five) below the set speed to start evacuating air from servo chamber 936 (FIG. 19) to initiate movement of piston 858 downwardly towards the position which will hold the vehicle at the selected road speed. Thus piston 858 will normally have to move in the order of half of its full travel to reach the position at which the aforesaid synchronism occurs, and in the described fluid-dynamic system, an appreciable interval of time (e.g., one second) can be required for this movement to be completed. If, as is usual, the throttle is opened sufficiently to produce reasonably rapid acceleration, the vehicle can accelerate to a speed above the set speed during that interval.

If desired, means may be provided to increase the effective rate of movement of the piston 858 under these circumstances by converting from fluid-dynamic operation to fluid-static operation. In the present arrangement, that means serves to close orifice 944 (FIGS. 18 and 19) until or about until the aforesaid condition of synchronism between throttle and servo piston positions occurs. Thus, when cam follower 1024 is not seated within the recess 1022 in the inner throttle lever 898, the valve 1034 is rotated to a position in which the valve 946 is covering the orifice 944 (FIG. 18). As a result, chamber 936 (FIG. 19) is not connected to the atmosphere through an orifice and is an element of a fluid-static system. Accordingly, when the control valve 654 (FIG. 16) opens as a result of the vehicle approaching the selected speed, the air in chamber 936 (FIG. 19) is much more rapidly exhausted than would be the case if there were a continuing inflow of atmospheric air, so as rapidly to move the servo piston 858 downwardly toward the proper position. Additionally, when control valve 654 (FIG. 16) cracks, the fact that chamber 936 is sealed from the atmosphere means that the system does not operate as a force modulating system but rather acts regeneratively. Thus, when control valve 654 (FIG. 16) opens, the pressure differential between chamber 680 and chamber 614 is reduced so that the previously existing magnitude of the pressure differential acting upon valve 654 and tending to retain valve 654 against its seat is reduced and as a consequence valve 654, once cracked, tends to pop fully open so that the air in the servo chamber 936 (FIG. 19) is rapidly exhausted therefrom through the control valve. This not only avoids overshooting but also has the advantage that the resultant rapid movement of the servo piston 858 will or may produce a very abrupt and significant pedal signal at the foot of the driver as an indication to him that the system is now in operation.

It was previously noted that the servo of FIGS. 18–24 is converted from a fluid-dynamic unit to a fluid-static unit under certain conditions in order to improve the rapidity of response and that, as a result of this change, the control valve 654 (FIG. 16) was operated regeneratively, cracking of that valve resulting in a change of the applied forces to tend to cause the valve fully to open. The same conditions exist to a lesser degree even in fluid-dynamic operation of the system. Thus, when valve 654 (FIG. 16) is closed, with the pressure in chamber 680 tending to be above the pressure in chamber 614, a differential force exists acting upon the effective area of the valve 654 tending to maintain that valve closed. When the valve cracks, this differential force tends to be reduced, reducing the forces tending to hold the valve closed and thereby tending to permit the valve to be further opened. Thus, the action tends to be progressive or regenerative and would, if not modified by other forces, cause valve 654 to snap open as is the case with a fluid-static servo as above described. The control valve spring 676 tends to oppose this regenerative action, particularly if it has a relatively high rate, but it has been found that full compensation for the above-described regenerative tendency cannot satisfactorily be achieved by using a high-rate spring, due to the very small magnitude of movement of the spring.

Accordingly, this regenerative tendency is controlled by balancing it against a degenerative force, and the degenerative force is derived by providing means to cause the control valve and control valve diaphragm effectively to sense and respond to changes of the servo pressure, that means comprising the fluid-dynamic servo and a fluid-flow impedance between the control valve and the pressure controller.

A small but significant pressure drop occurs across the orifice 687 between the pressure controller and the control valve and this pressure drop serves to establish a negative or degenerative feed-back effect which compensates for the effects of the aforesaid regenerative action upon the control valve. Thus, when control valve 654 opens, air flows from chamber 680 past the control valve 654 into the control valve chamber 614, and through the orifice 687 into the chamber 612. This flow through the orifice 687 produces a pressure drop thereacross the magnitude of which is poportional to the magnitude of the flow therethrough. Since the pressures in the chamber 612 and in the control valve chamber 674 are assumed to remain constant under this circumstance (effectively constant throttle position and road speed), the pressure in the control valve chamber 614 must rise as a result of the pressure drop across the orifice 687 and this pressure rise in the control valve chambe 614, acting upon the diaphragm 662 produces a force in a direction tending to close the valve 654, thereby compensating against the regenerative effect upon the valve 654.

While these factors tend to balance at set speed, below the set speed this degenerative force is controlling so that a further increase in the absolute governor pressure is required to cause the control valve 654 to further open, and this increased pressure can only occur as a result of an increased vehicular speed, as is illustrated in the governor versus vehicle velocity curve in FIG. 25.

The relative effectiveness of the opposing regenerative and degenerative effects is determined primarily by the effective area of valve 654, the effective area of diaphragm 662, and by the size of orifice 687. An increase in the effective valve area will increase the regenerative tendency; an increase in the effective diaphragm area will increase the degenerative tendency; and an increase of the effective impedance of the orifice 687 will also increase the degree of degenerative action. As long as the sum of the pressure rise in the control valve chamber 614 multiplied by the effective area of the diaphragm 662 plus the increase in force of the control valve spring 676 (resulting from the physical movement of the valve 654) is greater than the pressure change in chamber 680 multiplied by the effective area of control valve 654, the pressure rise in chamber 680 will be self limiting.

The degenerative action above described results from the fluid-pressure drop across the orifice between the control valve and the regulator resulting from the flow of air in a fluid-dynamic system including the servo. It will therefore be appreciated that the rapid movement of the servo piston 858 when valve 946 closes orifice 944 results not only from the more rapid reduction of pressure in chamber 936 due to the curtailment of inflow from the atmosphere but also from the fact that the switching of the servo to fluid-static operation effectively disables the previously described degenerative feedback operation so that valve 654 acts regeneratively and pops open to expedite the outflow of air from servo chamber 936.

The foregoing considerations not only affect the operation of the control valve even in the absence of a sensed speed change but are also factors in the improved force modulation that occurs with sensed speed changes. Thus, for the reasons above noted, the forces tending to close the control valve 654 vary directly in accordance with the change in the pressure in the chamber 680 so that the pressure in that chamber rises and falls in a definite relation to governor pressure in chamber 674, and the pressure in the servo and the force exerted by the servo similarly vary in accordance with changes in the governor pressure and hence in accordance with changes in the vehicle speed, producing the aforesaid modulation of force with variations of vehicular speed from the set speed.

These factors may be better understood from consideration of specific examples illustrated with reference to the system of FIGS. 10 through 24. Let it be assumed, for purposes of understanding, that the effective area of orifice 687 (FIG. 15) between the control valve and the pressure controller is 0.012 square inch, that the effective area of the lower surface of diaphragm 662 (FIG. 16) is one square inch, that spring 676 exerts a force of 0.73 pound or 20 inches of water, that orifice 671 has an effective area of 0.0019 square inch, that the effective area of the surface of diaphragm 662 adjacent chamber 614 is 0.93 square inch, that the effective area of valve 654 is 0.07 square inch, and the effective area of the orifice in the servo during semi-automatic operation is 0.003 square inch, and further assuming a set speed of 50 miles per hour and that the flow from the governor is 0.012 pound per minute, it will be observed that at a vehicular speed of 45 miles per hour (5 miles per hour below set speed) and at road load, the pressure in chamber 674 will be 376.5 inches of water absolute (from the governor curve in FIG. 15), the pressure in chamber 614, due to the pressure drop across orifice 671, will be 353.5 inches of water, that the pressure in the chamber 612 will be (due to the pressure drop across orifice 687) 353.0 inches of water absolute, and that, since there is a pressure of 400 inches of water absolute (assumed to be atmospheric pressure) in the chamber 680 acting against the upper surface of valve 654, the total of the forces acting to close the valve is equal to the forces tending to open the valve, and the valve 654 will be just at the point of opening.

As the vehicular speed increases, for example, to 47.3 miles per hour at road load, and again assuming the same flow rate from the governor (recognizing that in fact this value will vary minorly) the pressure in chamber 674 will rise to 379 inches of water absolute, the pressure in the control valve chamber 614 will rise to 356 inches of water, while the pressure in the chamber 612 will remain at the aforesaid 353.0 inches of water (assuming no change in throttle position). As a result, the forces tending to unseat valve 654 will exceed the forces tending to hold the valve closed and valve 654 will open. As a result, a pressure drop will occur across the valve so that with the aforesaid servo orifice during semi-automatic operation, a fluid flow of 0.016 pound per minute will occur through the servo and past control valve 654 so that the pressure in chamber 680 will equal 385 inches of water and the control valve 654 will balance at this point, assuming the spring force increases to 21 inches of water. Similar changes will exist as the road speed increases. If the road speed exceeds the set speed, for example if it rises to 50.7 miles per hour at road load, and again assuming a flow of 0.012 pound per minute from the governor, the pressure in chamber 674 will rise to 382.2 inches of water, and the pressure in the control valve chamber 614 will rise to 358.7 inches of water, while the pressure in the chamber 612 remains at the aforesaid pressure of 353.0 inches of water. Assuming the spring force increases to 23 inches of water, the control valve 654 will balance at a position in which the rate of flow from the servo into chamber 680 is equal to 0.025 pound per minute and the pressure in chamber 680 will equal 360 inches of water absolute. Thus, it will be seen that there is a modulation of the pressure in chamber 680 and a consequent modulation of the pressure in the servo chamber 936 (FIG. 19) with changes in the road speed of the vehicle. This change in the pressure in the servo chamber 936 (FIG. 19) with changes in the vehicular road speed in semi-automatic operation is illustrated in the appropriately labeled curve in FIG. 25 of the drawing. It is significant to again note that this curve is of quite steep slope so that a small change in the vehicular velocity will produce a significant change in the servo pressure so that if the driver presses the pedal downwardly harder than necessary to maintain this vehicle at the selected speed in semi-automatic operation, the reactive force acting against his foot increases very substantially. Conversely, if the driver reduces the force applied to the accelerator pedal, the reactive force drops abruptly, both changes of force being in a direction to tend to maintain the vehicle at selected velocity in semi-atuomatic operation.

Similar changes exist in fully automatic operation except that as a result of change of orifice size in the servo, the magnitude of the change with a given change of road speed is less, that is, the slope of the curve of the change of servo pressure with changes of vehicle velocity is not as large as is also illustrated in FIG. 25 of the drawings.

It will be observed that the difference between the absolute servo pressure at the selected speed (50 miles per hour) in the two servo-pressure curves represents the magnitude of the additional pedal signal which is provided the operator in semi-automatic operation as an indication that he is at the selected speed.

The system of FIGS. 10 through 24 has a further compensatory action against the effects of any instabilities in the system which tend to produce a change of servo force not resulting from road speed or road load changes. This compensatory action is achieved by a negative or degenerative feedback loop, including the servo, the throttle, the intake manifold of the internal combustion engine, the pressure controller, and the control valve. In the illustrated arrangement, the degenerative feedback signal is produced by the pressure controller in response to intake-manifold pressure changes and is effectively amplified by the control valve and applied to the servo.

The pressure controller is enabled to produce a signal which varies inversely with (and to a lesser percentage than) the changes of intake-manifold pressure by providing an uncompensated pressure controller valve area, as is illustrated in FIGS. 1, 8 and 16. Thus, as an example, let it be assumed that the effective area of the upper surface of the diaphragm 624 (FIG. 16) is one square inch, that the effective area of the undersurface of that diaphragm is 0.95 square inch, that atmospheric pressure of 400 inches of water is acting upon the upper surface of the diaphragm, that the spring 648 is 2 pounds or 55 inches of water, that the effective area of the valve 622 is 0.05 square inch, and that at 50 miles per hour and at road load, with a representative engine, the manifold pressure is at 200 inches of water absolute, valve 622 will be off its seat with an upward force exerted upon its effective area equal to 10 inches of water and the total differential force acting upon the valve is such that the absolute pressure in chamber 612 is equal to 352.6 inches of water that is, the pressure in chamber 612 is equal to 47.4 inches of water below atmospheric pressure or 1.72 pounds per square inches below the atmospheric value.

When the throttle of the internal combustion engine is opened, the absolute manifold pressure will rise before the engine torque rises, and a rise in engine torque must precede an increase in road speed. If the throttle is opened without a change of load conditions and without a change of the assumed road speed of 50 miles per hour yet occurring so that the absolute manifold pressure rises, for example, to 220 inches of water, it will be seen that the absolute pressure in chamber 612 drops to 351.6 inches of water absolute, that is, the pressure in chamber 612 becomes 48.4 inches of water below atmospheric or 1.76 pounds per square inch below atmospheric pressure. Conversely, upon movement of the throttle in a direction to decelerate the vehicle, even though the road speed remains at 50 miles per hour, at road load, the manifold pressure will drop as, for example, to 180 inches of water absolute in which case the pressure in chamber 612 will rise to 353.6 inches of water absolute, that is, the pressure in chamber 612 will fall to 46.4 inches of water below absolute of 1.69 pounds per square inch below absolute pressure.

Thus, the pressure controller changes its output pressure with changes in the manifold pressure and, in the preferred arrangement, that change is smaller, percentagewise, than the change in manifold pressure and is in the opposite sense. For example, for a change of manifold pressure from 200 inches of water below absolute to 180 inches of water below absolute (that is, from approximately 200 inches absolute to approximately 220 inches absolute), a change of 10%, the output pressure of the pressure controller will change, as above indicated, from 47.4 inches of water below absolute to 48.4 inches of water below absolute, or a change of 2.1% in the opposite direction. A decrease in the absolute manifold pressure will produce an increase in the absolute output pressure of the pressure controller; and an increase in the absolute manifold pressure will produce a decrease in the absolute output pressure, and in both cases the change is but a fraction of the change in manifold pressure.

Since a change in manifold pressure precedes a change in the output torque of the engine, since an output torque change of the engine precedes a change in the velocity of the vehicle, since the output pressure of the pressure controller changes with changes of the manifold pressure, since the direction of the change of the controlled pressure is inverse to the direction of the change of manifold pressure, since the change of the output pressure of the pressure controller is small percentagewise relative to the change of manifold pressure, since the control valve amplifies (but does not invert) the change of the pressure controller output pressure and since the change in servo force produced by the change of control-valve pressure is in a direction and magnitude to correct the change of throttle position which produced the change of manifold pressure, the system automatically compensates for any tendencies towards instability which exist in the absence of road speed or road load changes. Thus, with the vehicle at set speed and at road load, any increase of the absolute pressure in servo chamber 936 (FIG. 19), will produce an opening of the throttle which will inherently produce a rise in the absolute manifold pressure preceding the rise in torque which will produce an increase in the velocity of the vehicle. The rise in manifold pressure produces, as above described, a reduction in the absolute pressure in the regulator chamber 612 which is communicated to the control valve chamber 614. As a result, the forces tending to close control valve 654 are reduced so that it tends to open further, reducing the pressure in chamber 680 and consequently reducing the pressure in the servo chamber 936 so that the servo changes position to tend to close the throttle and counteract the effects of the original instability. In this manner, as above noted, the pressure controller acts to create a compensatory degenerative or negative feed-back action in a circuit including the servo, the throttle, the intake-manifold pressure, the pressure controller and the control valve, so as to counteract and compensate for any instabilities, and to prevent hunting. The system operates similarly but oppositely in the event of a pressure change in the servo tending to cause a closing of the throttle, in which case the manifold pressure would tend to drop, producing an increase in the pressure in the pressure controller chamber, an increase in absolute pressure in the control valve chamber, and an increased force tending to close the throttle. It is important to bear in mind that the action of this degenerative feedback loop is not the same as the degenerative action produced by passageway or orifice 687 (FIG. 15) and does not require such an orifice for it to be effective.

As above noted, the control valve causes the servo pressure to change directly, not inversely, with the changes in pressure in the control valve chamber produced as a result of the changes in the pressure-controller output pressure resulting from changes in the manifold pressure. Thus, for example, in fully automatic operation of the system of FIGS. 10 through 24, if the absolute pressure in the chamber 612 is 353 inches of water at 50 miles per hour at road load, if there is a 5 inch water drop across orifice 687 so that the absolute pressure in control valve chamber 614 is 358 inches of water, and if the pressure in chamber 674 as a result of the operation of the governor at 50 miles per hour is 381.5 inches of water, it will be perceived that if the internal combustion engine of the vehicle is accelerated, at road load, sufficiently to drop the pressure-controller output pressure to 352 inches of water absolute (as a result of an increase in the absolute pressure in the intake manifold of the engine), the pressure in chamber 614 will fall slightly to 357.7 inches of water (assuming the same air flow from the governor through the orifice 671) which will cause a change of the pressure in the servo from 380 inches of water at 50 miles per hour at road load to 374 inches of water at 50 miles per hour accelerating. Thus, a pressure change of 0.3 inch of water in chamber 614 is reflected as a change of pressure of 6 inches of water in the servo chamber 936. Correspondingly, if the internal combustion engine is decelerated, at road load, so that the manifold pressure drops to 180 inches of water, even though the road speed still remains at 50 miles per hour, the pressure-controller output pressure will rise to 354 inches of water, the pressure in the control valve in chamber 614 will rise to 358.3 inches of water (a slight increase over the pressure at 50 miles per hour at road load) and the pressure in the servo cylinder will rise to 384 inches of water. Thus, the control valve serves to directly magnify the change in the pressure-controller output pressure which occurs as a result of a change in manifold pressure.

These conditions are illustrated by the labeled and cross-hatched areas at the curves of FIG. 25 and are further illustrated in FIG. 26 of the drawings in which it will be seen that the curve of the output pressure in the chamber 612 versus manifold pressure slopes downwardly to the right, an increase in absolute manifold pressure resulting in a smaller decrease in the output pressure, and vice versa. As noted, the output pressure in chamber 612 of the pressure controller is applied to control valve chamber 614 so that the pressure in chamber or cavity 614 is varied as a preselected function of the variations of the pressure of the source, that is, of the intake manifold in the preferred arrangement. In the illustration of FIG. 26, the preselected function is essentially proportionality.

It will be recognized that since the engine torque change varies in accordance with changes of intake manifold pressure and that since the rate of change of vehicle velocity (the magnitude of the acceleration or deceleration of the vehicle) varies in accordance with the change of engine torque, the magnitude of the above-mentioned change of intake manifold pressure, which is sensed in the present system, is an indication of the magnitude of the prospective acceleration or deceleration of the vehicle, so that the magnitude of the corrective signal which is applied by the pressure controller to the control valve (and accordingly by the control valve to the servo and by the servo to the throttle) will vary in accordance with the magnitude of the prospective acceleration or deceleration of the vehicle.

It will be seen that the control valve, including valve 654 and diaphragm 662, senses and responds to change of governor pressure, reflecting road-speed changes, to changes of the pressure-controller output pressure reflecting an opposite change of intake manifold pressure resulting from changes of throttle position and apart from any change of sensed road speed, to changes of servo pressure acting on valve 654 even during fluid-dynamic operation of the servo (the regenerative tendency), to the changes of servo pressure produced during fluid-dynamic operation of the servo and producing a degenerative tendency compensating for the aforesaid regenerative tendency and contributing to the capability of the system to modulate the servo fluid pressure, and to changes of servo pressure acting on valve 654 during fluid-static operation of the servo to cause the valve, once cracked, to regeneratively pop open.

The aforesaid degenerative feedback action is also effective to minimize and effectively prevent hunting, cyclic undulations of the road speed, tending to be initiated as a result of a change of road speed. In a sensitive speed-governing system not having compensatory means, a reduction in road speed from the set value (resulting, for example, from a change of road-load conditions, such as an increase in grade) will produce an error signal causing the throttle to be opened to increase the road speed. In such systems the increased opening of the throttle causes the vehicle to accelerate to a road speed greater than the set road speed since it is only at that time that an adequate reverse signal is received to cause the throttle to move in the closed direction, and again, the vehicle tends to decelerate to a road speed below the set speed since it is only then that an error signal is developed to tend to move the throttle back toward the proper position.

In the disclosed arrangement, means including the above described degenerative feedback loop are effective to cause the change of throttle position resulting from a change of road speed from the set value to vary to a degree commensurate with the speed error. Thus, if the sensed road speed drops, say, from a set speed of 50 miles per hour to a sensed speed of 48 miles per hour as a result of a change of road-load conditions, the absolute governor pressure will fall, decreasing the upward (FIG. 16) force exerted upon the control-valve diaphragm 662 (FIG. 16) so as to tend to close the valve 654, to thereby increase the absolute pressure in servo chamber 936 (FIG. 19) and hence to permit the servo spring to move the throttle in a throttle-opening direction. In the absence of corrective and limiting action by the degenerative feedback loop, the resultant opening of the throttle will tend to cause the vehicle to accelerate to a speed above the set speed. However, when the throttle opens, the absolute intake manifold pressure rises prior to the time that there is any effective output torque change and hence prior to the time that any resultant road speed change can occur. This rise in intake manifold pressure is reflected in a smaller and inverted change in the output pressure appearing in chamber 612 (FIG. 16). The resultant reduction in absolute pressure in the control valve chamber 614 is reflected as a decrased downward (FIG. 16) force on the undersurface of diaphragm 662 thereby tending to move valve 654 in an opening direction. This degenerative feedback tendency to open the valve is less than the speed-change-produced force acting on diaphragm 662 tending to close the valve. As a result, valve 654 takes a position which is less closed than it would be were it not for the degenerative feedback-loop, and, accordingly, the throttle is opened less than would otherwise be the case. It will be observed that the magnitude of the degenerative-feedback-loop-produced force will vary in accordance with the extent to which the throttle is opened in response to the change of sensed speed since the degree of the change of throttle opening will be reflected in a corresponding degree of change of the intake manifold pressure.

The change in force upon the control valve produced by the degenerative feedback action is, as far as the control valve can detect, equivalent to an effective increase and to break up any feedback-loop oscillatory action. in the road speed. Otherwise stated, the feedback-produced change in force is, in effect upon the valve, the same as a reduction in the road speed error signal. As a result, the system is effective to initiate a reduction of the corrective action even before any effective reduction in the magnitude of the speed error signal has in fact occurred. The feedback signal applied to the control valve therefore acts as a false indication of an actual increase in road speed. Otherwise viewed, the effect of the degenerative feedback signal is equivalent to a modulated resetting of the selected, set speed to a degree less than the change of road speed which caused the feedback signal to be produced. Accordingly, in the illustrated arrangement, a change of road-load conditions will actually produce a small change in the controlled road speed of the vehicle which will continue as long as the changed road-load conditions continue. Thus, in the illustrated example there is an effective resetting of the system to a slightly lower controlled speed in response to a continuation of the increased road-load so that there is, in effect, a slight speed drop produced in response to a reduction in road speed.

The degenerative feedback loop similarly serves to prevent hunting during a corrective reduction of the road speed. Thus, if the road speed increases as a result of a change of road-load conditions, such as the reduction in the headwind or a downgrade, the speed error signal will tend to cause the throttle to close, which will reduce the absolute intake manifold pressure, which will be reflected in a smaller percentage and inverted change in pressure on the control valve diaphragm 662 (FIG. 16), so that the control valve will produce a magnified increase in the absolute pressure in servo chamber 936 (FIG. 19) to tend to move the throttle in an opening direction in anticipation of the prospective reduction in road speed.

It will be recognized in both cases that as the road load conditions return to normal, the road speed of the vehicle will again return to the originally set value and that the return to the originally set speed will occur in a modulated and smooth manner, due to the gradual change of the feedback signal.

It will be observed that the pressure in the servo chamber in the disclosed systems changes with changes of the intake manifold pressure to cause the servo piston to move the throttle in a compensatory direction even independently of any change of said speed or road load, so as to tend to stabilize the road speed of the vehicle.

Of course, the magnitude of the degenerative feedback action resulting from changes of manifold pressure must not be excessive and it is for this reason that the uncompensated area of valve 622 is made sufficiently small that the change of output pressure is but a small percentage of the change of manifold pressure which produced it, in the light of the amplifying effect of the control valve. If the degenerative feedback loop is made too effective, it can excessively reduce the sensitivity of the system to road speed changes, it can produce an excessive variation of road speed with changes of road-load conditions, and problems of instability can arise, although the provision of check valve 696 serves to prevent reverse pulsations and to break up any feedback-loop oscillatory action.

In the light of the foregoing discussion, it will be appreciated that the control valve including diaphragm 662 and valve 654 effectively responds to and integrates a plurality of variable signal conditions and controls the pressure in servo chamber 936 in accordance with the indicated result. Thus, in the illustrated arrangement, the control valve responds to and effectively integrates (1) a signal reflecting the difference between set speed and road speed and taking the form of a variable pressure upon the lower (FIG. 16) surface of the diaphragm 662, (2) a signal reflecting a disparity between throttle position and proper throttle position for the set road speed at that road load, that is, a disparity between the actual and equilibrium positions of the throttle, and taking the form of a changed pressure in control valve chamber 614 produced by the pressure controller in response to a change of intake manifold pressure produced either as a result of a change of road-load conditions with a fixed throttle position, or as a result of a change of throttle position independently of any change in road load, or as a result of a combination of those factors, (3) a signal reflecting a change of servo pressure resulting from a change of the position of valve 654 and taking the form of a change of the air pressure applied to the uncompensated area of valve 654 from servo chamber 936, and tending to cause valve 654 to act regeneratively, as previously described, and (4) a signal reflecting servo pressure and taking the form of a change of pressure acting upon the upper (FIG. 16) surface of the diaphragm 662 (FIG. 16) as a result of the pressure drop across orifice 687 (FIG. 15) resulting from the flow of air from the atmosphere, through the servo chamber, past valve 654 and through orifice 687 and tending to act degeneratively, tending to move the valve 654 in a direction opposite to the change of position thereof which produced the change of pressure resulting from the pressure drop across orifice 687.

In FIG. 29 of the drawings, curves representing the operation of the system of FIGS. 10 through 24 in the fully automatic mode are illustrated. The abscissas of the curves 1150, 1152 and 1154 are the distance along a road and it is assumed that the abscissa of curve 1150 represents a level road of a given elevation, and that the abscissas of curves 1152 and 1154 represent conditions during travel along a level road with constant road-load conditions, at a selected set speed such as 60 m.p.h., and under full equilibrium conditions so that the throttle is appropriately positioned and that the vehicle is neither being accelerated nor decelerated.

Curve 1150 illustrates a representative change in the grade of a road in which it is assumed that the grade of the road increases from an initial level to a higher level and that it then (generally symmetrically for purposes of illustration) decreases to the original level.

Curve 1152 represents the change in velocity of the vehicle from a representative equilibrium value (e.g., 60 miles per hour) with the illustrated representative change in grade, and curve 1154 illustrates the corresponding changes of the manifold vacuum, in inches of mercury, from same initial, equilibrium value.

As the vehicle reaches the end 1155 of the initial level stretch of road and reaches the upgrade portion of the road represented in curve 1150, the road speed of the vehicle commences to drop, initiating at point 1156 of curve 1152. Due to factors including friction in the system, no corrective action occurs until the speed error has reached a certain magnitude, in the illustrated arrangement about 0.4 m.p.h. below the selected road speed of 60 m.p.h., as illustrated at point 1158. When this occurs the speed-error signal is sufficient to produce a change in the output pressure of the control valve to cause the servo to move the throttle in a corrective throttle-opening direction. The magnitude of the throttle moving force varies in accordance with the magnitude of the speed error and in the absence of a compensatory action, the throttle would tend to be accelerated to a position appreciably more open than required to correct the speed error. However, the change of throttle position is immediately reflected in a lesser intake-manifold vacuum (an increased absolute intake-manifold pressure) as is illustrated by curve 1154 commencing at point 1160, which initiates the compensatory degenerative feedback action. The road speed continues to drop along portion 1162 of curve 1152 and the servo continues to move the throttle in an opening direction, and the continuing change in throttle position is reflected as is corresponding continuing change in the intake-manifold vacuum, as illustrated by portion 1164 of curve 1154. Throughout this period, the change in intake-manifold vacuum is producing a change in the control valve pressure and hence a change in the servo pressure as a result of the aforesaid degenerative feedback action so that there is in fact a tendency for the road speed to drop more rapidly than if there were no degenerative feedback circuit (that is, for example, if the pressure controller valve were fully compensated). The increased engine torque resulting from the noted change of throttle position and intake-manifold vacuum then begins to become significantly effective so that the deceleration of the vehicle is smoothly reduced towards zero, as is illustrated by portion 1166 of curve 1152, and the rate of change of intake-manifold vacuum also reduces toward and to zero, as is illustrated in portion 1168 of curve 1154.

The conjoint effect of the speed-error signal (the distance between curve 1152 and its abscissa in m.p.h. or the corresponding change in pressure as read from the governor curve of FIG. 25) and of the feedback signal (which varies in accordance with the distance between curve 1154 and its abscissa) causes the deceleration of the vehicle to reach zero at a speed differing from the original speed reflecting the changed load conditions. It is assumed that the rate of change of elevation of the road illustrated in curve 1150 is effectively constant over portion 1172 of curve 1150 so that the system reaches a new equilibrium condition during that portion of the travel of the vehicle. In this new equilibrium condition, the intake-manifold vacuum is constant at a value which differs from its original value by an amount which, in general, varies in accordance with the magnitude of the change of the road-load conditions (here the slope of curve 1150 over portion 1172 thereof). The road speed of the vehicle similarly remains constant over portion 1174 thereof, corresponding to portion 1172 of curve 1150, and assumes a value which differs from the original equilibrium road speed by an amount determined by the change of road-load conditions. In the illustrated arrangement the new road speed is about 1½ m.p.h. lower than the initial road speed and it will be observed that the system acts, with a change in the road-load conditions, just as if the setting of the manual controller had been shifted during constant road-load conditions. This is an illustration of the speed droop of the system, as previously noted.

As the rate of change of the elevation of the road begins to diminish towards zero, as illustrated by portion 1178 of the curve 1150, the road speed of the vehicle commences to rise as illustrated in corresponding portion 1180 of curve 1152, since the new equilibrium conditions of the system are not appropriate for the new road-load conditions. Accordingly, the magnitude of the speed-error signal decreases (as curve 1152 again approaches its abscissa), causing the servo to move the throttle in a throttle-closing direction which is deflected as an increase in intake-manifold vacuum (a decrease in absolute manifold pressure) as is illustrated in portion 1182 of curve 1154. Accordingly, the magnitude of the degenerative feedback signal commences to change in a direction to prevent that excessive movement of the throttle in a closing direction which would otherwise tend to cause serious overshooting of the vehicle speed. The increase in vehicle speed (curve 1152) and the increase in intake-manifold vacuum (decrease in absolute pressure) continues, in the illustrated representative example, while the road (curve 1150) levels off and starts its downslope. Since the road is, at this point, on a downgrade, the vehicle speed will tend to accelerate to a speed in excess of the originally set value, as is illustrated by curve 1152 crossing the abscissa with a positive slope. It will be observed that with the illustrated substantially uniform rate of change of slope of the road over portion 1181, the rate of change of velocity of the vehicle is substantially uniform (uniform acceleration) and the rate of change of manifold vacuum is substantially uniform.

The vehicle velocity then tapers into a new steady value at point 1184 on curve 1152 which is above the original selected value (the abscissa of curve 1152) by an amount which varies in accordance with the disparity between the initial equilibrium road-load conditions and the new equilibrium road-load conditions, and the manifold vacuum similarly tapers to a new value as illustrated at point 1186 on curve 1154.

As the road then levels off, as illustrated at portion 1188 of curve 1150, the velocity of the vehicle commences to decrease since the throttle is not opened sufficiently to maintain the vehicle at the increased velocity unless the vehicle is on a downgrade, as is illustrated at portion 1190 of curve 1152. Accordingly, when the road speed has dropped enough to produce a sensible change in governor pressure the throttle is moved in an opening direction, producing an increase in the manifold vacuum, as is illustrated in portion 1192 of curve 1154. When the road is again essentially level, portion 1194 of curve 1150, the road speed is illustrated to still be above the initial equilibrium road speed at the point, so that the velocity of the vehicle continues to decrease (portion 1196 of curve 1152) toward and to the original equilibrium road speed for the initial, and final, road-load conditions as illustrated in portion 1198 of curve 1152. Similarly, the intake-manifold vacuum reduces towards and tapers to its original value as illustrated by curve portion 1200.

The aforesaid feature of developing a servo-pressure-change-induced degenerative feedback effect during fluid-dynamic operation of the servo to compensate for the regenerative tendency of the control valve and the aforesaid feature of developing a negative or degenerative feedback signal in a loop including the servo, the throttle, the intake-manifold of the engine, the regulator and the control valve can both be incorporated, by design, in the system of FIG. 1. While the system of FIG. 1, as disclosed, can be imbued with these capabilities, it is preferred, as previously noted, that the valve seats with which the regulator valve 244 and the control valve 72 cooperate be reduced effectively to line contact with the valves. Under that circumstance, and as an example, the system of FIG. 1 may be made to partake of both of the noted characteristics by making the internal diameter of the pressure controller housing or body and of the control valve housing or body adjacent the diaphragms 246 and 64 both about 1⅜ inches, the four diaphragm washers 242, 256, 290 and 292 (FIG. 8) each about ⅞ of an inch in diameter, the valve seats 260 and 72 (as modified) about ¼ of an inch and about 0.270 inch, respectively, in diameter, the ball valve 244 about $\%_{32}$ of an inch in diameter, the control ball valve 70 about $\%_{16}$ of an inch in diameter, the passageway 54 about 0.140 inch in diameter, orifice 66 about 0.045 inch in diameter, spring 262 about three pounds and spring 68 about 1½ pounds, servo piston 90—96 about 1$^{11}\!/_{16}$ inches in diameter, and orifice 100 about $\frac{1}{16}$ of an inch in diameter.

It will be recognized that it is possible to apply the principles above described to a system in which a source of pressure above atmospheric pressure is available. By dispensing with the capacity of the above-described systems to compensate for incipient instabilities by sensing the intake manifold pressure changes which precede and anticipate torque changes which must in turn precede and anticipate vehicle road speed changes, the foregoing systems may be adapted to operate with a source of pressure greater than atmospheric simply by connecting the tube normally connected to the manifold to atmosphere and by connecting the filters or other elements normally connected to atmosphere to the source of increased pressure. However, it is preferred that a pressure-type system incorporate means for sensing changes of the manifold pressure of an internal combustion engine, and such a system is illustrated in FIGS. 27 and 28 of the drawings.

In the modified governor illustrated in FIG. 27 of the drawings, the subassembly 158'', mounted upon shaft 124'' is disposed within a body portion 1060 the interior cavity of which is exposed to atmospheric pressure. The valve portion 164', which cooperates with a valve seat 150' on a sleeve 146', controls the flow of air from a source of air pressure greater than atmosphere, tube 1061, through a pipe 1062, through the hollow sleeve 146', to the valve 164'. The tube 1062 may be utilized, in a manner similar to that described in connection with FIG. 3 of the drawings, as a means for selecting the set speed of the vehicle.

As is illustrated in the system of FIG. 28, the tube 1061 of the governor illustrated in FIG. 27 of the drawings is connected to a control valve 1066 including a diaphragm 1068 disposed between a body portion 1070 and a cap 1072. Diaphragm 1068 has an orifice 1074 therein and carries a control valve 1076 cooperating with a valve seat 1078. The control valve cavity 1080 defined by the undersurface of the diaphragm 1068 and body 1070 is connected to a cavity 1082 in a regulator assembly 1084 by means of a port or orifice 1086. Chamber 1082 is bounded by the pressure controller body 1088 and by the undersurface of a diaphragm 1090 which is spaced below a diaphragm 1092. Diaphragms 1090 and 1092, with the diaphragm 1090 having a larger effective area than diaphragm 1092, define a chamber 1094 which communicates via a tube 1096 with the intake manifold of the internal combustion engine. The upper surface of diaphragm 1092, in cooperation with a cover 1098, defines a chamber 1100 which is in communication with the atmosphere through an orifice 1102 in a plug 1104 mounted centrally on the cover 1098. The central portion of diaphragm 1092, which is rendered integral with the central portion of diaphragm 1090 by means of a clamping and sleeve assembly 1106, is biased downwardly by a spring 1108 acting against the cover 1098. The assembly 1106 carries a ball valve 1110 which cooperates with a valve seat 1112 which communicates by means of a fitting 1114 with a source 1116 of air at a pressure greater than atmospheric pressure.

Since the source 1116, is assumed to supply air at a substantially constant pressure, the pressure in cavity 1082 tends to be constant. However, the manifold pressure acting upon the differential area of the valve diaphragms 1090 and 1092 causes the pressure in chamber 1082 to rise and fall in proportion to manifold pressure. However, in this case, an increase in absolute manifold pressure, resulting from opening of the throttle, will be reflected as an increase in the absolute pressure in chamber 1082, that is, the relationship is direct rather than inverse. It will be recognized that the effect of manifold pressure upon the differential effective areas of diaphragms 1090 and 1092 is the counterpart of the effect of the manifold pressure upon the uncompensated area of the valve 622 (FIG. 16) in the previously described system. Again, however, in the preferred arrangement, the percentage change in pressure in chamber 1082 is smaller than the percentage change in absolute manifold pressure, and can be adjusted by varying the relative effective areas of diaphragms 1090 and 1092.

The pressure in chamber 1082 is communicated through orifice 1118 to the control valve chamber 1080, orifice 1118 having an effective area, for example, of 0.008 square inch. This pressure in chamber 1080, which is greater than atmospheric pressure, causes air to flow through orifice 1074 in diaphragm 1068, through tube 1061, fitting 1062 (FIG. 27) through the valve 150'—164' and to the atmosphere. The governor modulates the pressure in the chamber in the control valve which is above the diaphragm 1068 in accordance with the rotational velocity of the shaft with which the governor is associated. For example, with a set speed of 50 miles per hour, the pressure in that chamber will be 1.55 pounds per square inch above atmospheric when the road speed at road load is 50 miles per hour, will be 1.83 pounds per square inch at a road speed of 45 miles per hour, at road load, and will be 1.23 pounds per square inch above atmospheric pressure at a road speed of 55 miles per hour, at road load. This pressure in the chamber above diaphragm 1068 will exert a downward force upon diaphragm 1068 aiding the downward force exerted thereon by spring 1120. This downward force will be opposed by an upward force resulting from the action of the pressure in control valve chamber 1080 upon the effective area of the undersurface of diaphragm 1062, coupled with any pressure acting upon the effective area of the control valve 1076, as a result of the pressure in chamber 1122 beneath that control valve.

Chamber 1122 is connected by means of a tube 1124 to chamber 1126 of servo 1128. Chamber 1126 is bounded at one side by a piston 1130 having a piston rod 1132. Spring 1134 exerts a force tending to move piston 1130 to the left, in a direction to reduce the effective size of the chamber 1126. In a manner similar to that described in connection with FIG. 1, piston rod 1132 is coupled to the carburetor control arm 1136 by means of a chain 1138, arm 1136 being coupled to the accelerator pedal in the normal manner by means including link 1140.

When the vehicle approaches the set speed so that the control valve 1076 tends to open, air will flow from chamber 1080 past control valve 1076, through chamber 1122, tube 1124, chamber 1126, and to atmosphere through an orifice 1142 formed in the piston 1130. The resultant increase in pressure in chamber 1126 will exert a force upon the piston 1130 tending to move it to the right against the counter force of the spring 1134, to exert a force upon chain 1138 which will move the carburetor control arm 1136 in a throttle-closing direction.

It will be apparent that the regenerative and degenerative forces acting upon the control valve in the embodiments hereinbefore described are also effective in the system of FIG. 28. Additionally, the system of FIG. 28 also possesses the previously discussed advantage of automatically compensating for any tendencies towards instability by effectively sensing and responding to an incipient change of road speed before it occurs by sensing the changes of manifold pressure which must precede a change in torque which must precede a change in road speed. Thus, as noted before, the pressure in chamber 1082 changes in a direct relationship with changes in the intake manifold pressure of the engine. For example, with the source 116, a compressor or a storage tank, being at a pressure of 100 pounds per square inch above atmospheric, with an effective valve area for valve 1112 of 0.012 square inch, with an effective area of diaphragm 1090 of one square inch, with an effective area of diaphragm 1092 of 0.85 square inch, and with a spring force exerted by spring 1108 of 10.2 pounds, at 50 miles per hour and at road load, the manifold pressure in the chamber between diaphragms 1092 and 1090, will for example, be 6 pounds per square inch below atmospheric, producing a pressure in chamber 1082 of 8.1 pounds per square inch above atmospheric. If, at 50 miles per hour, the throttle is opened to tend to accelerate the vehicle by an amount such that the manifold pressure in the chamber between diaphragms 1090 and 1092 rises one pound per square inch so that it is only 5 pounds per square inch below atomspheric, the pressure in chamber 1082 will rise to 8.25 pounds per square inch above atmospheric. This increase in pressure will be communicated to the control valve chamber 1080 and the resultant increase in pressure in that chamber will exert a force tending further to open control valve 1076, as a result of which the pressure in the servo chamber 1126 will be increased so as to increase the force tending to move piston 1130 to the right and hence to move the carburetor control arm 1136 in the throttle closing direction. Thus, the manifold pressure acting upon the differential area of the valve diaphragms 1090 and 1092 causes the pressure in chamber 1082 to rise and fall in direct relation to the manifold pressure but with a smaller percentage change than that experienced in the manifold, and this pressure change is effectively magnified by the control valve 1066 and applied to the servo 1128 to produce an appropriate adjustment of the position of the carburetor arm 1136 to terminate the tendency toward acceleration before any effective and sensible change in the vehicle's speed has in fact occurred. The system operates reversely in the event of deceleration of the engine.

It will be noted that certain of the principles of the system above disclosed can be applied to the control of engine or other speeds and that it is possible to sense carburetor venturi pressure rather than intake-manifold pressure. However, since changes of venturi pressure lag in time the changes of intake manifold pressure, the illustrated arrangements are preferred. If venturi pressure is to be sensed, the phase of the output signal from the pressure controller will have to be inverted from that of the disclosed arrangements since venturi pressure and intake manifold pressure vary inversely with respect to one another. This could be accomplished, as on example, by utilizing a dual-diaphragm pressure controller of the type shown in FIG. 28, but inverting the two diaphragms, that is making the upper diaphragm larger in effective area than the lower diaphragm.

It will further be appreciated that a number of the principles of the present invention are applicable to other types of fluid pressure responsive and controlling apparatus, including hydraulic apparatus.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a vehicle, the combination of an internal combustion engine having a throttle and a source of air which changes in pressure as a result of movement of said throttle prior to the change of output torque of the engine which results from the movement of said throttle, and road speed stabilizing means comprising control means responsive to said changes in pressure in either direction and effective independently of any change of road speed and independently of any change of road load of said vehicle, and means controlled by said control means for moving said throttle to change said pressure in the opposite direction.

2. The combination of claim 1 further including governing means responsive to the road speed of said vehicle for moving said throttle in a direction and by an amount to compensate for a sensed road speed chnage, in which said control means is responsive to the changes in pressure of said source produced as aresult of movement of said throttle by said governing means in response to a road speed change and is effective independently of any subsequent change in road speed produced as a result of that movement of said throttle, and in which said means controlled by said control means moves said throttle in the opposite direction and to a lesser amount of partially restoring the position of said throttle.

3. In a vehicle, the combination of an internal combustion engine having a throttle and a source of air which changes in pressure by an amount and in a sense which varies in accordance with the amount and direction of movement of the throttle from an initial equilibrium position, and road speed stabilizing means comprising control means responsive to said changes in pressure and effective independently of any change of road speed of said vehicle, and means controlled by said control means for producing a force for moving said throttle in the opposite direction towards said equilibrium position.

4. The combination of claim 3 in which said force varies in direction in accordance with the sense of the variation of said pressure and varies in magnitude in accordance with the amount of the change of said pressure.

5. The combination of claim 4 in which said throttle is an element of a throttle mechanism including an accelerator pedal operable by the operator in which said source of air is the intake manifold of said engine, in which said vehicle has a rotatable element rotating at a velocity related to the road speed of the vehicle, the atmosphere and the intake manifold constituting two sources of air at differing pressures, in which said control means includes an air pressure chamber, speed-sensing means driven by said rotatable element, air pressure modulating valve means actuated by said speed-sensing means, manually settable means for controlling the relationship between the rotational speed of said speed-sensing means and the position of said valve means, a fixed orifice, means including said valve means for controlling the flow of air in a path from atmosphere to the intake manifold including said valve means and said orifice for controlling the air pressure applied to said chamber, said valve means comprising a pair of cooperable valve and valve seat elements, said valve seat element comprising an aperture, said valve element having two faces one of which is in cooperative relationship with said aperture and exposed to one of said sources through said aperture and the other of which is exposed to the other one of said sources via said fixed orifice, and means supporting said valve element for movement towards and away from said valve seat element for changing and modulating the rate of flow of air therebetween in accordance with variations of the speed of said governing means over a substantial range of variations in speed of said governing means, and in which said means controlled by said control means comprises means coupled to the throttle mechanism for applying a force to the throttle mechanism in accordance with the pressure in said chamber.

6. In a system for controlling an internal combustion engine having a throttle and a source of air which changes in pressure as a result of movement of the throttle prior to a resultant change of output torque of the engine, the combination of air-pressure-differential responsive force-producing means coupled to the throttle, pressure controlling means connected to the source of air and producing an output pressure which varies with variations of the air pressure of the source resulting from movement of the throttle, control valve means responsive to said output pressure for controlling the pressure differential applied to said force-producing means, and means including said pressure controlling means, said control valve means and said force-producing means responsive to a change of the air pressure of the source resulting from movement of the throttle for changing the force applied to the throttle.

7. In a system for controlling an internal combustion engine having a throttle and a source of air which changes in pressure as a result of movement of the throttle prior to a resultant change of output torque of the engine, the combination of air-pressure-differential responsive force-producing means coupled to the throttle, pressure controlling means connected to the source of air and producing an output pressure which varies with variations of the air pressure of the source resulting from movement of the throttle to a smaller percentage than the percentage change of the air pressure of the source, control valve means responsive to said output pressure for controlling the pressure differential applied to said force-producing means and for changing the pressure differential applied to said force-producing means to a greater percentage than the percentage change of said output pressure, and means including said pressure controlling means, said control valve means and said force-producing means responsive to a change of the air pressure of the source resulting from movement of the throttle for changing the force applied to the throttle.

8. The combination of claim 7 in which said last-mentioned means is responsive to a change of the air pressure of the source resulting from movement of the throttle in one sense for changing the force applied to the throttle in a direction tending to move the throttle in the opposite sense.

9. The combination of claim 7 in which the source of air which changes in pressure prior to a change of output torque of the engine is the intake manifold of the engine.

10. The combination of claim 9 in which said output pressure varies inversely with variations of the air pressure of the source, and in which the pressure differential applied to said force-producing means by said control valve means changes directly with changes of said output pressure.

11. The combination of claim 10 further including pressure-controlling means responsive to the rotational velocity of an element rotated by the engine, and in which said control valve means is further responsive to said speed-responsive means for controlling the pressure differential applied to said force-producing means.

12. In a system for controlling an internal combustion engine having a throttle and an intake manifold the air pressure in which changes as a result of movement of the throttle prior to a resultant change of output torque of the engine, the combination of air-pressure-differential responsive force-producing means coupled to the throttle, pressure controlling means connected to the intake manifold and producing an output pressure which varies with variations of the air pressure in the intake manifold resulting from movement of the throttle, control valve means responsive to said output pressure for controlling the pressure differential applied to said force-producing means, and a degenerative feedback loop for compensating for changes of the position of the throttle comprising the throttle, the intake manifold, said pressure controlling means, said control valve means, and said force-producing means.

13. In a fluid-dynamic system for association with first and second sources of fluid at different pressures, the combination of fluid-pressure-differential responsive force-producing means including a first chamber, a movable element responsive to the difference in the pressure of the first source and the pressure in said first chamber, and means for flowing fluid through said first chamber comprising first orifice means connected to the first source and a passageway; control valve means including a second chamber, a valve, and fluid-pressure responsive movable means responsive to the pressure in said second chamber for controlling said valve; means connecting said second chamber to the second source; and means including said valve connecting said second chamber to said passageway.

14. The combination of claim 13 in which the fluid pressure in said first chamber exerts a force on said valve tending to maintain said valve closed, and in which the reduction of said force on said valve in response to a partial opening of said valve by said movable means tends to cause said valve to fully open.

15. In a fluid-dynamic system for association with first and second sources of fluid at different pressures, the combination of fluid-pressure-differential responsive force-producing means including a first chamber, a movable element responsive to the difference between the pressure of the first source and the pressure in said first chamber, and means for flowing fluid through said first chamber comprising first orifice means connected to the first source and a passageway; control valve means including a second chamber, a valve, and fluid-pressure responsive movable means responsive to the pressure in said second chamber for controlling said valve; means including second orifice means connecting said second chamber to the second source; and means including said valve connecting said second chamber to said passageway.

16. The combination of claim 15 in which the flow of fluid between the first and second sources through said first and second chambers in response to a partial opening of said valve produces a pressure change in said second chamber resulting from the pressure drop across said second orifice means in a sense tending to cause said movable means to close said valve.

17. The combination of claim 16 in which the fluid pressure in said first chamber exerts a force on said valve tending to maintain said valve closed, in which the reduction of said force on said valve in response to a partial opening of said valve by said movable means tends to cause said valve to fully open, and in which said tendency of said movable means to close said valve and said tendency of said valve to fully open are at least at times substantially compensatory.

18. In a fluid-pressure controlling system for association with a source of significantly varying fluid pressure, the combination of a fluid-pressure responsive control device, pressure controlling means connected to the source for producing an output fluid pressure which changes in accordance with but to a smaller percentage than the changes of fluid pressure of the source, and control valve means responsive to said output fluid pressure for applying to said fluid-pressure responsive control device a pressure which changes in accordance with but to a greater percentage than the changes of said output fluid pressure.

19. The combination of claim 18 in which said output fluid pressure changes inversely with changes of the fluid pressure of the source.

20. The combination of claim 18 in which said output fluid pressure is below atmospheric pressure and changes inversely with changes of the fluid pressure of the source, in which the control device is responsive to the difference between the pressure applied thereto by said control valve means and atmospheric pressure and in which said control valve means applies to said control device a pressure which changes directly in accordance with the changes of said output fluid pressure.

21. The combination of claim 20 in which the source of fluid pressure is the intake manifold of an internal combustion engine and in which the control device controls the throttle of the internal combustion engine.

22. Fluid-pressure-differential responsive force-producing means comprising a body having a chamber therewithin, movable piston means in said body adjacent said chamber and movable with respect to said body in response to the fluid pressure in said chamber, a cylindrical shaft fixed against movement in translation relative to said body and having a longitudinal axis, and means for rotating said piston means within said body about the longitudinal axis of said shaft comprising rigid link means pivotally secured to said piston means and to said shaft.

23. In a fluid-pressure-responsive apparatus, a body having a first chamber therein, means for controllably changing the fluid pressure in said first chamber, first movable piston means adjacent said first chamber and movable with respect to said body in response to changes in the fluid pressure in said first chamber, means including said first piston means for defining a second chamber, means for controllably changing the fluid pressure in said second chamber and second movable piston means adjacent said second chamber and movable with respect to said first piston means in response to changes in the fluid pressure in said second chamber.

24. In a fluid-pressure-responsive apparatus, a body having a first chamber therein, means for controllably changing the fluid pressure in said first chamber, first movable piston means adjacent said first chamber and movable with respect to said body in response to changes in the fluid pressure in said first chamber, means including said piston means for defining a second chamber, means for controllably changing the fluid pressure in said second chamber, second movable piston means adjacent said second chamber and movable with respect to said first piston means in response to changes in the fluid pressure in said second chamber, and valve means controlled by said second piston means for controlling the fluid pressure in said first chamber.

25. In a fluid-pressure-responsive apparatus, a body having a first chamber therein, a controlled element, and means for moving said controlled element relative to said body comprising first and second piston means having a second chamber therebetween, said first piston means being responsive to the fluid pressure in said second chamber to move said controlled element relative to said second piston means, and means thereafter effective for mechanically connecting said controlled element to said second piston means for movement therewith relative to said body, said second piston means being responsive to the fluid pressure in said first chamber to move relative to the said body.

26. In a governing system for association with a rotatable element, mechanism for controlling the velocity of rotation of the rotatable element including an internal combustion engine having a carburetor, a throttle and an intake manifold having therein air at a pressure below atmospheric pressure, the combination of air pressure actuated force-producing means for controlling the mechanism and for exerting a force on the mechanism having a magnitude which varies in accordance with the magnitude of the air pressure applied to said force-producing means, means including air-pressure differential responsive control valve means for controlling said force-producing means and for controlling air flow in a path from atmosphere to the intake manifold for controlling the application of air pressure to said force-producing means having a magnitude which varies in accordance with the air pressure differential applied to said control means, and means including an air pressure controlling governor driven by the rotatable element for modulating the air pressure differential applied to said control valve means in accordance with the velocity of rotation of the rotatable element.

27. In a governing system for association with a rotatable element, mechanism for controlling the velocity of rotation of the rotatable element including an internal combustion engine having a carburetor, a throttle and an intake manifold having therein air at a pressure below atmospheric pressure, the combination of air pressure actuated force-producing means for controlling the mechanism and for exerting a force on said mechanism having a magnitude which varies in accordance with the magnitude of the air pressure applied to said force-producing means, means including fluid-pressure responsive control valve means for controlling said force-producing means and for controlling air flow in a path from atmosphere to the intake manifold for controlling the application of air pressure to said force-producing means having a magnitude which varies in accordance with the air pressure differential applied to said control valve means, said control valve means including a pair of chambers and an air-pressure displaceable element disposed between said chambers, means connecting one of said chambers to the source, and means for varying the air pressure in the other one of said chambers in accordance with the velocity of rotation of the rotatable element comprising means including a governor driver by the rotatable element for modulating the flow of air in a path including said other one of said chambers.

28. In a governing system for association with a rotatable element, mechanism for controlling the velocity of rotation of the rotatable element and a source of air at a pressure differing from atmospheric pressure, the combination of pressure actuated force-producing means for controlling the mechanism, an air-pressure responsive control valve controlling said means, said control valve including a pair of chambers and an air-pressure displaceable element disposed between said chambers, means connecting one of said chambers to the source, an orifice interconnecting said chambers, an air-flow controlling valve interconnecting the other one of said chambers and the atmosphere, and governor means driven by said rotatable element for controlling said air-flow controlling valve.

29. The combination of claim 28 in which said means connecting one of said chambers to said source includes pressure-controlling means for varying the pressure of the air in said cavity as a preselected function of variations of the pressure of the source including a cavity, an air pressure displaceable diaphragm having one face exposed to atmospheric pressure and another face exposed to the air in the cavity, spring means for biasing said diaphragm, valve means controlled by said diaphragm and having a face exposed to the source and controllably connecting said cavity to the source and a passageway connecting said cavity to said one of said chambers.

30. The combination of claim 28 in which the source is the intake manifold of an internal combustion engine which rotates the rotatable element, and in which said means connecting one of said chambers to the source includes pressure-controlling means connected to the intake manifold for reducing the effects of the fluctuations of the air pressure in the intake manifold upon the flow of air through said one of said chambers and pressure-controlling means comprising a cavity, passageway means connected to said cavity and to said one of said chambers.

31. In a governing system for association with a rotatable element, mechanism for controlling the velocity of rotation of the rotatable element and first and second sources of air at pressures differing from one another, the combination of a pressure actuated force-producing means for controlling the mechanism, said force-producing means including a chamber, an orifice connecting said chamber to the first source, means for establishing an air-flow path between the first source, through said orifice, and through said chamber to the second source, governing means driven by the rotatable element, air pressure modulating valve means controlled by said governing means, and means including said governing means and said valve means for modulating the rate of flow of air through said air-flow path in accordance with changes in the velocity of rotation of the rotatable element and for modulating the air pressure in said chamber in accordance with the variations of the pressure drop across said orifice with variations of said rate of air flow.

32. The combination of claim 31 in which the second source is the intake manifold of an internal combustion engine, further including pressure-controlling means connected to the intake manifold for reducing the effects of the fluctuations of the air pressure in the intake manifold upon the rate of flow of air through said air-flow path, said pressure-controlling means comprising a cavity, and passageway means connected to said cavity, and in which said airflow path includes said cavity and said passageway means.

33. In a governing system for association with a vehicle having a throttle for controlling the road speed of the vehicle, means exerting a first force on the throttle in a direction tending to move the throttle in a vehicle-velocity decreasing direction, and a rotatable element the velocity of rotation of which varies in accordance with the road speed of the vehicle, the combination of governing means driven by the rotatable element, means including movable valve means and air-pressure-differential-actuated force-producing means and controlled by said governing means and effective when the rotational velocity of the element reaches a selected value for exerting a force on the throttle additional to said first force, and means for limiting the maximum reactive force exerted by said last-named means on the throttle in response to movement of the throttle in a vehicle-velocity increasing direction to a first value when the rotational velocity of the element is below said selected value and to a higher value when the rotational velocity of the element is above said selected value.

34. In a governing system for association with a vehicle having a rotatable element rotatable at a velocity which varies with the velocity of the vehicle and a throttle movable under the control of an operator in one direction to increase the velocity of the vehicle and in another direction to decrease the velocity of the vehicle, the combination of fluid-pressure actuated force-producing means coupled to the throttle and effective upon the establishment of a pressure differential of a predetermined magnitude to exert a force tending to move the throttle in said other direction, means including a fluid-pressure controlling governor driven by the rotatable element for controlling the magnitude of said pressure differential, means for limiting the reactive force exerted by said force-producing means on the throttle in response to movement of the throttle in said one direction comprising a spring-biased relief valve for limiting the magnitude of said pressure differential to a first preselected finite maximum value, and means effective when the velocity of rotation of said rotatable element is in excess of a preselected velocity for increasing the spring bias on said relief valve.

35. In a governing system for association with and for controlling the velocity of a vehicle having a rotatable element rotatable at a velocity which varies with the velocity of the vehicle, a throttle linkage including an accelerator pedal movable in one direction to increase the velocity of the vehicle and in another direction to decrease the velocity of the vehicle and an intake manifold serving as a source of air pressure differing from and below atmospheric pressure; the combination of means including air-pressure actuated force-producing means coupled to the throttle linkage for exerting a force tending to move the throttle linkage in one of said directions having a preselected magnitude when a preselected air pressure below atmospheric is applied thereto and having a magnitude which changes from said preselected magnitude in direction and degree in accordance with the direction and magnitude of the changes of the air pressure applied thereto, said force-producing means including a variable-volume chamber and means including the intake manifold for applying said preselected air pressure to said force-producing means when said rotatable element is rotating at a preselected velocity and for changing the air pressure applied to said force-producing means in direction and magnitude in accordance with the direction and magnitude of the changes of the velocity of rotation of said rotatable element from said preselected velocity comprising an air-pressure responsive control valve including first and second chambers, an air-pressure displaceable element disposed between said first and second chambers, and valve means controlled by said displaceable element to interconnect said first control-valve chamber and said variable-volume chamber; means for connecting said first control-valve chamber to the intake manifold; and means for varying the air pressure in said second control-valve chamber comprising a governor driven by the rotatable element.

36. In a governing system for association with a vehicle having a rotatable element rotatable at a velocity which varies with the velocity of the vehicle, a throttle movable under the control of an operator in one direction to increase the velocity of the vehicle and in another direction to decrease the velocity of the vehicle, the combination of means including fluid-pressure actuated force-producing means coupled to the throttle and effective upon the establishment of a pressure differential of a predetermined magnitude to exert a force tending to move the throttle in one of said directions, said force-producing means including a variable-volume chamber, a fluid pressure responsive control valve including first and second chambers, a fluid pressure displaceable element disposed between said first and second chambers, and valve means controlled by said displaceable element to interconnect said first control-valve chamber and said variable-volume chamber; means for connecting said first control-valve chamber to the source; an orifice interconnecting said first and second control valve chambers; and means for varying the fluid pressure in said second control valve chamber comprising governor means connected to said second control valve chamber and to the atmosphere for regulating the flow of fluid between the atmosphere and the source through said orifice.

37. In a governing system for association with a vehicle having an operator actuatable accelerator pedal linkage for controlling the velocity of the vehicle and an element which rotates at a velocity determined by the velocity of the vehicle, the combination of means for applying a force to the accelerator pedal linkage which varies in magnitude as a continuous function of the magnitude of the increase of the rotational velocity of the element from a selected velocity over a substantial range of increase of the rotational velocity of the element comprising means including fluid-pressure-differential responsive actuator means coupled to the accelerator pedal linkage for selectively exerting a force thereon in a direction to reduce the velocity of the vehicle, fluid-pressure-differential responsive valve means for controlling said actuator means, and governing means controlled by the element for varying the differential fluid pressure applied to said valve means as a continuous function of the magnitude of the increase of the rotational velocity of the element from a selected velocity over a substantial range of increase of the rotational velocity of the element.

38. The combination of claim 37 in which the vehicle includes an engine having an intake manifold having air therein at a pressure below atmospheric pressure, in which said actuator means and said valve means are responsive to air pressure differentials, and in which said valve means includes a pair of cooperable control valve elements one of which is movable with respect to the other to control the flow of air via a path including atmosphere, an orifice and the intake manifold to control the pressure applied to said actuator means, said movable control valve elements having an area which is exposed to a change in air pressure produced as a consequence of the movement of said movable element relative to said other valve element in a direction to exert a first force upon said area of said movable valve element in a direction to tend to cause said movable valve element to move further in the same direction regeneratively, and means for applying a force to said movable valve element opposing said first force comprising a pressure sensing device mechanically connected to said movable valve element for sensing said change in pressure produced as a consequence of said movement of said movable valve element and for mechanically applying to said movable valve element a force opposing said first force.

39. The combination of claim 37 in which said valve means is disposed between said actuator means and a source of fluid pressure, and further including an orifice between said valve means and said source for controlling the pressure applied to said fluid pressure differential responsive valve means.

40. In a governing system for association with a vehicle having an operator actuatable accelerator pedal linkage for controlling the velocity of the vehicle and an element which rotates at a velocity determined by the velocity of the vehicle, the combination of means for applying a force to the accelerator pedal linkage which varies in magnitude as a continuous function of the magnitude of the deviation of the rotational velocity of the element from a selected velocity over a substantial range of such deviations comprising means including fluid-pressure-differential responsive actuator means coupled to the accelerator pedal linkage for selectively exerting a force thereon in a direction to change the velocity of the vehicle, fluid-pressure-differential responsive valve means for controlling said actuator, and governing means controlled by the element for varying the differential fluid pressure applied to said valve means as a continuous function of the magnitude of the deviation of the rotational velocity of the element from a selected velocity over a substantial range of such deviations.

41. In a governing system for association with a vehicle having a movable member for controlling the velocity of the vehicle and an element which rotates at a velocity determined by the velocity of the vehicle, the combination of a fluid-pressure-differential responsive actuator coupled to the member, fluid-pressure-differential responsive valve means for controlling said actuator, governing means controlled by the element for controlling the differential fluid pressure applied to said valve means, and means including said valve means effective when the throttle is advanced to a position to increase the velocity of the vehicle rapidly for reducing the fluid-pressure differential at said actuator effectively to zero.

42. In a governing system for association with a vehicle having a throttle mechanism movable in one direction upon the application of a force of appropriate magnitude thereon by an operator to control the velocity of the vehicle and an element which rotates at a velocity determined by the velocity of the vehicle, means effective when a force within a predetermined range of magnitudes is applied to the throttle mechanism by the operator and when the velocity of the vehicle is within a range of values including any preselected value for maintaining the velocity of the vehicle effectively constant despite variations in the power requirements of the vehicle comprising means including fluid-pressure-responsive force-producing means coupled to the throttle mechanism and applying a force to the throttle mechanism in a direction to oppose the force applied thereto by the operator, valve means responsive to varying pressure differentials and effective over a range of such varying pressure differentials for modulating the pressure differential at said force-producing means in accordance with variations in the pressure differential applied to said valve means, and governor means selectively settable to a plurality of values including said any preselected value for modulating the pressure differential applied to said valve means in accordance with the rotational velocity of the element and in accordance with the setting of said governor.

43. In a governing system for association with a vehicle having a rotatable element rotatable at a velocity which varies with the velocity of the vehicle, a throttle control linkage movable in one direction to increase the velocity of the vehicle and in another direction to decrease the velocity of the vehicle, and a source of fluid pressure differing from atmospheric pressure; the combination of means including fluid-pressure actuated force-producing means having an actuating chamber and a fluid inlet and a fluid outlet and means coupled to the throttle control linkage for exerting a force tending to move the throttle control linkage in one of said directions and having a preselected magnitude with a preselected fluid pressure therein developed as a result of a preselected effective fluid flow therethrough and having a magnitude which changes from said preselected magnitude in direction and degree in accordance with the direction and magnitude of the changes of the effective fluid flow therethrough and through said fluid inlet and fluid outlet, means for establishing an effective fluid flow path including the source, said fluid inlet, said actuating chamber and said fluid outlet, and means including governor means driven by the rotatable element and fluid flow controlling valve means controlled by said governor means for controlling the effective flow of fluid in said actuating chamber of said force producing means via said fluid flow path for establishing said preselected effective fluid flow through said actuating chamber of said force-producing means when said rotatable element is rotating at a preselected velocity and for modulating the effective fluid flow through said actuating chamber of said force-producing means in direction and magnitude in accordance with the direction and magnitude of the changes of the velocity of rotation of said rotatable element from said preselected velocity.

44. The combination of claim 43 further including means for adjusting said preselected velocity of rotation of the rotatable element for varying the velocity of the vehicle.

45. The combination of claim 43 in which the source of fluid pressure is the intake manifold of the engine of the vehicle, in which said fluid flow path further includes a connection to the atmosphere via said fluid inlet, and in wich air flows under the control of said control valve from atmosphere through said fluid inlet into said chamber, out of said chamber through said fluid outlet and towards the intake manifold of the engine.

46. The combination of claim 45 in which said effective fluid flow through said actuating chamber is modulated over a range of changes from said preselected velocity of rotation of said rotatable element from said preselected velocity representing a few miles per hour variation in the speed of the vehicle, in which maximum flow of air is established from said chamber via said fluid outlet to rapidly reduce the pressure in said chamber when the velocity of rotation of said rotatable element differs from said preselected velocity by more than said range in one sense, in which flow of air from said chamber via said fluid outlet is prevented for rapidly increasing the pressure in said chamber as a result of flow of air from atmosphere into said chamber via said fluid inlet when the velocity of rotation of said rotatable element differs from said preselected velocity by more than said range in the other sense.

47. The combination of claim 46 in which said control valve repetitively opens and closes the path between said chamber and the intake manifold when said rotatable element is rotating at said perselected velocity independently of any change of the rotational velocity of said element and independently of any movement of said throttle linkage to establish said preselected fluid flow as the average fluid flow from said chamber.

48. The combination of claim 46 in which said governor means comprises speed-sensing means, including means for sensing the velocity of rotation of the rotatable element and manually settable means for selecting a nominal controlled velocity of rotation of the rotatable element, for producing a preselected output signal when the sensed velocity of rotation of the rotatable element is the same as the selected nominal velocity of rotation of the rotatable element and for producing an output signal which varies from said preselected output signal in accordance with the direction and magnitude of the difference between the sensed velocity of rotation of the rotatable element and the selected nominal controlled velocity of rotation of the rotatable element over a range of variations of the velocity of rotation of the rotatable element from said selected nominal controlled velocity of rotation and in which said valve means is responsive to said output signal.

49. The combination of claim 48 in which the rotatable element is the speedometer cable of the vehicle, in which the means for sensing the velocity of rotation of the rotatable element is disposed between the speedometer cable and the pointer of the speedometer of the vehicle and includes a pair of elements the effective relationship between which determines said output signal, and means for varying the effective relationship between said elements from a preselected relationship in accordance with the direction and magnitude of the difference between the sensed velocity of rotation of the speedometer cable and the selected nominal controlled velocity of rotation of the speedometer cable over a range of such variations, and in which said manually settable means is manually movable to select said preselected relationship of said elements of said means for sensing the velocity of rotation of the rotatable element to select the nominal controlled velocity of rotation of the rotatable element at which said preselected output signal will be produced.

50. In a governing system for association with a rotatable element, mechanism for controlling the velocity of rotation of the rotatable element and a source of air pressure differential, the combination of air-pressure-differential-actuated force-producing means for controlling the mechanism, air-pressure-differential-responsive control valve means for controlling the air pressure differential applied to said force-producing means from the source in accordance with the air-pressure differential applied to said control valve means, rotational-velocity-responsive governing means driven by the rotatable element, and means including air pressure modulating governor valve means separate from said control valve means and controlled by said rotational-velocity-responsive governing means and connected to said control valve means for modulating the air pressure differential applied to said control valve means in accordance with the velocity of rotation of the rotatable element.

51. The combination of claim 50 in which said air pressure modulating governor valve means comprises a valve seat portion and a valve member portion cooperating with said valve seat portion to control the flow of air therethrough, and in which said rotational-velocity-responsive means comprises a generally annular pretensioned spring rotated about a diametrical axis by the rotatable element and having one portion adjacent said axis engageable with one of said valve member portions for exerting a force thereon, and a pair of weights secured to said spring at diametrically opposed points spaced from said axis and effective upon rotation of said spring to change the magnitude of the force exerted upon said one of valve member portions by said one portion of said spring.

52. In a governing system for association with a rotatable element, mechanism for controlling the velocity of rotation of the rotatable element and a source of air pressure differential, the combination of air-pressure-differential-actuated force-producing means for controlling the mechanism, air-pressure-differential-responsive control valve means for varying the air pressure differential applied to said force-producing means from the source in accordance with the air pressure differential applied to said control valve means, adjustable rotational-velocity-responsive governing means driven by the rotatable element, and means including air pressure modulating governor valve means separate from said control valve means and controlled by said rotational-velocity-responsive governing means and connected to said control valve means for modulating the air pressure differential applied to said control valve means in accordance with the difference between the velocity of rotation of the rotatable element and a selectable velocity.

53. In a governing system for association with a rotatable element, mechanism for controlling the velocity of rotation of the rotatable element and a source of air pressure differential, the combination of air-pressure-differential-actuated force-producing means for exerting a force upon the mechanism which varies in accordance with the air pressure differential applied to said force-producing means, air-pressure-differential-responsive control valve means for varying the air pressure differential applied to said force-producing means from the source in accordance with the variations of the air pressure differential applied to said control valve means, rotational-velocity-responsive governing means driven by the rotatable element, and means including air pressure modulating governor valve means controlled by said governing means for modulating the air pressure differential applied to said control valve means in accordance with the velocity of rotation of the rotatable element.

54. In a governing system for association with a vehicle having an internal combustion engine having an intake manifold, a movable member for controlling the velocity of the vehicle and a rotatable element, the combination of air-pressure-differential-responsive actuator means coupled to the movable member, air-pressure-differential-responsive valve means for controlling said actuator means in accordance with the air-pressure differential applied to said valve means, pressure controlling means connected to the intake manifold and including a cavity, air-pressure displaceable diaphragm means responsive to the pressure of the air in said cavity, spring means for biasing said diaphragm means, pressure-controlling valve means controlled by said diaphragm means and varying the pressure of the air in said cavity as a preselected function of variations of the intake-manifold pressure, and passageway means for connecting said cavity to said fluid-pressure-differential-responsive valve means, and means including speed-responsive governing means controlled by the rotatable element for controlling the differential air pressure applied to said fluid-pressure-differential-responsive valve means from said pressure-controlling means through said passageway means.

55. In a governing system for association with a vehicle having an internal combustion engine having an intake manifold, a movable member for controlling the velocity of the vehicle and a rotatable element, the combination of fluid flow actuated force-producing means coupled to the movable member and having an actuating chamber with a fluid inlet and a fluid outlet therefor, pressure-controlling means including a cavity, air-pressure displaceable diaphragm means responsive to the pressure of the air in said cavity, spring means for biasing said diaphragm means, pressure-controlling valve means controlled by said diaphragm means and controllably connecting said cavity to the intake manifold, and passageway means connected to said cavity, means establishing a fluid flow path including said cavity said passageway said fluid inlet through said actuating chamber and said fluid outlet, and means including speed-responsive means controlled by the rotatable element and fluid-flow controlling valve means controlled by said speed-responsive means for controlling the flow of fluid to and through said actuating chamber of said force-producing means via said fluid flow path.

56. In a governing system for association with a vehicle having an internal combustion engine having an intake manifold, a movable member for controlling the velocity of the vehicle and a rotatable element, the combination of fluid flow actuated force-producing means coupled to the movable member and having an actuating chamber, pressure-controlling means including a cavity, air-pressure displaceable diaphragm means responsive to the pressure of the air in said cavity, spring means for biasing said diaphragm means, pressure-controlling valve means controlled by said diaphragm means and controllably connecting said cavity to the intake manifold, and passageway means connected to said cavity, and means including speed-responsive means controlled by the rotatable element and fluid-flow responsive valve means controlled by said speed-responsive means and connected to said passageway means and actuated by the flow of fluid to said cavity and through said passageway means for controlling the flow of fluid to and through said actuating chamber of said force-producing means.

57. In a system for controlling apparatus including an engine having a force-actuatable throttle mechanism and a source of fluid pressure which changes in response to changes of the position of the throttle mechanism, the combination of sensing means for sensing variations of the output of the apparatus and changing in accordance therewith, a fluid pressure chamber, control means connected to said sensing means for changing the effective fluid pressure in said chamber in direction and magnitude in response to changes of said sensing means, means including force-producing means coupled to the throttle mechanism for applying a force to the throttle mechanism in accordance with the pressure in said chamber, and means for changing the fluid pressure in said chamber with a change in the fluid pressure of the source produced by a change of position of the throttle mechanism by said force-producing means in response to a change in pressure in said chamber resulting from a change of said sensing means and in a direction opposite to the change in pressure produced in said chamber in response to the change of said sensing means.

58. The combination of claim 57 in which the magnitude of the change in the fluid pressure in said chamber with a change in the pressure of the source produced by a change of the throttle mechanism is smaller than the change in pressure produced in said chamber in response to the change of said sensing means.

59. In a system for controlling apparatus including an engine having a force-actuatable throttle mechanism and a source of fluid pressure which changes in response to changes of the position of the throttle mechanism, the combination of sensing means for sensing variations of the output of the apparatus and for producing an output which changes with changes of the output of the apparatus, a fluid pressure chamber, a control valve, control means including said control valve connected to said sensing means for changing the effective fluid pressure in said chamber in direction and magnitude from a selected fluid pressure under the control of said sensing means and in accordance with changes of the output of said sensing means, means including force-producing means coupled to the throttle mechanism for applying a force to the throttle mechanism in accordance with the pressure in said chamber, and means including said control valve for changing the fluid pressure in said chamber with a change in the fluid pressure of the source produced by a change of the position of the throttle mechanism by said force-producing means in response to a change in pressure in said chamber resulting from a change of said output of said sensing means and in a direction opposite to the change in pressure produced in said chamber in response to the change of the output of said sensing means and for varying the magnitude of said change in fluid pressure in said chamber with the change of the fluid pressure of the source in accordance with the change of the control valve produced by said change of the output of said sensing means.

60. The combination of claim 59 in which the source of fluid pressure which changes in response to changes of the position of the throttle mechanism is the source of the fluid pressure in said chamber which is changed by said control valve, and in which said control valve controls the flow of fluid from said chamber to the source.

61. In a system for controlling apparatus including an engine for driving a rotatable element at a variable velocity and having a force-actuatable throttle mechanism for changing the speed of the engine and a source of fluid pressure which changes in response to changes of the position of the throttle mechanism and in advance of the change of velocity of the rotatable element produced by the change in position of the throttle mechanism, the combination of sensing means for producing an output signal which changes with changes of the velocity of rotation of the rotatable element, a fluid pressure chamber, control means connected to said sensing means and responsive to said output signal for changing the effective fluid pressure in said chamber in direction and magnitude from a selected fluid pressure in accordance with changes of said output signal, means including force-producing means coupled to the throttle mechanism for applying a force to the throttle mechanism in accordance with the pressure in said chamber, and means connected to said chamber and to the source of fluid pressure for changing the fluid pressure in said chamber with a change in the fluid pressure of the source produced by a change of position of the throttle mechanism by said force-producing means in response to a change in pressure in said chamber resulting from a change of said output signal and in a direction opposite to the change in pressure produced in said chamber in response to said change of said output signal.

62. The combination of claim 61 in which said output signal is an air pressure signal and in which said control means includes a valve controlling said effective fluid pressure in said chamber and a diaphragm responsive to said air pressure output signal for controlling said valve.

63. In a system for controlling apparatus including an engine for driving a rotatable element at a variable velocity and having a force-actuatable throttle mechanism movable in first and second directions for changing the speed of the engine and a source of fluid pressure which changes in response to changes of the position of the throttle mechanism and in advance of the change of velocity of the rotatable element produced by the change in position of the throttle mechanism, the combination of sensing means for producing an output signal which changes with changes of the velocity of rotation of the rotatable element, a fluid pressure chamber, control means connected to said sensing means and responsive to said output signal for changing the effective fluid pressure in said chamber in direction and magnitude from a selected fluid pressure in accordance with changes of said output signal, means including force-producing means coupled to the throttle mechanism for applying a force to the throttle mechanism in accordance with the pressure in said chamber and tending to move the throttle mechanism in one of two directions in response to a change of pressure in said chamber in one direction, and means connected to said chamber and to the source of fluid pressure for changing the fluid pressure in said chamber in said one direction with a change in the fluid pressure of the source produced by a change of position of the throttle mechanism in said second direction.

64. In a system for controlling apparatus including an engine for driving a rotatable element at a variable velocity and having a force-actuatable throttle mechanism for changing the speed of the engine and a source of fluid pressure which changes in response to changes of the position of the throttle mechanism and in advance of the change of velocity of the rotatable element produced by the change in position of the throttle mechanism, the combination of sensing means, including means for sensing the velocity of rotation of the rotatable element and manually settable means for selecting a nominal controlled velocity of rotation of the rotatable element, for producing an output signal which varies in accordance with the direction and magnitude of the difference between the sensed velocity of rotation of the rotatable element and the selected nominal controlled velocity of rotation of the rotatable element, a fluid pressure chamber, control means connected to said sensing means and responsive to said output signal for changing the effective fluid pressure in said chamber in direction and magnitude from a selected fluid pressure in accordance with changes of said output signal from said preselected output signal, means including force-producing means coupled to the throttle mechanism for applying a force to the throttle mechanism in accordance with the pressure in said chamber, and means connected to said chamber and to the source of fluid pressure for changing the fluid pressure in said chamber with and in accordance with the magnitude of the change in the fluid pressure of the source produced by a change of position of the throttle mechanism by said force-producing means in response to a change in pressure in said chamber resulting from a change of said output signal and in a direction opposite to the change in pressure produced in said chamber in response to said change of said output signal.

65. The combination of claim 64 in which the rotatable element is the speedometer cable of the vehicle, in which the means for sensing the velocity of rotation of the rotatable element is disposed between the speedometer cable and the pointer of the speedometer of the vehicle and includes a pair of elements the effective relationship between which determines said output signal, and means for varying the effective relationship between said elements from a preselected relationship in accordance with the direction and magnitude of the difference between the sensed velocity of rotation of the speedometer cable and the selected nominal controlled velocity of rotation of the speedometer cable over a range of such variations, and in which said manually settable means is manually movable to select said preselected relationship of said elements of said means for sensing the velocity of rotation of the rotatable element to select the nominal controlled velocity of rotation of the rotatable element at which said preselected output signal will be produced.

66. In a system for controlling apparatus including an engine for driving a rotatable element at a variable velocity and having a force-actuatable throttle mechanism for changing the speed of the engine and a source of fluid pressure which changes in response to changes of the position of the throttle mechanism and in advance of the change of velocity of the rotatable element produced by the change in position of the throttle mechanism, the combination of sensing means, including means for sensing the velocity of rotation of the rotatable element and manually settable means for selecting a nominal controlled velocity of rotation of the rotatable element, for producing a preselected output signal when the sensed velocity of rotation of the rotatable element is the same as the selected nominal controlled velocity of rotation of the rotatable element and for producing an output signal which varies in accordance with the direction and magnitude of the difference between the sensed velocity of rotation of the rotatable element and the selected nominal controlled velocity of rotation of the rotatable element over a preselected range of variations of the velocity of rotation of the rotatable element from said selected nominal controlled velocity of rotation and for producing an output signal at a certain value when the sensed velocity of rotation of the rotatable element exceeds said range of variations and for producing an output signal at another certain value when the sensed velocity of rotation of the rotatable element falls below said range of variations, a fluid pressure chamber, control means connected to said sensing means and responsive to said output signal for changing the effective fluid pressure in said chamber in direction and magnitude from a selected fluid pressure in accordance with changes of said output signal from said preselected output signal and for changing the effective fluid pressure in said chamber to limit values thereof when said output signal is at said certain values thereof, means including force-producing means coupled to the throttle mechanism for applying a force to the throttle mechanism in accordance with the pressure in said chamber, and means connected to said chamber and to the source of fluid pressure for changing the fluid pressure in said chamber with and in accordance with the magnitude of the change in the fluid pressure of the source produced by a change of position of the throttle mechanism by said force-producing means in response to a change in pressure in said chamber resulting from a change of said output signal over said preselected range of variations of the velocity of rotation of the rotatable element and in a direction opposite to the change in pressure produced in said chamber in response to said change of said output signal.

67. In a system for controlling a vehicle including an engine for driving a rotatable element at a variable velocity related to the road speed of the vehicle and having a force-actuatable throttle mechanism for changing the speed of the engine and an intake manifold which changes air pressure in response to changes of the position of the throttle mechanism and in advance of the change of velocity of the rotatable element produced by the change in position of the throttle mechanism, the combination of sensing means for producing an output signal which changes with changes of the velocity of rotation of the rotatable element, an air pressure chamber, control means connected to said sensing means and responsive to said output signal for controlling the connection of said chamber to the intake manifold and for changing the effective air pressure in said chamber in direction and magnitude from a selected air pressure in accordance with changes of said output signal, means including force-producing means coupled to the throttle mechanism for applying a force to the throttle mechanism in accordance with the pressure in said chamber, and means including said control means for changing the air pressure in said chamber with a change in the air pressure of the intake manifold produced by a change of position of the throttle mechanism by said force-producing means in response to a change in pressure in said chamber resulting from a change of said output signal to a smaller degree than and in a direction opposite to the change in pressure produced in said chamber in response to said change of said output signal.

68. In a governing system for association with a rotatable element rotatable at varying velocities, a throttle mechanism movable in opening and closing senses for controlling the velocity of rotation of the rotatable element, and a source of fluid at a pressure differing from atmospheric pressure and which changes in one direction as the throttle mechanism changes in a throttle opening sense and which changes in a second direction as the throttle mechanism changes in a throttle closing sense, the combination of means including fluid pressure actuated force-producing means for controlling the throttle mechanism and for exerting a force on the mechanism having a magnitude which varies in accordance with the magnitude of the fluid pressure applied to said force-producing means and responsive to a change of the fluid pressure applied to said force-producing means in a first direction to change the force on the throttle mechanism in the throttle opening sense and responsive to a change of the fluid pressure applied to said force-producing means in a second direction to change the force on the throttle mechanism in the throttle closing sense, fluid-pressure differential responsive control valve means for controlling said force-producing means and for controlling the application of fluid pressure to said force-producing means having a magnitude which varies in accordance with the fluid pressure differential applied to said control valve means, means including a fluid pressure controlling governor including a rotatable member driven by the rotatable element for modulating the fluid pressure differential applied to said control valve means in accordance with the velocity of rotation of the rotatable element, and degenerative feedback means effective in response to a change of the pressure of the source of fluid pressure in said one direction to change the fluid pressure in said force-producing means in said second direction and effective in response to a change of the pressure of the source of fluid pressure in said second direction to change the pressure in said force-producing means in said first direction.

69. In a governing system for association with a rotatable element rotatable at varying velocities, a throttle mechanism movable in opening and closing senses for controlling the velocity of rotation of the rotatable element, and a source of fluid at a pressure differing from atmospheric pressure and which changes in one direction as the throttle mechanism changes in a throttle opening sense and which changes in a second direction as the throttle mechanism changes in a throttle closing sense, the combination of means including fluid pressure actuated force-producing means for controlling the throttle mechanism and for exerting a force on the mechanism having a magnitude which varies in accordance with the magnitude of the fluid pressure applied to said force-producing means and responsive to a change of the fluid pressure applied to said force-producing means in a first direction to change the force on the throttle mechanism in the throttle opening sense and responsive to a change of the fluid pressure applied to said force-producing means in a second direction to change the force on the throttle mechanism in the throttle closing sense, fluid-pressure differential responsive control valve means for controlling said force-producing means and for controlling the application of fluid pressure to said force-producing means having a magnitude which varies in accordance with the fluid pressure differential applied to said control valve means, means including a fluid pressure controlling governor including a rotatable member driven by the rotatable element for modulating the fluid pressure differential applied to said control valve means in accordance with the velocity of rotation of the rotatable element, and means establishing a degenerative feedback loop including the source, said control valve means, said force-producing means and the throttle mechanism effective independently of any change of the fluid pressure differential applied to said control valve means by said fluid pressure controlling governor for changing the force applied to the throttle mechanism in the throttle closing sense in response to a change of the pressure of the source in said one direction resulting from movement of the throttle mechanism in a throttle opening sense produced as a result of a change of the force applied thereto by said force-producing means in said throttle opening sense and for changing the force applied to the throttle mechanism in the throttle opening sense in response to a change in the pressure of the source in said second direction resulting from movement of the throttle mechanism in a throttle closing sense produced as a result of a change of the force applied thereto by said force-producing means in said throttle closing sense.

70. In a governing system for association with a rotatable element rotatable at varying velocities, a throttle mechanism movable in opening and closing senses for controlling the velocity of rotation of the rotatable element, and a source of fluid at a pressure differing from atmospheric pressure and which changes in one direction as the throttle mechanism changes in a throttle opening sense and which changes in a second direction as the throttle mechanism changes in a throttle closing sense, the combination of means including fluid pressure actuated force-producing means for controlling the throttle mechanism and for exerting a force on the mechanism having a magnitude which varies in accordance with the magnitude of the fluid pressure applied to said force-producing means and responsive to a change of the fluid pressure applied to said force-producing means in a first direction to change the force on the throttle mechanism in the throttle opening sense and responsive to a change of the fluid pressure applied to said force-producing means in a second direction to change the force on the throttle mechanism in the throttle closing sense, fluid-pressure differential responsive control valve means for controlling said force-producing means and for controlling the application of fluid pressure to said force-producing means having a magnitude which varies in accordance with the fluid pressure differential applied to said control valve means, means including a fluid pressure controlling governor including a rotatable member driven by the rotatable element for modulating the fluid pressure differential applied to said control valve means in accordance with the velocity of rotation of the rotatable element, and degenerative feedback means effective in response to a change of the pressure of the source of fluid pressure in said one direction and in said second direction, respectively, resulting from movement of the throttle mechanism produced by a change in the force applied thereto by said force-producing means resulting from a change of fluid pressure applied thereto of a given magnitude produced in response to the change of the fluid pressure differential applied to said control valve means in response to a change of the velocity of rotation of the rotatable element to change the fluid pressure in said force-producing means in said second direction and in said first direction, respectively, by an amount which is smaller from the said given magnitude.

71. In a governing system for association with a vehicle having a rotatable element rotatable at a velocity which varies with the velocity of the vehicle, and an internal combustion engine having a throttle mechanism movable in opening and closing senses for controlling the velocity of the vehicle and an intake manifold the air pressure in which increases as the throttle is opened and decreases as the throttle is closed, the combination of means including air pressure actuated force-producing means for controlling the throttle mechanism and for exerting a force on the mechanism having a magnitude which varies in accordance with the magnitude of the air pressure applied to said force-producing means and responsive to a change of the air pressure applied to said force-producing means in a first direction to change the force on the throttle mechanism in a throttle opening sense and responsive to a change of the air pressure applied to said force-producing means in a second direction to change the force on the throttle mechanism in a throttle closing sense, fluid-pressure differential responsive control valve means for controlling said force-producing means and for controlling the application of air pressure to said force-producing means having a magnitude which varies in accordance with the fluid pressure differential applied to said control valve means, means including a fluid pressure controlling governor including a rotatable member driven by the rotatable element for modulating the fluid pressure differential applied to said control valve means in accordance with the velocity of rotation of the rotatable element, and means establishing a degenerative feedback loop including the intake manifold, said control valve means, said force-producing means and the throttle mechanism effective independently of any change of the fluid pressure differential applied to said control valve means by said fluid pressure controlling governor for changing the force applied to the throttle mechanism in the throttle closing sense in response to an increase of the air pressure in the intake manifold and for changing the force applied to the throttle mechanism in the throttle opening sense in response to a decrease in the air pressure in the intake manifold for tending to maintain the throttle mechanism in a preselected position and the air in the intake manifold at a preselected pressure in the absence of a change of the fluid pressure differential applied to said control valve means by said fluid pressure controlling governor.

72. In a governing system for association with a vehicle having a rotatable element rotatable at a velocity which varies with the velocity of the vehicle, and an internal combustion engine having a throttle mechanism movable in opening and closing senses for controlling the velocity of the vehicle and an intake manifold the air pressure in which increases as the throttle is opened and decreases as the throttle is closed, the combination of means including air pressure actuated force-producing means for controlling the throttle mechanism and for exerting a force on the mechanism having a magnitude which varies in accordance with the magnitude of the air pressure applied to said force-producing means and responsive to a change of the air pressure applied to said force-producing means in a first direction to change the force on the throttle mechanism in a throttle opening sense and responsive to a change of the air pressure applied to said force-producing means in a second direction to change the force on the throttle mechanism in a throttle closing sense, fluid pressure differential responsive control valve means for controlling said force-producing means and for controlling the application of air pressure to said force-producing means having a magnitude which varies in accordance with the fluid pressure differential applied to said control valve means, means including a fluid pressure controlling governor including a rotatable member driven by the rotatable element for modulating the fluid pressure differential applied to said control valve means in accordance with the velocity of rotation of the rotatable element, and means establishing a degenerative feedback loop including the intake manifold, said control valve means, said force-producing means and the throttle mechanism effective independently of any change of the fluid pressure differential applied to said control valve means by said fluid pressure controlling governor for changing the force applied to the throttle mechanism in the throttle closing sense in response to an increase of the air pressure in the intake manifold resulting from movement of the throttle mechanism in a throttle opening sense produced as a result of a change of the force applied thereto by said force-producing means in said throttle opening sense and for changing the force applied to the throttle mechanism in the throttle opening sense in response to a decrease in the air pressure in the intake manifold resulting from movement of the throttle mechanism in a throttle closing sense produced as a result of a change of the force applied thereto by said force-producing means in said throttle closing sense for tending to maintain the throttle mechanism in a preselected position and the air in the intake manifold at a preselected pressure in the absence of a change of the fluid pressure differential applied to said control valve means by said fluid pressure controlling governor.

73. In a governing system for association with a vehicle having a rotatable element rotatable at a velocity which varies with the velocity of the vehicle, and an internal combustion engine having a throttle mechanism movable in opening and closing senses for controlling the velocity of the vehicle and an intake manifold the air pressure in which increases as the throttle is opened and decreases as the throttle is closed, the combination of means including air pressure actuated force-producing means for controlling the throttle mechanism and for exerting a force on the mechanism having a magnitude which varies in accordance with the magnitude of the air pressure applied to said force-producing means and responsive to a change of the air pressure applied to said force-producing means in a first direction to change the force on the throttle mechanism in a throttle opening sense and responsive to a change of the air pressure applied to said force-producing means in a second direction to change the force on the throttle mechanism in a throttle closing sense, fluid-pressure differential responsive control valve means for controlling said force-producing means and for controlling the application of air pressure to said force-producing means having a magnitude which varies in accordance with the fluid pressure differential applied to said control valve means, means including a fluid pressure controlling governor including a rotatable member driven by the rotatable element for modulating the fluid pressure differential applied to said control valve means in accordance with the velocity of rotation of the rotatable element, and degenerative feedback means effective upon a decrease and an increase, respectively, of the intake-manifold pressure resulting from movement of the throttle mechanism produced by a change in the force applied thereto by said force-producing means resulting from a change of air pressure applied thereto of a given magnitude produced in response to the change of the fluid pressure differential applied to said control valve means in response to a change of the velocity of rotation of the rotatable element to change the fluid pressure in said force-producing means in said second direction and in said first direction, respectively, by an amount which is smaller than the said given magnitude.

74. In a governing system for association with a vehicle having a rotatable element rotatable at a velocity which varies with the velocity of the vehicle, and an internal combustion engine having a throttle mechanism movable in opening and closing senses for controlling the velocity of the vehicle and an intake manifold the air pressure in which increases as the throttle is opened and decreases as the throttle is closed, the combination of means including air pressure actuated force-producing means for controlling the throttle mechanism and for exerting a force on the mechanism having a magnitude which varies in accordance with the magnitude of the air pressure applied to said force-producing means and responsive to a change of the air pressure applied to said force-producing means in a first direction to change the force on the throttle mechanism in a throttle opening sense and responsive to a change of the air pressure applied to said force-producing means in a second direction to change the force on the throttle mechanism in a throttle closing sense, air-pressure differential responsive control valve means for controlling said force-producing means and for controlling the application of air pressure to said force-producing means having a magnitude which varies in accordance with the air pressure differential applied to said control valve means, said control valve means including cooperating valve elements for controlling air flow therebetween and an air pressure differential responsive diaphragm connected to one of said valve elements for controlling the movement thereof, means including an air pressure controlling governor including a rotatable member driven by the rotatable element and air tube means connected to said control valve means for modulating the air pressure differential applied to said air pressure responsive diaphragm of said control valve means in accordance with the velocity of rotation of the rotatable element, and degenerative feedback means effective upon an increase of the intake-manifold pressure to change the pressure in said force-producing means in said second direction and effective upon a decrease of the intake manifold pressure to change the pressure in said force-producing means in said first direction.

75. In a governing system for association with a vehicle having a rotatable element rotatable at a velocity which varies with the velocity of the vehicle, and an internal combustion engine having a throttle mechanism movable in opening and closing senses for controlling the velocity of the vehicle and an intake manifold the air pressure in which increases as the throttle is opened and decreases as the throttle is closed, the combination of means including air pressure actuated force-producing means for controlling the throttle mechanism and for exerting a force on the mechanism having a magnitude which varies in accordance with the magnitude of the air pressure applied to said force-producing means and responsive to a change of the air pressure applied to said force-producing means in a first direction to change the force on the throttle mechanism in a throttle opening sense and responsive to a change of the air pressure applied to said force-producing means in a second direction to change the force on the throttle mechanism in a throttle closing sense, air-pressure differential responsive control valve means for controlling said force-producing means and for controlling the application of air pressure to said force-producing means having a magnitude which varies in accordance with the air pressure differential applied to said control valve means, said control valve means including cooperating valve elements for controlling air flow therebetween and an air pressure differential responsive diaphragm connected to one of said valve elements for controlling the movement thereof, means including an air pressure controlling governor including a rotatable member driven by the rotatable element and air tube means connected to said control valve means for modulating the air pressure differential applied to said air pressure responsive diaphragm of said control valve means in accordance with the velocity of rotation of the rotatable element, and degenerative feedback means effective upon an increase of the intake-manifold pressure to change the pressure in said force-producing means in said second direction and effective upon a decrease of the intake manifold pressure to change the pressure in said force-producing means in said first direction, including means for establishing air flow via a path from atmosphere to the intake manifold including an orifice and said control valve elements for establishing the air pressure in said force-producing means in accordance with the presure between said orifice and said control valve elements in said path with the rate of air flow in said path through said orifice and hence the air pressure applied to said force-producing means being varied with variations of said intake manifold pressure.

76. In a system for controlling the speed of a vehicle having a rotatable element rotatable at a speed related to the road speed of the vehicle and powered by an internal combustion engine having an intake manifold and a throttle, the combination of speed-responsive means for controlling fluid pressure in accordance with the velocity of rotation of the rotatable element, fluid pressure responsive force-producing means having a chamber and movable means responsive to the pressure in said chamber for controlling the throttle, and control valve means connected to the intake manifold by an orifice and connected to said speed-responsive means and to said chamber and responsive to the pressures in both thereof for controlling the pressure in said chamber, said orifice, said control valve and said chamber being elements of a fluid-dynamic flow path, said control valve means being responsive to the pressure change resulting from the pressure drop across said orifice.

77. In a system for controlling the speed of a vehicle having a rotatable element rotatable at a speed related to the road speed of the vehicle and powered by an internal combustion engine having an intake manifold and a throttle, the combination of speed-responsive means for controlling fluid pressure in accordance with the velocity of rotation of the rotatable element, fluid pressure responsive force-producing means having a chamber and movable means responsive to the pressure in said chamber for controlling the throttle, and control valve means connected to the intake manifold by pressure controlling means which produce a pressure change which varies in accordance with changes of the intake manifold pressure connected to said speed-responsive means and to said chamber and responsive to the pressures in both thereof for controlling the pressure in said chamber, said control valve means being further responsive to the pressure change produced by said pressure controlling means.

78. In a fluid-pressure controlling system for association with a source of significantly varying fluid pressure, the combination of a fluid-pressure responsive control device responsive to the difference between the pressure applied thereto and atmospheric pressure, pressure controlling means connected to the source for producing an output fluid pressure above atmospheric pressure and which changes directly with, but to a smaller percentage than the changes of fluid pressure of the source, and control valve means responsive to said output fluid pressure for applying to said fluid-pressure responsive control device a pressure which changes directly with but to a greater percentage than the changes of said output fluid pressure.

79. A speed warning control system for a variable speed unit having an operator operated unit speed controller movable with respect to the unit, said system comprising, a speed transducer assembly having an actual unit speed input and a selective desired speed input and establishing a controlled speed magnitude zone of proportional speed of less speed magnitude than the magnitude of speed unit variation and being substantially centered on said selective desired unit speed input and movable therewith as different desired unit speed inputs are selected, said assembly producing a continuously variable proportional control speed error signal output when said actual speed input is within said zone and an overspeed error signal output when said actual speed input is above said zone and an underspeed error signal output when said actual speed input is below said zone, a unit speed warning control mechanism connected with said speed transducer assembly to receive said signal outputs therefrom and including a pressure control valve assembly and having two different pressure inputs and a pressure output which varies as a function of said proportional speed error signal and intermediate and continuously variable between said two different pressure inputs when said proportional control speed error signal is received and substantially equal to one of said different pressure inputs when said overspeed error signal is received and substantially equal to the other of said different pressure inputs when said underspeed error signal is received, said speed warning control mechanism further including a pressure actuated motor responsive to said pressure output and adapted to be connected with said unit speed controller to exert a speed decreasing force thereon positively sensible by the unit operator for warning the unit operator when the actual unit speed increases to equal the selected desired unit speed input to said speed transducer assembly, valve assembly comprising a valve seat fixed with respect to the variable speed unit and independent of the unit speed controller, a valve cooperatively engageable with said valve seat, and actuating means responsive to said speed error signal for moving said valve relative to said valve seat.

80. A speed control system for a variable speed unit having an operator operated unit speed controller, said system comprising, a speed transducer assembly having an actual unit speed input and a selective desired speed input and establishing a controlled speed magnitude zone of proportional speed of less speed magnitude than the magnitude of speed unit variation and being substantially centered on said selective desired unit speed input and movable therewith as different desired unit speed inputs are selected, said assembly producing a continuously variable proportional control speed error signal output when said actual speed input is within said zone and an overspeed error signal output when said actual speed input is above said zone and an underspeed error signal output when said actual speed input is below said zone, a unit speed control mechanism connected with said speed transducer assembly to receive said signal outputs therefrom and including a pressure control valve assembly and having two different pressure inputs and a pressure output which varies as a function of said proportional speed error signal and intermediate and continuously variable between said two different pressure inputs when said proportional control speed error signal is received and substantially equal to one of said different pressure inputs when said overspeed error signal is received and substantially equal to the other of said different pressure inputs when said underspeed error signal is received, said speed control mechanism further including a pressure actuated motor responsive to said pressure output and adapted to be connected with said unit speed controller to exert a force thereon which varies as a function of said pressure output applied thereto.

81. The combination of claim 80 in which the operator operated unit speed controller is movable with respect to the unit, and in which said valve assembly comprises a valve seat fixed with respect to the variable speed unit and independent of the unit speed controller, a valve cooperatively engageable with said valve seat, and actuating means responsive to said speed error signal for moving said valve relative to said valve seat.

82. A variable speed unit speed control system for a unit having a driver operated engine speed control means for controlling the speed of the unit comprising, means establishing a controlled speed magnitude zone of proportional speed control and having an actual unit speed input and a selective desired unit speed input and a speed error signal output, said controlled speed magnitude zone being of less speed magnitude than the magnitude of unit speed variation and being substantially centered on said selective desired unit speed input and movable therewith as different desired unit speed inputs are selected, said speed error signal output being an underspeed error signal when said actual speed input is below said zone and being a continuously variable proportional control speed error signal of different magnitude than said underspeed error signal in one sense when said actual speed input is within said zone and being an overspeed error signal of different magnitude than said continuously variable proportional control speed error signal in said one sense when said actual speed input is above said zone, a unit speed control mechanism connected with said means to receive said speed error signal output therefrom and including a valve assembly and having two different pressure inputs and a pressure output, said pressure output being substantially equal to one of said two different pressure inputs when said underspeed error signal is received and being intermediate said two different pressure inputs when said continuously variable proportional speed error signal is received and being substantially equal to the other of said two different pressure inputs when said overspeed error signal is received, said speed control mechanism further including a pressure actuated motor differentially responsive to said pressure output and one of said two different pressure inputs and connected with said engine speed control means for applying a force thereto which varies as a function of the difference between said pressure output and said one of said two different pressure inputs.

83. The combination of claim 82 in which the operator operated unit speed controller is movable with respect to the unit, and in which said valve assembly comprises a valve seat fixed with respect to the variable speed unit and independent of the unit speed controller, a valve cooperatively engageable with said valve seat, and actuating means responsive to said speed error signal for moving said valve relative to said valve seat.

84. A vehicle road speed warning system for a vehicle having an engine and driver operated engine speed control means for controlling the speed of the engine and thereby the speed of the vehicle, said system comprising a motor for forcibly resisting driver movement of said engine speed control means toward the increasing engine speed direction when a desired vehicle road speed is attained, a spring urging said engine speed control means toward the decreasing engine speed direction, means for sensing actual vehicle road speed and comparing that speed with a selected desired vehicle road speed and developing a continuous vehicle road speed error signal, and a proportional control mechanism connected with said motor and said sensing means for continuously controlling said motor in accordance with said speed error signal within a proportional speed error range having limits greater than minimum vehicle speed and less than maximum vehicle speed and substantially centered on the selected desired vehicle speed to actuate said motor whereby said motor warns the vehicle operator of the attainment of the desired vehicle speed by forcibly resisting further movement of said engine speed control means in the increasing engine speed direction the resisting force of said motor increasing under influence of said speed error signal when the actual vehicle speed increases beyond the selected desired vehicle speed as a function of speed error within the proportional speed error range, said proportional control mechanism having two limit conditions and operating during normal operation of said system between said limit conditions within said proportional speed error range and reaching said limit conditions at the limits of said proportional speed error range.

85. A vehicle road speed control system for a vehicle having an engine and driver operated engine speed control means movable in engine speed increasing and engine speed decreasing directions for controlling the speed of the engine and thereby the speed of the vehicle, said system comprising a motor for applying forces to said engine speed control means in one of said engine speed directions when a desired vehicle road speed is attained, a spring urging said speed control means toward the decreasing engine speed direction, means for sensing actual vehicle road speed and comparing that speed with a selected desired vehicle road speed and developing a continuous vehicle road speed error signal, and a proportional control mechanism connected with said motor and said sensing means for continuously controlling said motor in accordance with said speed error signal within a proportional speed error range having limits greater than minimum vehicle speed and less than maximum vehicle speed and substantially centered on the selected desired vehicle speed, the force of said motor changing under influence of said speed error signal when the actual vehicle speed changes from the selected desired vehicle speed as a function of speed error within the proportional speed error range, said proportional control mechanism having two limit conditions and operating during normal operation of said system between said limit conditions within said proportional speed error range and reaching said limit conditions at the limits of said speed error range.

References Cited in the file of this patent

UNITED STATES PATENTS

| | | |
|---|---|---|
| 1,358,812 | Anderson | Nov. 16, 1920 |
| 2,071,695 | Hyde | Feb. 23, 1937 |
| 2,077,555 | Frantz | Apr. 20, 1937 |
| 2,115,878 | Rodman | May 3, 1938 |
| 2,157,472 | Bellis | May 9, 1939 |
| 2,160,194 | Bates | May 30, 1939 |
| 2,253,875 | Vatter | Aug. 26, 1941 |
| 2,260,576 | Maybach | Oct. 28, 1941 |
| 2,283,478 | Warren | May 19, 1942 |
| 2,324,191 | Bowers | July 13, 1943 |
| 2,365,384 | Bonnier | Dec. 19, 1944 |
| 2,367,606 | Olson | Jan. 16, 1945 |
| 2,519,859 | Teetor | Aug. 22, 1950 |
| 2,708,979 | Reynoldson | May 24, 1955 |
| 2,714,880 | Riley | Aug. 9, 1955 |
| 2,737,165 | Thorner | Mar. 6, 1956 |
| 2,822,702 | Scheppe | Feb. 11, 1958 |
| 2,835,237 | Thorner | May 20, 1958 |
| 2,914,960 | Edgerton | Dec. 1, 1959 |
| 2,916,100 | Teetor | Dec. 8, 1959 |
| 3,088,538 | Brennan et al. | May 7, 1963 |